(12) United States Patent
Kuwahara

(10) Patent No.: US 8,259,351 B2
(45) Date of Patent: Sep. 4, 2012

(54) ELECTRONIC DEVICE SYSTEM AND CONTROL METHOD OF ELECTRONIC DEVICE SYSTEM

(75) Inventor: Yuki Kuwahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 12/403,836

(22) Filed: Mar. 13, 2009

(65) Prior Publication Data
US 2009/0231605 A1 Sep. 17, 2009

(30) Foreign Application Priority Data
Mar. 13, 2008 (JP) .................. 2008-064215

(51) Int. Cl.
*H04N 1/60* (2006.01)
*G06K 15/00* (2006.01)
(52) U.S. Cl. ....................... 358/1.9; 358/1.18
(58) Field of Classification Search ................... 358/1.9, 358/1.18; 347/12, 14, 15, 19, 43
See application file for complete search history.

(56) References Cited

U.S. PATENT DOCUMENTS

| | | | |
|---|---|---|---|
| 6,278,477 B1 | 8/2001 | Ohba | |
| 7,664,135 B2 | 2/2010 | Oshima et al. | |
| 8,199,144 B2 | 6/2012 | Sakura et al. | |
| 2006/0285161 A1* | 12/2006 | Otsuka | 358/1.18 |

FOREIGN PATENT DOCUMENTS

| | | |
|---|---|---|
| JP | 05-153340 A | 6/1993 |
| JP | 11-048556 A | 2/1999 |
| JP | 2000-092324 A | 3/2000 |
| JP | 2000-301811 A | 10/2000 |
| JP | 2001-324387 A | 11/2001 |
| JP | 2003-072964 A | 3/2003 |
| JP | 2005-199542 A | 7/2005 |
| JP | 2006-309352 A | 11/2006 |
| JP | 2006-339688 A | 12/2006 |
| JP | 2007-072953 A | 3/2007 |
| JP | 2007-269421 A | 10/2007 |

* cited by examiner

*Primary Examiner* — Charlotte M Baker
(74) *Attorney, Agent, or Firm* — Sughrue Mion, PLLC

(57) ABSTRACT

A system, method and apparatus for controlling a device to operate to an operation position specified by a value of a first coordinate on a target, even if a target is misaligned. The system includes a first printer driver in a host apparatus that generates a command with an operation position of a color measurement carriage of a color measurement driving device specified as a value of a logical coordinate system on paper and a second printer driver in the printer that converts the value in the command from the logical coordinate system to a real coordinate system, incorporates the command with the value of the real coordinate system specified into print data, and transmits print data to the color measurement driving device.

3 Claims, 22 Drawing Sheets

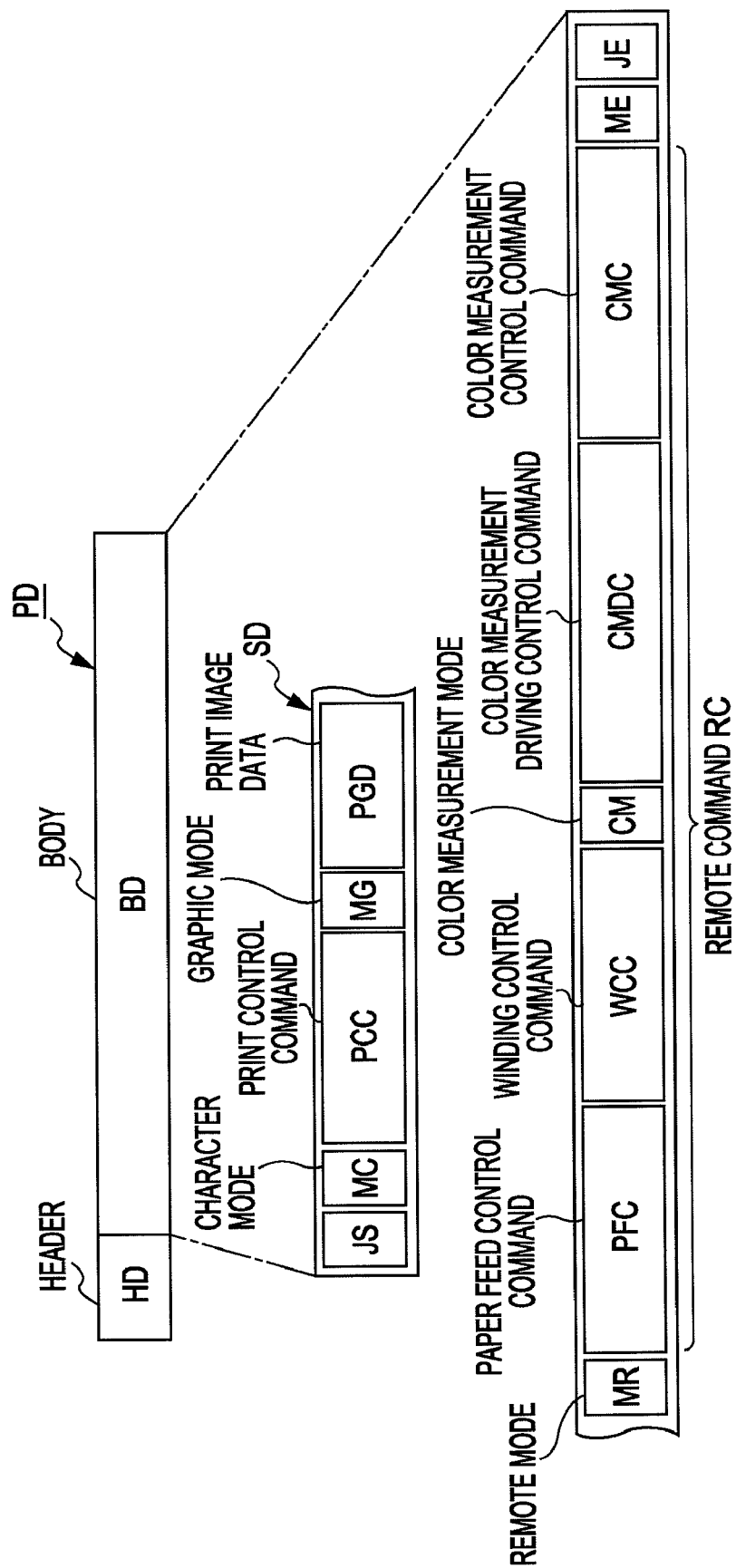

GENERATION OF PAPER FEED CONTROL COMMAND

GENERATION OF WINDING CONTROL COMMAND

GENERATION OF COLOR MEASUREMENT DRIVING CONTROL COMMAND

GENERATION OF COLOR MEASUREMENT CONTROL COMMAND

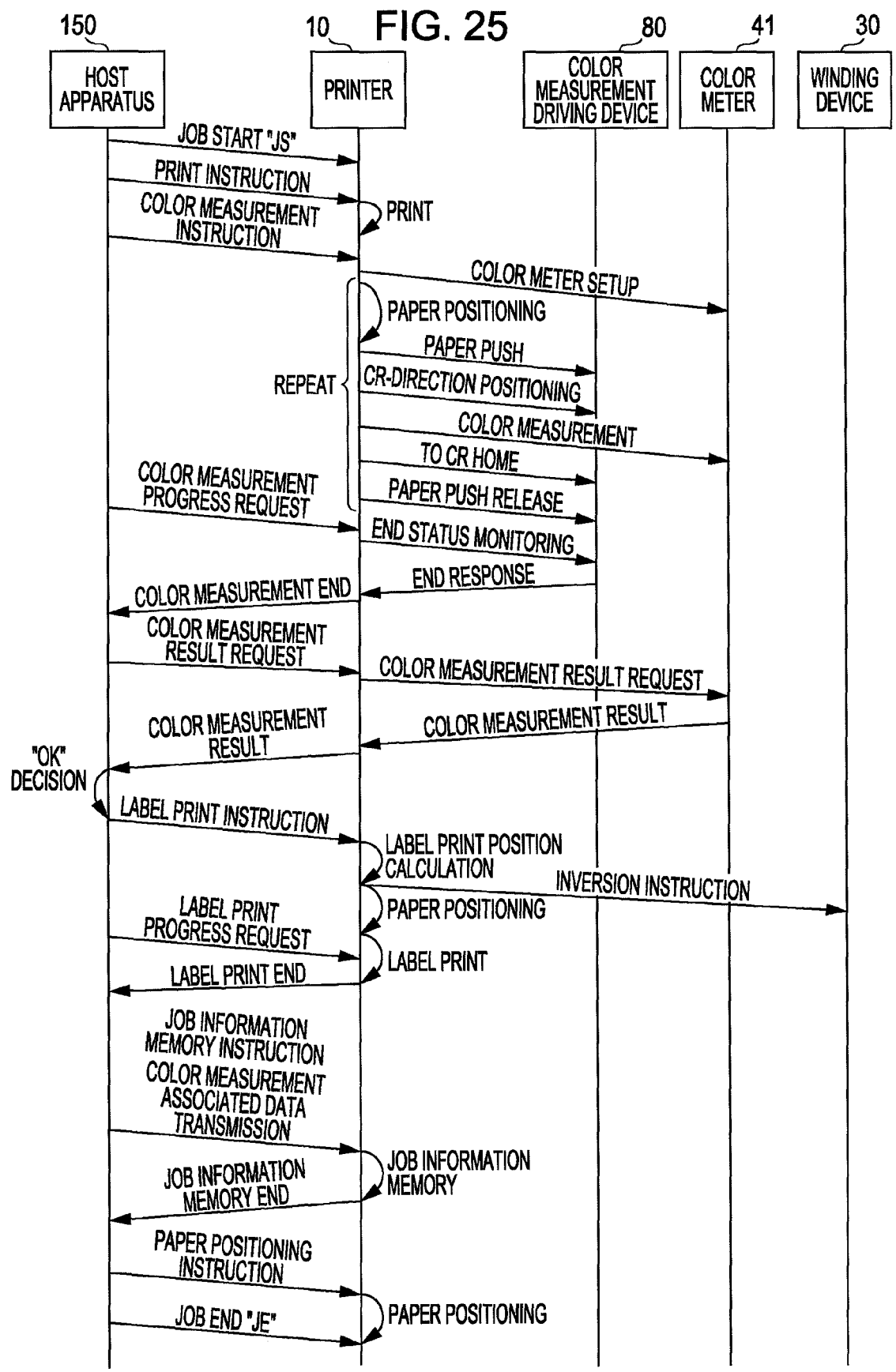

ELECTRONIC DEVICE SYSTEM AND CONTROL METHOD OF ELECTRONIC DEVICE SYSTEM

BACKGROUND

1. Technical Field

The present invention relates to an electronic device system in which a first device and a second device communicable with the first device are controlled on the basis of control data from a data providing unit, such as a host apparatus, and to a control method of an electronic device system.

2. Related Art

JP-A-2001-324387 discloses a printing system that prints a color patch on a recording sheet in order to perform setup such that a printer, which performs printing on the basis of print data transmitted from a host apparatus, can perform printing with colors corresponding to a desired color space. The printing system includes a color measuring device that performs color measurement for the printed color patch. The color measurement result of the color measuring device is analyzed by the host apparatus and is reflected in a subsequent print condition.

When the color measuring device as the second device performs color measurement for the patch recorded on the recording sheet, it is necessary to control the operation position of the color measuring device so as to be adjusted to the recording position of the patch. In this case, the recording position of the patch on the recording sheet changes depending on the position of the recording sheet. Accordingly, it is necessary to detect the position of the recording sheet.

JP-A-2003-72964 discloses a recording apparatus that detects a position of a recording sheet. In this recording apparatus, a counter counts a paper feed amount from when a sensor detects the front end of the recording sheet in a transport direction, thereby managing the position of the recording sheet in the transport direction.

A recording apparatus is also known in which misalignment of a recording sheet in a paper width direction is detected on the basis of a detection result of a sensor, and control for correction of a recording position is executed on the basis of the misalignment in the paper width direction (for example, JP-A-2005-199542 and JP-A-11-48556).

When a user specifies the print position of the color patch on a setup screen of the host apparatus with an input device, a patch recording position is defined by a coordinate system on the paper (for example, a coordinate system with a corner of a paper area as the origin). The host apparatus decides the operation position of the color measuring device on the basis of the setup information, and generates a command (for example, a command CCR(Xo)) in which a value Xo represents the decided operation position. In this case, the value of the command becomes the value of the coordinate system on the paper.

For example, as described in JP-A-2005-199542 or the like, in the printer in which control for correction of the recording position in accordance with the misalignment of the recording sheet in the paper width direction, when color measurement is performed by using the color measuring device, even if the recording sheet is misaligned in the paper width direction, the patch can be recorded at the recording position as specified by the coordinate system on the paper. However, the operation position of the color measuring device specified by the coordinate system on the paper is misaligned with the patch recording position due to the misalignment of the recording sheet. As a result, the color measuring device performs color measurement at a position misaligned with the patch recording position, and accordingly color measurement accuracy is deteriorated. When the recording position is not corrected, if the value of the operation position is specified by the coordinate system on the paper, the operation position of the color measuring device is misaligned with the patch recording position due to the misalignment of the recording sheet. In the above description, the electronic device system in which the first device is the printer and the second device communicable with the first device is the color measuring device has been described, but an electronic device system having a different combination has the same problem.

SUMMARY

An advantage of some aspects of the invention is that it provides an electronic device system and a control method of an electronic device system that, even if a target is misaligned, can control a second device communicable with a first device to operate to an operation position specified by a value of a first coordinate on the target.

According to an aspect of the invention, an electronic device system includes a first device that executes a first processing for a target, a second device that executes a second processing for the target at a predetermined operation position, and a detection unit that detects the position of the target. The first device includes a control data acquiring unit acquiring first control data with the operation position specified, a control data generating unit generating second control data, with the operation position in first control data corrected, on the basis of the detection result of the detection unit, and a first communication unit transmitting the second control data to the second device. The second device includes a second communication unit receiving the second control data, and a control unit executing the second processing at the corrected operation position on the basis of the second control data. The operation position is not limited to the value of the position representing the operation position. A movement amount, a distance, or the like may be used insofar as it can specify the operation position. A plurality of different values, for example, a direction and a movement amount, an angle and a distance, or the like, may be used in combination.

BRIEF DESCRIPTION OF THE DRAWINGS

The invention will be described with reference to the accompanying drawings, wherein like numbers reference like elements.

FIG. 7 is a data structure diagram showing ESC/P control data (print data).

FIG. 25 is a transaction diagram showing a processing when color measurement and label print are performed in a printing system.

DESCRIPTION OF EXEMPLARY EMBODIMENTS

First Embodiment

Figure 1:
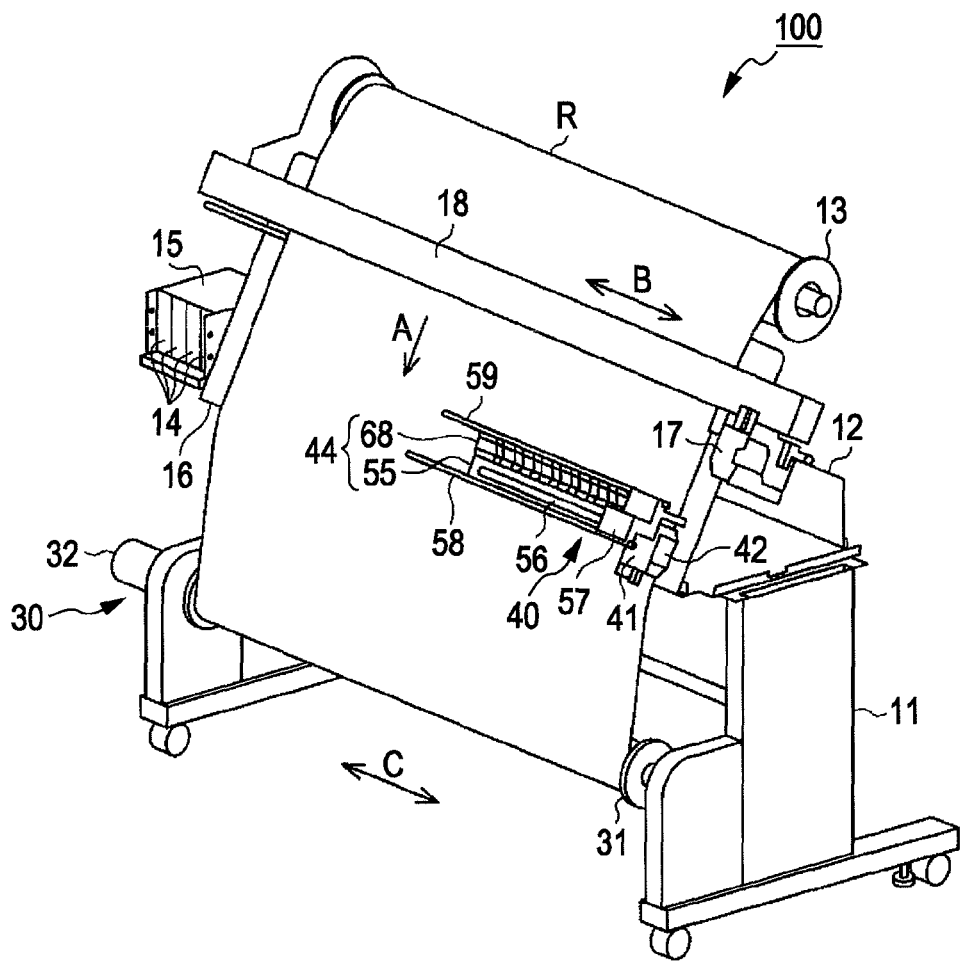
FIG. 1 is a schematic perspective view of a printer system according to a first embodiment of the invention.
Figure 2:
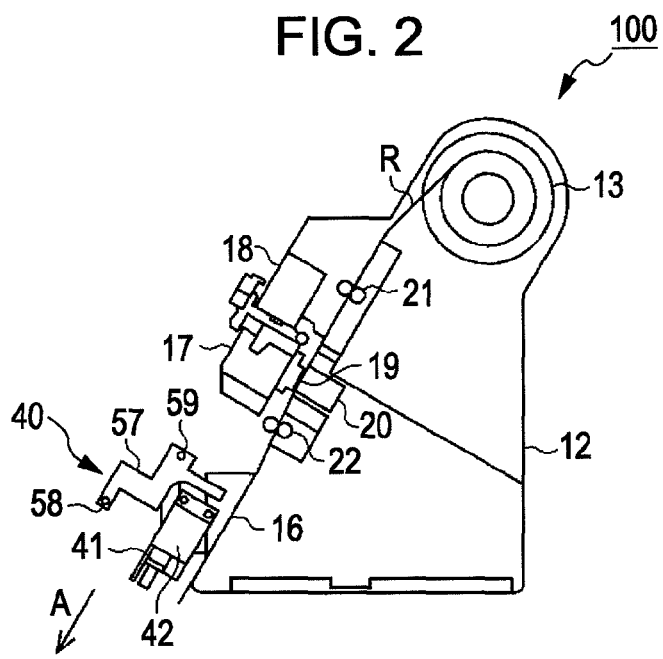
FIG. 2 is a schematic side sectional view of a printer system.

Hereinafter, a first embodiment of the invention will be described with reference to FIGS. 1 to 14. FIG. 1 is a perspective view of an ink jet type printer with an exterior case detached. FIG. 2 is a side sectional view of essential parts of the printer.

A printer system 100 serving as an electronic device system shown in FIG. 1 includes a printer 10 that is a large ink jet printer capable of recording on a large sheet, a winding device 30 for winding roll paper R printed by the printer 10, and a color measuring device 40 measuring a color of a color patch on the roll paper R printed by the printer 10. As a sheet serving as a target (recording medium), single sheets of paper as well as the roll paper R are used.

As shown in FIG. 1, the printer 10 is provided with a roll paper holder 13 at a side of a back portion and at an upper portion of a printer main body 12 supported by a stand 11. The roll paper holder 13 includes a spindle capable of holding the roll paper R, and a pair of flange-shaped roll paper press members. A cartridge holder 15 is provided at a portion of the printer main body 12 toward a left end, which is an example of a front surface. The cartridge holder 15 has a plurality of cartridge slots in which ink cartridges 14 of respective colors are individually accommodated.

The printer main body 12 is provided with a feed guide plate 16 to be inclined at approximately 60° downward toward the front side. The feed guide plate 16 guides the roll paper R held by the roll paper holder 13 downward toward a front portion serving as a transport direction A. A carriage 17 is provided in a transport path of the roll paper R. The carriage 17 is guided by a guide member 18, which is provided to extend along a widthwise direction of the printer main body 12, and reciprocates in a main scanning direction B.

As shown in FIG. 2, a recording head 19 is held by the carriage 17, and a platen 20 is provided at an obliquely downward position from the recording head 19 with a gap. The roll paper R that passes between the recording head 19 and the platen 20 is fed by rotation of a transport roller 21 having a pair of nip rollers on an upstream side of the transport direction, and a paper discharge roller 22 having a pair of nip rollers on a downstream side of the transport direction. Ink supplied from the ink cartridges 14 of the respective colors accommodated in the cartridge holder 15 is ejected from nozzles of the recording head 19 that is moving in the main scanning direction B, together with the carriage 17, and printing is performed on a portion of the roll paper R on the platen 20. Subsequently, the paper feed operation of the roll paper R and the recording operation by the recording head 19 are substantially alternately executed (both operations may be partially performed simultaneously), printing on the roll paper R is performed. Similarly, in the case of single sheets of paper, ink droplets are ejected from the recording head 19 onto the single sheets fed from a paper feeder (not shown) one by one. In the following description, a case in which paper to be used is the roll paper R will be described.

As shown in FIG. 1, the color measuring device 40 is provided on a downstream side in the transport direction A of the printer 10 from the carriage 17, and the winding device 30 is provided on a downstream side from the color measuring device 40. The winding device 30 includes a winding rotary shaft (not shown), a pair of flange-shaped roll paper press members 31 capable of being integrally rotatably attached to the winding rotary shaft, and a winding motor 32 for rotating the winding rotary shaft. The roll paper R after printing is wound around a pipe member (not shown) that rotates together with the winding rotary shaft of the winding device 30.

Figure 3:
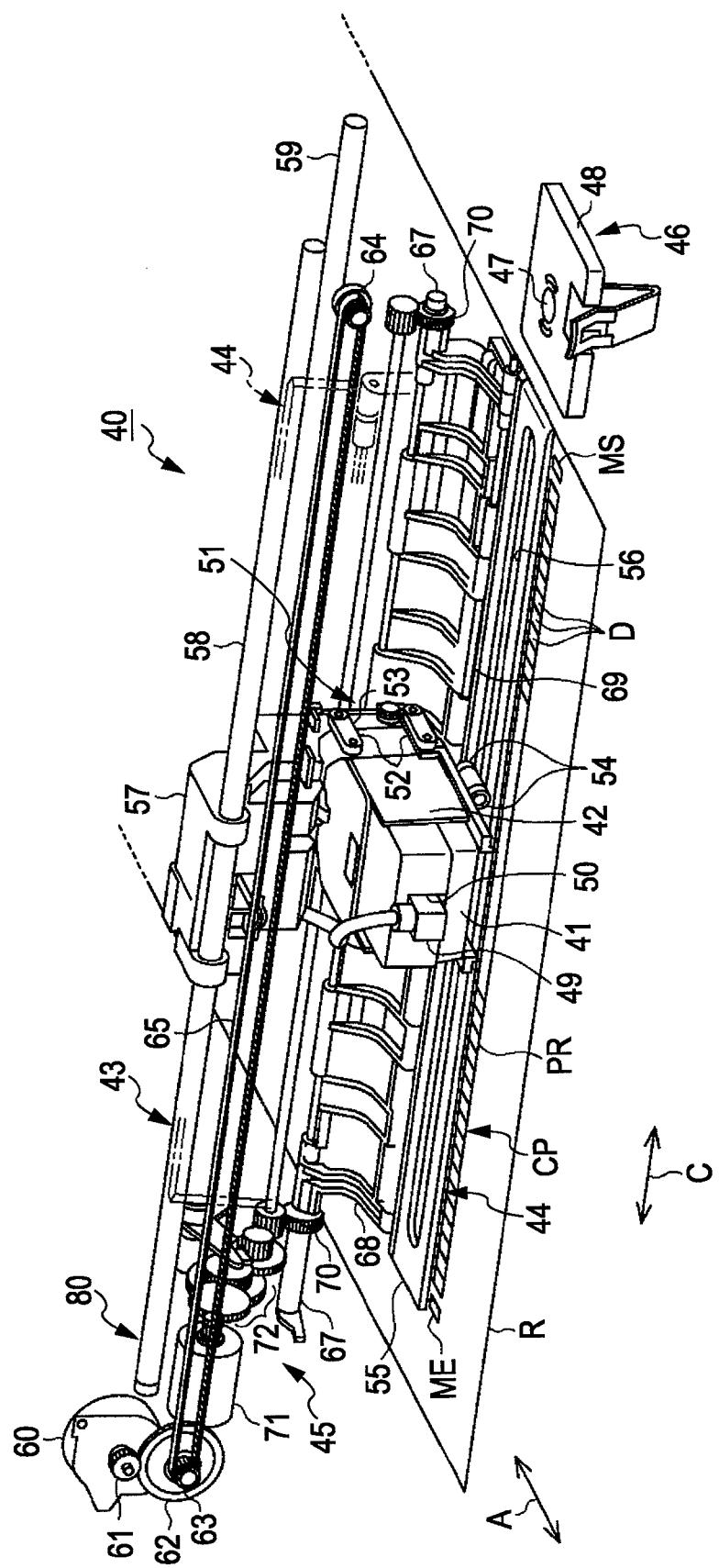
FIG. 3 is a perspective view of a color measuring device.

Next, the color measuring device 40 will be specifically described with reference to the drawing. FIG. 3 is a perspective view showing the main structure of the color measuring device.

The color measuring device 40 includes a color meter holder 42 holding a color meter 41, a carriage reciprocating unit 43, a press member 44, a rotation shift unit 45, and a white tile 47 and a tile holder 48 constituting a calibration unit 46 as a single body.

The color meter 41 is a measuring instrument that irradiates light onto a pattern for color measurement (hereinafter, referred to as "color patch CP") recorded on the roll paper R, and measures color information on the basis of light reflected by the color patch CP to obtain a correction value for color correction. As shown in FIG. 3, the color meter 41 has an angular boxlike exterior shape. The color meter 41 is provided with a socket 50 for connection of a connector wire 49. In this embodiment, a USB (Universal Serial Bus) cable and a USB connector are used as the connector wire 49 and the socket 50, respectively. This is because the plug-and-play function of USB communication ensures electrical connection of the color meter 41 any time when the printer system 100 is powered on, such that the color meter 41 performs color measurement.

The color information may include color information based on the Lab color mode in which a color value is defined by white balance, chromaticity, and brightness (L*). The monitor uses the RGB color mode, and the printer 10 uses a CMYK color mode. For this reason, the color information based on the Lab color mode measured by the color meter 41 may be converted into the RGB color mode or the CMYK color mode, and the correction value for the monitor or the printer 10 may be calculated and applied.

The color meter holder 42 in which the color meter 41 is accommodated so as to be attached to or detached from the color meter holder 42 through a one-touch operation is rotatably connected to a follow-up mechanism 51 through a parallel ring mechanism 53 having four rings 52 (in FIG. 3, only two rings are shown). For this reason, if the color meter holder 42 rotates through the parallel ring mechanism 53, the color meter 41 held by the color meter holder 42 can be changed in posture. Four running wheels 54 formed by, for example, bearings are attached to the lower surface of the color meter holder 42 to be freely rotatable.

The running wheels 54 comes into rolling contact with a part of the surface (upper surface) of the press plate 55 so as to straddle a long hole 56, which is formed in the press member 44 to extend in a longitudinal direction with respect to a press plate 55, that is, in a column direction C of a color measurement pattern described below (identical to the main scanning direction B).

The carriage reciprocating unit 43 is a unit that causes the color meter 41 held by the color meter holder 42 to reciprocate in the column direction C of the color patch CP. Specifically, the carriage reciprocating unit 43 includes a color measurement carriage 57 that is connected to the color meter holder 42 through the follow-up mechanism 51 and reciprocate together with the color meter 41, two guide shafts that guide the color measurement carriage 57 and have a primary shaft 58 and a secondary shaft 59, and a color measurement carriage motor 60 that is disposed at a return position to serve as a driving source when the color measurement carriage 57 reciprocates. The carriage reciprocating unit 43 also includes a pinion gear 61 that is attached to an output shaft of the color measurement carriage motor 60, a transfer gear 62 that is meshed with the pinion gear 61, a driving pulley 63 that is formed integrally with the transfer gear 62, a driven pulley 64 that is provided at a home position, and an endless timing belt 65 that is wound between the driving pulley 63 and the driven pulley 64, a part of the timing belt being engaged with the color measurement carriage 57.

The follow-up mechanism 51 is a mechanism that allows the running wheels 54 provided at the lower surface of the color meter holder 42 to constantly ground on the press plate 55 and to run. The follow-up mechanism 51 ensures smooth movement between the tile holder 48 constituting the calibration unit 46 and the press plate 55. Specifically, the follow-up mechanism 51 includes the above-described parallel ring mechanism 53 and a pressurization torsion coil spring.

The press member 44 is a member that rotates so as to take a press posture (a position indicated by a solid line in FIG. 3) to press the surface of the roll paper R with the color patch CP recorded thereon during color measurement and a retracted posture (a position indicated by a two-dot-chain line in FIG. 3) to spring upward and allow the roll paper R to be transported while color measurement is not performed. Specifically, the press member 44 includes a rotation lever 68 that rotates at approximately 90° around a rotational shaft 67, which is provided integrally therewith, the above-described press plate 55 that is rotatably connected to a rotational free end of the rotation lever 68 through a rotational pin 69, a press plate support spring (not shown) that is provided between the rotation lever 68 and the press plate 55, and a press plate pressurizing spring (not shown). With the operation of the press plate support spring and the press plate pressurizing spring, the entire lower surface of the press plate 55 is brought into close contact with the surface of the roll paper R tight. In this case, a reactive force of the press plate pressurizing spring to return to the original shape is applied to the press plate 55. Thus, the surface of the roll paper R is reliably held by a strong press force.

The rotation lever 68 is a curved plate-shaped lever extending in the column direction C of the color measurement pattern, and the rotational shaft 67 is formed near a rotational base end integrally with the rotation lever 68 so as to protrude left and right outward. Fan gears 70 with teeth formed at approximately 90° are provided on the left and right sides of the rotational shaft 67. The press plate 55 is a flat plate-shaped member extending in the column direction C of the color patch CP. At the center of the upper surface of the press plate 55, the above-described long hole 56 extending in the column direction C of the color patch CP is formed so as to pass through the press plate 55 over the press surface (lower surface) of the press plate 55.

Ribs are formed at the lower surface of the press plate 55 so as to protrude downward only from the periphery of the long hole 56 and the periphery of the press plate 55. The ribs are brought into contact with a blank portion, which is a space portion between a plurality of color patches CP. Thus, the press plate 55 can press the surface of the roll paper R without coming into contact with the color patches CP of each column for profile creation.

The rotation shift unit 45 is a unit that switches between the press posture and the retracted posture of the press member 44. Specifically, the rotation shift unit 45 includes a paper push motor 71 serving as a driving source, and a gear wheel train 72 for transmitting rotation of the paper push motor 71 to the fan gears 70.

The calibration unit 46 is formed by the tile holder 48 with the white tile 47 held. The white tile 47 is a tile that is formed of ceramics to execute calibration of the color meter 41 while color measurement is not performed. The white tile 47 is detachably held by the tile holder 48. The tile holder 48 with the white tile 47 held is provided at the home position of the carriage reciprocating unit 43 on a lateral side of the transport path of the roll paper R with the color patch CP recorded thereon. While color measurement is not performed, that is, the color measurement carriage 57 is positioned at the home position, the color meter 41 covers the upper surface of the white tile 47 so as to prevent dust from being stuck to the upper surface of the white tile 47.

Figure 4:
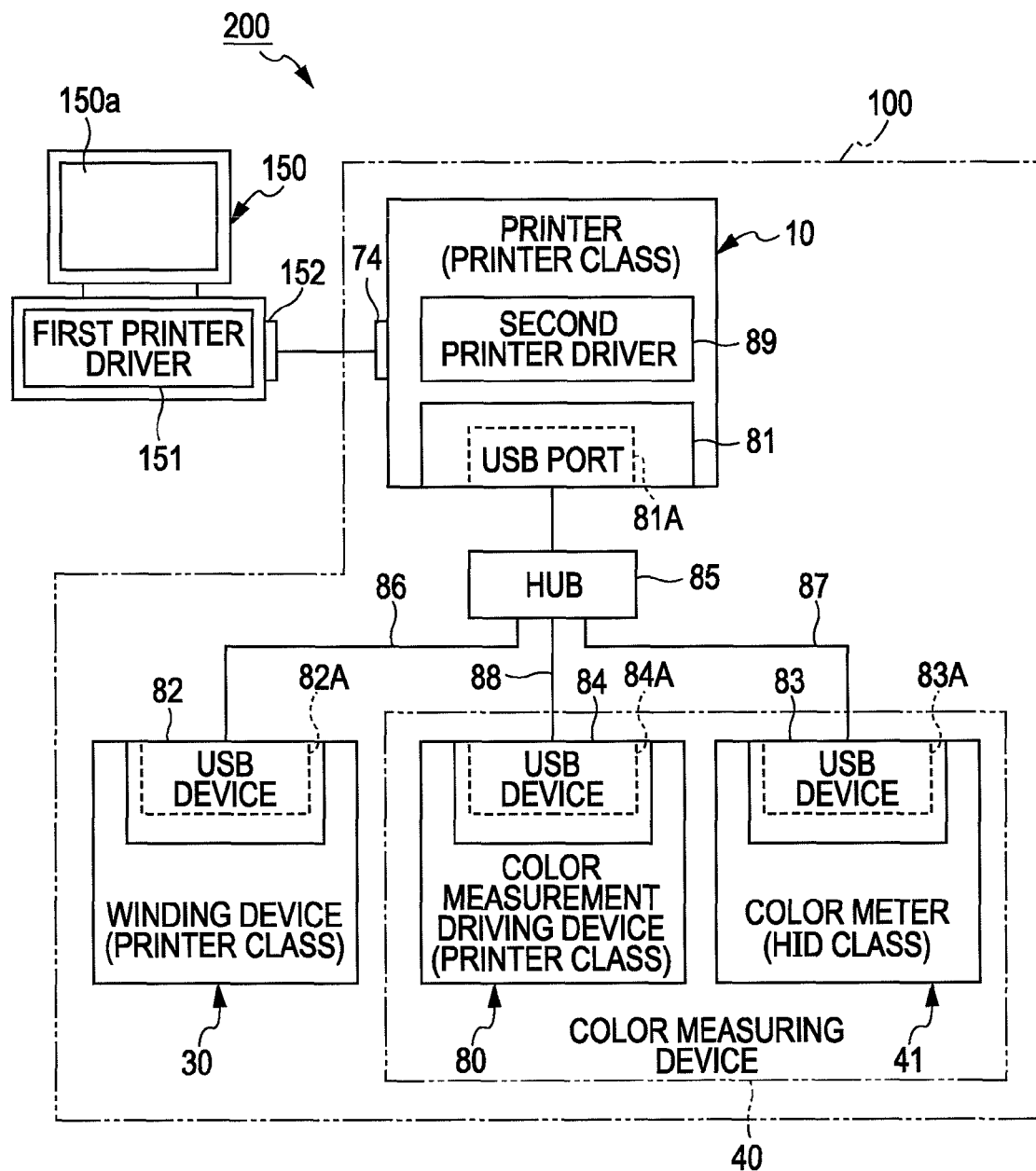
FIG. 4 is a block diagram concerning main communication of a printing system.

FIG. 4 is a block diagram showing the electrical configuration concerning communication in the printing system including such a printer system 100.

A printing system 200 includes the printer system 100, and a host apparatus 150 communicably connected to the printer system 100. The host apparatus 150 includes, for example, a personal computer or the like. The host apparatus 150 is provided with, for example, a first printer driver 151, which is constructed by installing software for a printer driver. A communication section 152 of the host apparatus 150 is connected to a communication section 74 of the printer 10 constituting the printer system 100 through a communication cable 75. Communication between the communication sections 152 and 74 is based on, for example, IEEE 1284.4 (hereinafter, simply referred to as "D4") communication or USB communication.

The printer 10 is communicably connected to the winding device 30 and the color measuring device 40. The color measuring device 40 of this embodiment includes the color meter 41 and the color measurement driving device 80 that use different control systems. The color measurement driving device 80 includes the rotation shift unit 45 serving as a driving system of the press member 44, and the carriage reciprocating unit 43 serving as a driving system of the color measurement carriage 57. The color measurement driving device 80 controls the color measurement carriage motor 60 and the paper push motor 71. In this embodiment, the printer 10 constitutes a first device, and the winding device 30 and the color measurement driving device 80 constitute a second device.

The printer 10 includes a host communication section 81 that has a USB host controller (hereinafter, referred to "USB host 81A") functioning as a host through USB communication. The winding device 30, the color meter 41, and the color measurement driving device 80 include device communication sections 82 to 84 having USB device controllers (hereinafter, referred to as "USB devices 82A to 84A) functioning as devices through USB communication, respectively. A hub 85 is connected to the host communication section 81 of the printer 10, and the device communication section 82 of the winding device 30, the device communication section 83 of the color meter 41, and the device communication section 84 of the color measurement driving device 80 are connected to the hub 85 through USB cables 86 to 88, respectively. During USB communication, the USB host 81A requests the USB devices 82A to 84A to send the device classes to which the devices belong. The USB devices 82A to 84A send the device classes in response to the request. In this embodiment, the winding device 30 and the color measuring device 40 are optional devices (auxiliary device) of the printer 10 and connected to the printer 10 through the USB cables 86 to 88, respectively, as occasion demands.

For example, if a user who wants printing operates an input device 162 (see FIG. 5) to print an image or text displayed on a monitor 150a of the host apparatus 150, and the host apparatus 150 accepts the print instruction, image data or text data to be printed is sent to the first printer driver 151. The first printer driver 151 generates print data (first control data) in a data format (print command format) using a print command, which is being analyzable by the printer 10, on the basis of image data or text data to be printed, and transmits print data to the printer 10 through communication between the communication sections 152 and 74. In this case, the communication section 152 of the host apparatus 150 requests the device class of the other side by polling with the communication section 74 of the printer 10, and establishes communication under the condition that a response indicative of a "printer class" (specific class) capable of analyzing print data (print command) is received.

For example, if communication between the host apparatus 150 and the printer 10 is based on USB communication, the USB host, which is the communication section 152 of the host apparatus 150, requests the USB device, which is the communication section 74 of the printer 10, to send information for identifying the device class. Then, the communication section 74 sends a response indicative of the "printer class" set in the printer 10 for the request, and the USB host establishes communication with the USB device. For this reason, print data (first control data) generated by the first printer driver 151 in the host apparatus 150 can be transmitted to the printer 10.

As shown in FIG. 4, the printer 10 of this embodiment includes a second printer driver 89 serving as a device driver, and controls the winding device 30 and the color measurement driving device 80 by using print data including the print command. The second printer driver 89 is a simple printer driver that is constructed by combining a necessary function of the first printer driver 151, such as a command generation function or a print data generation function, and other necessary functions. In this embodiment, as the print command used in the first printer driver 151 and the second printer driver 89, for example, ESC/P (Epson Standard Code for Printer), which is the standard command of the serial printer, is used. Of course, other print commands may be used. Alternatively, the second printer driver 89 may be a so-called standalone type printer that includes the same image data processing section as an image data processing section 161. In this case, image data of an RGB coordinate system input through a storage medium, such as a memory card or the like, inserted into the printer 10 can be converted into print image data, and can be printed even though the printer is not connected to the host apparatus 150.

The second printer driver 89 controls the winding device 30 and the color measurement driving device 80 by using ESC/P. For this reason, in order for the USB host 81A of the printer 10 to establish communication with the USB devices 82A and 84A of the winding device 30 and the color measurement driving device 80, the USB devices 82A and 84A need to transmit a response indicative of a "printer class" for the request to send the device class from the USB host 81A. In this embodiment, as shown in FIG. 4, with respect to the winding device 30 and the color measurement driving device 80, the "printer class" is set as the device class.

Specifically, a model number representing a model of printer (for example, the model number of the printer 10 or the model number of another printer) is set as a device ID. The model number is sent in response to the request to send the device ID from the USB host 81A, and then the USB host 81A recognizes the "printer class" from the model number (device ID). For this reason, print data (second control data) generated by the second printer driver 89 can be transmitted to the winding device 30 and the color measurement driving device 80 through communication between the USB host 81A and the USB devices 82A and 84A.

Meanwhile, as shown in FIG. 4, with respect to the color meter 41 that is not controlled by print data, an "HID (Human Interface Device) class" is set as the device class. In this embodiment, a command analyzing section that can analyze print data is not incorporated into the color meter 41 manufactured and placed on the market by the color meter manufacturer. Accordingly, the color meter 41 is not controlled by using print data. Of course, the command analyzing section that can analyze the print command (ESC/P) may be incorporated into the color meter 41, thereby constituting the second device.

Figure 6:
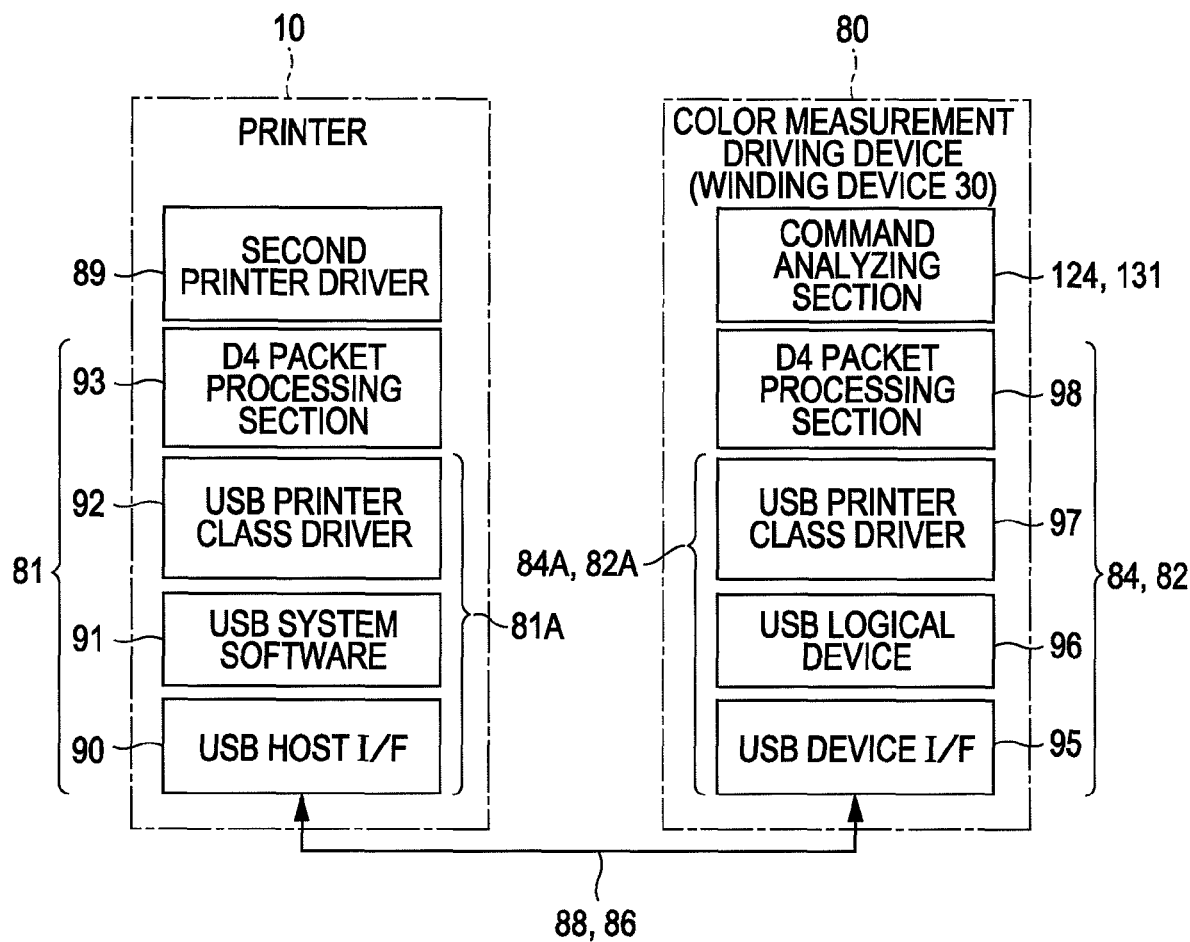
FIG. 6 is a schematic view showing a layered structure of a communication stack.

FIG. 6 is a block diagram showing a layered structure (protocol stack) of communication protocols concerning communication between the printer 10 and the color measurement driving device 80 or the winding device 30. The color measurement driving device 80 and the winding device 30 use the same communication protocols concerning communication with the printer 10. Thus, in the following description, a case in which the second device is the color measurement driving device 80 will be described.

The host communication section 81 of the printer 10 includes a USB host interface (hereinafter, referred to as "USB host I/F 90"), USB system software 91, a USB printer class driver 92, a D4 (abbreviation of "IEEE 1284.4") packet processing section 93 in that order from below. The second printer driver 89 is located above the host communication section 81. The device communication section 84 (82) of the color measurement driving device 80 includes a USB device interface (hereinafter, referred to as "USB device I/F 95"), a USB logic device 96, a USB printer class driver 97, and a D4 packet processing section 98 in that order from below. A command analyzing section 124 (131) (also shown in FIG. 5) is located above the device communication section 84 (82).

As understood from the drawing, the USB printer class drivers 92 and 97 perform data communication by using a so-called "D4 packet" (packet structure based on IEEE 1284.4). This is because, in the printer class from among the standard USB device classes, the D4 packet is used as the higher-order protocol.

The communication control stack using no D4 packet (an architecture from an application layer to a physical layer) is the standard of the OS (Operating System) of the host apparatus 150 or the printer 10. Accordingly, when device classes other than the printer class are used for communication between the printer 10 and the optional device (the second device), it is necessary to construct a new communication control stack. In contrast, in this embodiment, the existing communication control stack using the D4 packet for communication between the first printer driver 151 of the host apparatus 150 and the printer 10 is also used for communication between the printer 10 and the optional devices.

The communication control stack using the D4 packet is constructed on an assumption that print data is transferred. Accordingly, when the USB host 81A establishes communication with the USB devices 82A and 84A, the device class of the other side needs to be set as the "printer class". The USB host 81A requests the device on the other side to send the device ID, and if it is determined from the content of the device ID that the device class is the "printer class", establishes communication. For this reason, with respect to the color measurement driving device 80 and the winding device 30, as described above, the device ID representing the model of the printer is set. An ID unique to each device for individually identifying the devices is also set separately.

As shown in FIG. 6, first, physical communication between the USB host I/F 90 and the USB device I/F 95 is performed by connecting the USB cable 88 (86). The next level is communication by system software of the host (printer 10) (the device driver level of the OS). In this case, logical connection of communication, called a "default pipe", is established between the host and the device. Initialization of system settings, and communication for various kinds of setup control when the USB cable is connected, that is, configuration (setup) is performed by control transfer using the default pipe (bidirectional communication), and setup information concerning how to use the device is exchanged between the host and the device. The host requests the device to send the setup information, such as the number of pipes to be used, a transfer mode (bulk transfer or interrupt transfer), or the like, and sets the use condition of the device on the basis of the setup information from the device. In this embodiment, in the case of the "printer class", bulk transfer is set, and in the case of the "HID class", interrupt transfer is set.

The next level is a level of application at which a plurality of "pipes", which are logical communication lines between the USB printer class drivers 92 and 97, are connected. The pipes are logical communication lines, and real communication is performed on a single USB cable 88 (86) in a time-division manner.

A next level is a level of application of D4 at which if a logical communication line between the D4 packet processing sections 93 and 98 is established, packet transfer based on a communication protocol for D4 is performed between the D4 packet processing sections 93 and 98.

Figure 5:
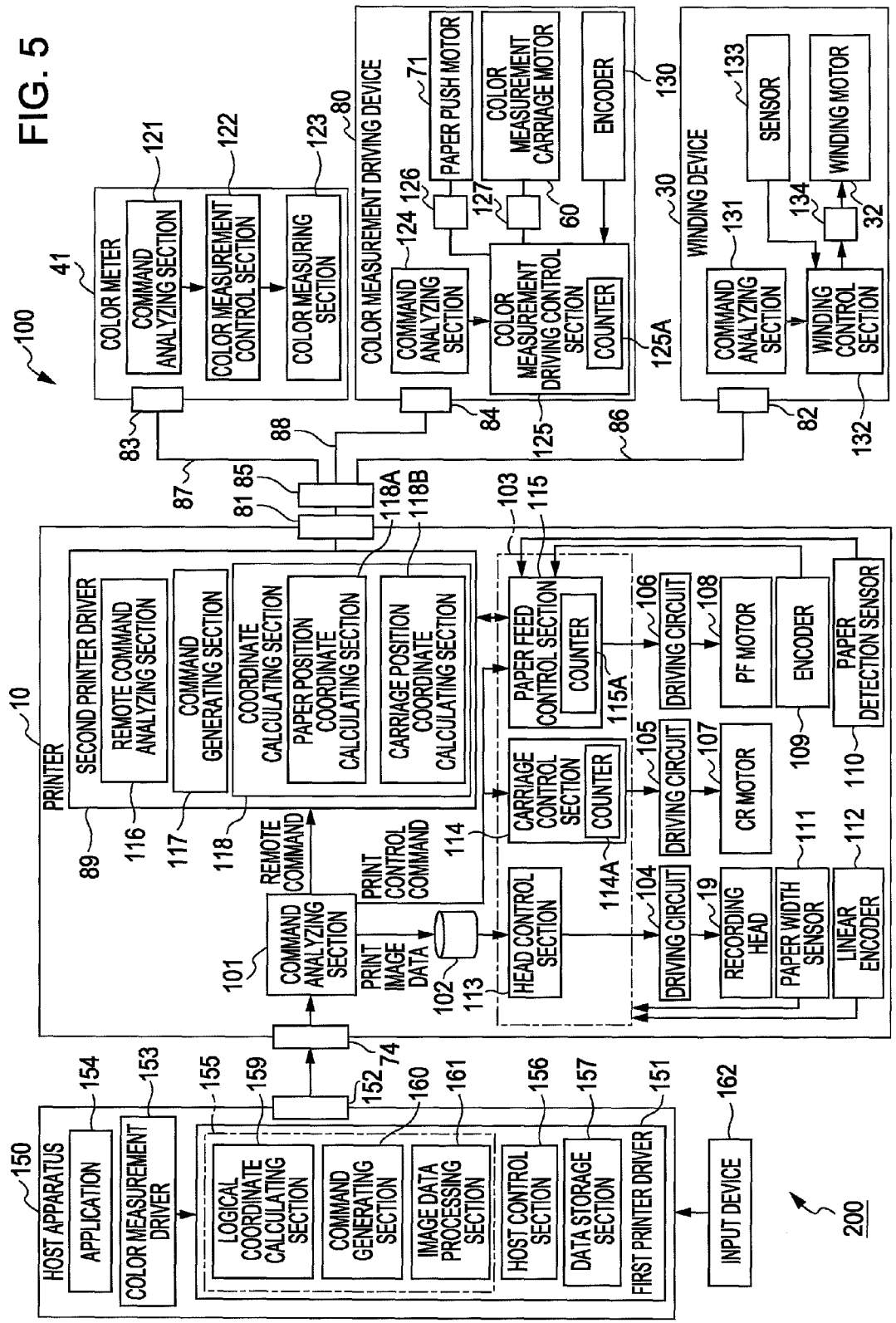
FIG. 5 is a block diagram showing the electrical configuration of a printing system.

FIG. 5 is a block diagram showing the electrical configuration of the printing system. The host apparatus 150 includes the first printer driver 151, a color measurement driver 153, and an image display application 154. The first printer driver 151 and the color measurement driver 153 are constructed by installing a program on the host apparatus 150. For example, the first printer driver 151 is provided by the printer manufacturer, and the color measurement driver 153 is provided by the color meter manufacturer. The first printer driver 151 includes a print data generating section 155 generating print data, a host control section 156, and a data storage section 157. The print data generating section 155 includes a logical coordinate calculating section 159, a command generating section 160, and an image data processing section 161. An input device 162 is connected to the host apparatus 150. The input device 162 includes, for example, a keyboard, a mouse, or the like.

The color measurement driver 153 has a setup screen display function to display a setup screen for color measurement setup, a color patch pattern setup function, and a color patch print position setup function. The color measurement driver 153 also has a function to display a paper range including an image displayed by the application 154 on the setup screen and to set a color patch in a desired area within the paper range.

Figure 9:
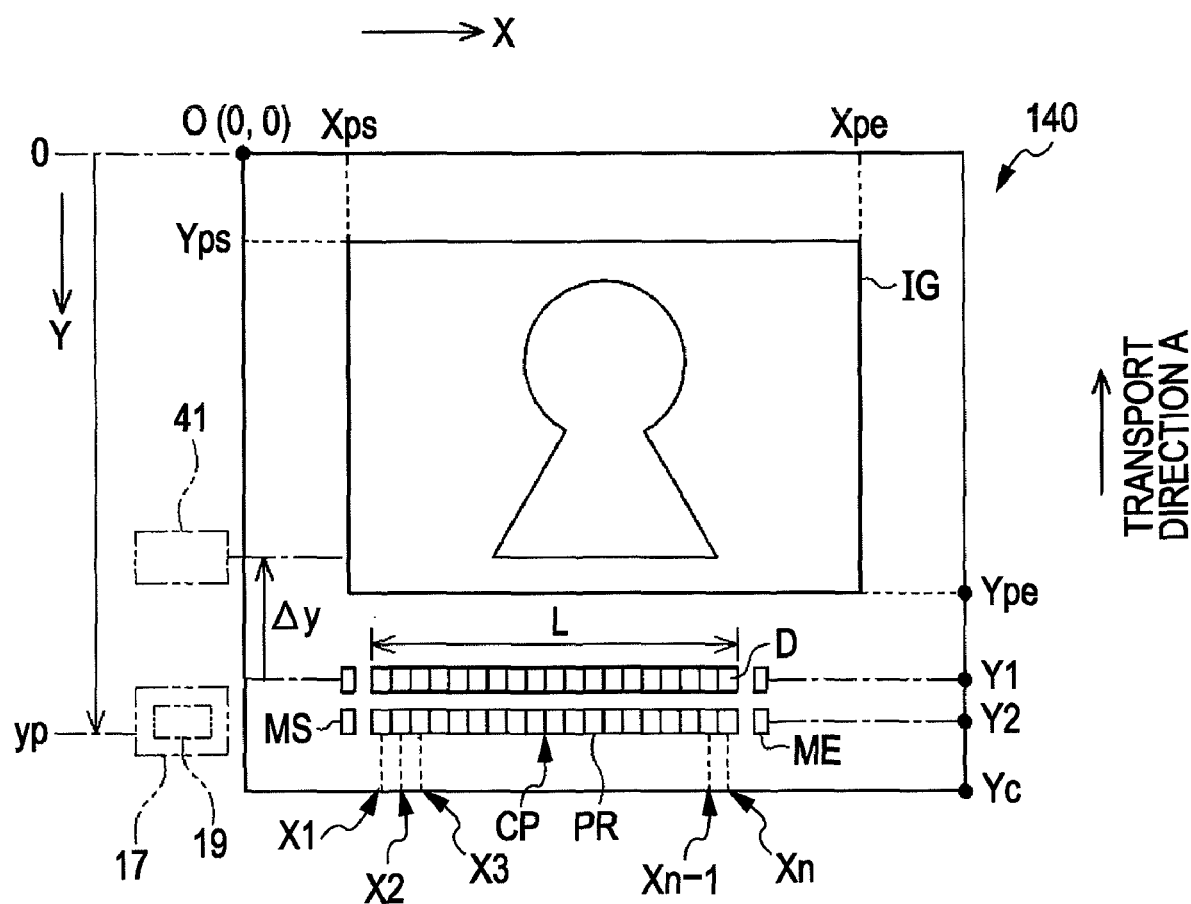
FIG. 9 is a schematic view showing a setup screen for color measurement.

FIG. 9 schematically shows a setup screen for color measurement that is displayed on the monitor 150a of the host apparatus 150 by the color measurement driver 153. A setup screen 140 is displayed when a user operates the input device 162 of the host apparatus 150 to activate the color measurement driver 153. The user can operate the input device 162 to display a print image IG (image) on the setup screen 140, and also to select a color pattern of the color patch CP and set the position of the color patch CP. For example, the user selects a desired pattern, the number of colors, color, and the number of color patch columns on a color patch selection window, and specifies the print position of the selected color patch CP with a mouse, for example, to set the color patch CP at a desired position, such as a blank area having no print image IG. The print position of the specified color patch is acquired by the color measurement driver 153 in the host apparatus 150 as a logical coordinate, which is represented by a relative coordinate with respect to the reference point of the paper area. Specifically, the logical coordinate is represented by the relative coordinate with an upper left corner of the paper area (the entire range corresponding to one page) in FIG. 9 as the origin (0,0) and X and Y coordinates in the paper width direction (the main scanning direction B) (the right direction of FIG. 9) and a direction opposite the transport direction (the down direction of FIG. 9). For example, as shown in FIG. 9, with respect to the print image IG, the upper left cornet is represented by the coordinate (Xps,Yps), and the lower right corner is represented by the coordinate (Xpe,Ype).

Each of the color patches CP includes a patch column PR having arranged a plurality of unit patches D, and start position mark MS and end position mark ME disposed at a predetermined interval on both sides of the patch column PR in the column direction. In the example of FIG. 9 where two columns of color patches CP are arranged, the color patches CP are represented by the Y coordinates Y1 and Y2, and the X coordinates (X1, x2, . . . , Xn−1, and Xn) concerning N unit patches D constituting each patch column PR in order from the home position (the left side in FIG. 9) of the color measurement carriage 57 (see FIG. 3). The logical coordinate values concerning the color patches CP are used to decide a color measurement point when the color meter 41 moves along with the color measurement carriage 57 to perform color measurement for the unit patches D. The coordinate of each unit patch D represents, for example, the center point of each unit patch D.

For example, the Y coordinate value of the color patch CP is used as a target position when the roll paper R is fed to position at a color measurement position. The X coordinate value of each unit patch D constituting the color patch CP is used as a target position when the color measurement carriage 57 is positioned in the patch column direction C such that the color measurement point of the color meter 41 is aligned with the center point of each unit patch.

If the length of the patch column PR (hereinafter, referred to as "patch column length L") in the column direction C and the number of unit patches D (hereinafter, referred to as "patch number N") constituting the patch column PR are known, the pitch (=L/N) of the unit patches D can be calculated. In addition, if the X coordinate "X1" of the leading unit patch D is known, the color measurement points of other unit patches D can be calculated. For this reason, data concerning the color patch CP includes information concerning the patch column length L and the patch number N. The print image IG, image data of the color patch CP, the logical coordinates, and information concerning the patch column length L and the patch number N of the color patch CP are sent from the color measurement driver 153 to the first printer driver 151. In FIG. 9, the Y coordinate "Yc" representing the end (in the drawing, the lower end) of the paper area in the transport direction A is used to decide a cut position when the roll paper R is cut with a cutter (not shown). The color measurement driver 153 generates a color measurement command controlling the color meter 41, and sends the color measurement command to the first printer driver 151. Data that is input to the host apparatus 150 by using the input device 162 corresponds to an input value.

The first printer driver 151 shown in FIG. 5 performs a processing to generate print data including a print command on the basis of the image displayed on the monitor 150a by the application 154, and image data of the color patch CP and logical coordinate data set by the color measurement driver 153. In this embodiment, control of the winding device 30, the color meter 41, and the color measurement driving device 80, as well as printing control of the printer 10, is instructed on the basis of print data. For this reason, in order to generate print data, the first printer driver 151 includes the logical coordinate calculating section 159, the command generating section 160, and the image data processing section 161 described above.

The command generating section 160 generates a command using the printer description language (printer control code). In this embodiment, as described above, an ESC/P command is used as the printer description language for the serial printer. Of course, when the printer 10 is a page printer, ESC/Page may be used as the printer description language. The details of a processing in the command generating section 160 will be described below in detail.

The logical coordinate calculating section 159 calculates a value to be stored in the command created by the command generating section 160 on the basis of the print image IG input and specified by the user's operation of the input device 162 on the setup screen 140 for color measurement, the logical coordinate of the color patch CP defining the print area, or the logical coordinate of the color measurement point of the color patch CP. Examples of the value to be calculated include a paper feed amount to the print position of an image to be printed or the color patch CP, a paper feed amount to a color measurement position where the color meter 41 can perform color measurement for the color patch CP, an operation position (a color measurement position in the patch column direction C), which is the target position of the color measurement carriage 57 at the time of color measurement, and the like. The values are calculated as the values, such as the drive amount or the target position of a motor to be controlled and the like.

The image data processing section 161 converts image data for display into image data for printing. Specific examples include resolution conversion to convert display resolution into printer resolution, color conversion to convert image data from the RGB color system to the CMYK color system (respective colors of cyan, magenta, yellow, and black) that can be expressed by the printer 10, halftoning to change the gray-scale value of image data to a gray-scale value that can be expressed by the printer, data output sequence adjustment (for example, micro weave) to rearrange the output sequence of data to the recording head 19 in accordance with the ink droplet ejection sequence based on a print mode, and the like. Color conversion is performed by using a color conversion table. With respect to halftoning, a known method, such as so-called error diffusion, dithering, or the like, may be used. The contents of such processing are known, and thus further descriptions will be omitted. Image data that is subjected to an image processing for printing is called print image data.

The first printer driver 151 has a function to display a setup screen for input and setup of a print condition on the monitor 150a of the host apparatus 150. The user can operate the input device 162 on the setup screen to set the print condition. The print condition includes paper type, paper size, color/monochrome, layout (set margin, print with no border, and the like), print mode (for example, high-quality print mode, high-speed print mode, and the like), and the like. Image processing, such as resolution conversion, color conversion, halftoning, data output sequence adjustment, and the like, is performed in accordance with the contents of the print condition.

The first printer driver 151 generates print data (ESC/P control data) including various commands generated by the command generating section 160 and print image data generated by the image data processing section 161. The structure of print data that is generated by the first printer driver 151 will be described. FIG. 7 shows the structure of print data PD that is generated by the first printer driver 151. In the following description, a symbol representing a command is not interpreted to match with a real print command, and for convenience of explanation, a simple symbol is used. As shown in FIG. 7, print data PD has a header HD and a body BD. In the header HD, header information, such as the data size of the body BD and the like, is described. In the body BD, ESC/P control data SD is stored.

As shown in FIG. 7, ESC/P control data SD stores various control commands or control codes, print image data, and the like between a job start code (in FIG. 7, represented by "JS") and a job end code (in FIG. 7, represented by "JE"). FIG. 7 shows a state where almost all kinds of commands or data that can be stored as data are stored, but actually, some commands or data of them are stored to constitute print data.

As shown in FIG. 7, ESC/P control data SD includes a print control command PCC, print image data PGD, a paper feed control command PFC, a winding control command WCC, a color measurement driving control command CMDC, and a color measurement control command CMC. Usually, the packets of print data, in which some commands or data is stored, are rotated and transmitted multiple times. In this case, the job start code "JS" is stored in print data to be initially transferred during one job, and the job end code "JE" is stored in print data to be finally transferred during the job. In ESC/P control data SD, the control commands or print image data is divided and stored for a plurality of modes. The modes include a character mode, a graphic mode, and a remote mode. In ESC/P control data SD, control codes for transition of the respective modes, that is, a character mode transition code "MC", a graphic mode transition code "MG", and a remote mode transition code "MR" are incorporated. Subsequent to each mode transition code, a command to be analyzed in the corresponding mode is stored.

That is, the print control command PCC is stored subsequent to the character mode transition code "MC", and print image data PGD (head control data) is stored subsequent to the graphic mode transition code "MG". The print control command PCC includes, for example, page information for specifying a print start position/end position with respect to the roll paper R or positional information in the transport direction for specifying the paper feed amount of the roll paper R in accordance with the number of nozzles of the recording head 19 or the like. Print image data PGD (raster data) is data for controlling driving of the recording head 19 to eject ink droplets. As described above, the print control command PCC and print image data PGD are data for printing control of the printer 10.

A remote command RC is stored subsequent to the remote mode transition code "MR". The remote command RC may be included in ESC/P control data for control other than printing control of the printer 10. In the printer 10, the remote command RC is generally provided so as to operate a maintenance device (not shown) to clean the nozzles of the recording head 19 or so as to perform operation control of a maintenance system to suppress nozzle clogging through regular idle ejection (flushing) during printing.

In this embodiment, the function of the remote command RC is used, and thus the command for control of the color measuring device 40 and the winding device 30 is stored as the remote command RC. That is, as shown in FIG. 7, the paper feed control command PFC, the winding control command WCC, the color measurement driving control command CMDC, the color measurement control command CMC, and the like are stored subsequent to the remote mode transition code "MR". In addition, a cleaning command, a flushing command, and the like (not shown) are also stored.

The paper feed control command PFC is a paper feed command that is used to feed the roll paper R to a color measurement position where the color patch CP is aligned with a color measurement spot of the color meter 41 in the transport direction A while color measurement is performed.

The winding control command WCC is a command that is used to control the winding motor 32 of the winding device 30. In this embodiment, the winding control command WCC is used to reversely drive the winding device 30 according to reverse rotation of the transport roller 21 and the paper discharge roller 22 when the roll paper R is fed backward in order to return the roll paper R to a next print start position after color measurement is completed.

A color measurement command that is used to control the color measuring device 40 is stored subsequent to a color measurement mode transition code "CM" for transition to a color measurement mode in the remote command RC, and as shown in FIG. 9, a color measurement driving control command CMDC and a color measurement control command CMC are stored subsequent to the color measurement mode transition code "CM". During the color measurement mode, the color measurement driving control command CMDC and the color measurement control command CMC are to be analyzed.

The color measurement driving control command CMDC is a command that is used to control the paper push motor 71 and the color measurement carriage motor 60 of the color measuring device 40. The color measurement control command CMC is a command that is used to control the color meter 41, and is described with control codes that are used by the color meter manufacturer. The color measurement control command CMC is delivered from the color measurement driver 153. Though not shown in FIG. 7, a mode end code (not shown) is stored at the end of the command for each mode.

The host control section 156 undertakes control in the first printer driver 151, and performs instruction for generation of print data to the respective sections 159 to 161, display control on the print condition setup screen, communication control (transmission instruction) for transmission of print data to the printer 10, decision of pertinence of the color condition on the basis of color measurement data from the color meter 41, setting of the color correction value, and the like. The data storage section 157 is a data storage area in which generated print data or the like is temporarily stored before transmission or color measurement data received from the color meter 41 is temporarily stored before decision or an arithmetic operation. Print data generated by the first printer driver 151 is transferred from the communication section 152 of the host apparatus 150 to the printer 10 through the communication section 74 in sequence in accordance with an instruction of the host control section 156.

Returning to FIG. 5, the electrical configuration of the printer system 100 will be described. As described above, the printer system 100 includes the printer 10, the winding device 30, and the color measuring device 40. The color measuring device 40 includes the color measurement driving device 80 and the color meter 41. As described with reference to FIG. 4, the host communication section 81 of the printer 10 is connected to the device communication sections 82 to 84 of the three devices 30, 41, and 80 through the hub 85 and the three USB cables 86 to 88.

As shown in FIG. 5, the printer 10 includes a command analyzing section 101 (ESC/P analyzing section) serving as a first analyzing unit, a second printer driver 89 (control driver), a memory 102 (image buffer), a control section 103 serving as a first control unit, driving circuits 104 to 106, a recording head 19, a CR motor 107, a PF motor 108, an encoder 109, a paper detection sensor 110, a paper width sensor 111, and a linear encoder 112. The control section 103 includes a head control section 113, a carriage control section 114, and a paper feed control section 115.

The second printer driver 89 is a simple printer driver and, similarly to the first printer driver 151, has a function to generate print data of ESC/P. The second printer driver 89 is constructed to have some of the functions of the existing first printer driver 151 by using the existing first printer driver 151. The second printer driver 89 includes a remote command analyzing section 116, a command generating section 117, and a coordinate calculating section 118. However, print data that is generated by the second printer driver 89 is not used for printing, but it is used for control of the color measurement operation and the winding operation.

The command analyzing section 101, the second printer driver 89, and the control section 103 include, for example, a CPU, an ASIC (Application Specific IC), a ROM, a RAM, and the like. In this example, the command analyzing section 101 is formed by hardware, for example, an ASIC, and the second printer driver 89 and the control section 103 are formed by software, which is implemented by a program stored in the ROM to be executed on the CPU. Of course, all of them may be formed by software, hardware, such as an integrated circuit (for example, a custom IC including an ASIC or the like), or a combination of software and hardware (in this case, an arbitrary combination may be selected).

The command analyzing section 101 analyzes print data (ESC/P control data), and if a mode transition code is detected from print data, changes the operation mode to a mode specified by the corresponding code (that is, activates an analysis module according to the mode). There are three modes of the character mode, the graphic mode, and the remote mode. A command to be analyzed is decided for each mode. The command to be analyzed for each mode is analyzed and sent to a destination according to the mode at that time. For example, in the case of the character mode, the print control command PCC is analyzed and sent to the control section 103. In the case of the graphic mode, print image data PGD is analyzed and sent to the memory 102. In the case of the remote mode, the remote command is analyzed and sent to the second printer driver 89. In this case, the commands other than the command to be analyzed in each mode are discarded.

Hereinafter, the analysis processing of the command analyzing section 101 will be described. The command analyzing section 101 analyzes print data PD (ESC/P control data) shown in FIG. 7. If a mode transition code is present in ESC/P control data SD of the body BD of print data PD, the command analyzing section 101 changes the operation mode to a mode specified by the code. A command to be analyzed is changed according to the modes, and the command analyzing section 101 analyzes only a command that can be handled in the corresponding mode and discards the commands or data that is not handled in the corresponding mode. That is, if the character mode transition code "MC" is present, the command analyzing section 101 changes the operation mode to the character mode, analyzes only the print control command PCC, sends the print control command PCC to the control section 103, and discards other data (commands or the like). If the graphic mode transition code "MG" is present, the command analyzing section 101 changes the operation mode to the graphic mode, analyzes only print image data PGD, sends print image data PGD to the memory 102, and discards other data. If the remote mode transition code "MR" is present, the command analyzing section 101 changes the operation mode to the remote mode, analyzes only the remote command RC, sends the remote command RC to the second printer driver 89, and discards other data.

Specifically, if the character mode transition code MC is present, the command analyzing section 101 changes the operation mode to the character mode, and analyzes the print control command PCC (see FIG. 7). As the result of analysis, if the print control command PCC (for example, including a character code, such as ASCII code or the like) is present, the print control command PCC is sent to the control section 103. The control section 103 converts the character code into image data by using a character generator (not shown) and stores image data in the memory 102. The head control section 113 drives the recording head 19 in synchronization with an ink ejection timing signal based on image data (raster data) read from the memory 102 by one pass (the drive amount of the carriage 17 in the main scanning direction B every time), and ejects ink droplets from the nozzles of the recording head 19 with a predetermined timing while the carriage 17 is traveling in the main scanning direction B. The control section 103 sends a carriage drive command (hereinafter, referred to as "CR drive command") to the carriage control section 114, and sends a paper feed command to the paper feed control section 115.

Meanwhile, if the graphic mode transition code MG is present, the command analyzing section 101 changes the operation mode to the graphic mode, and analyzes print image data PGD (see FIG. 7). As the result of analysis, if print image data PGD is present, print image data PGD is sent to the memory 102. The control section 103 calculates a start position and a stop position during one pass of the carriage 17 based on print image data PGD read from the memory 102 by one pass. Then, if a carriage activation time for a next pass comes, the control section 103 sends the CR drive command to the carriage control section 114, and instructs to activate the carriage 17. If a paper feed start time comes after printing in the previous pass ends, the control section 103 sends the paper feed command to the paper feed control section 115, and instructs a paper feed operation. The paper feed operation used herein includes a paper feed operation, a paper feed operation during printing (narrow sense), and a paper discharge operation.

The paper feed control section 115 drives the PF motor 108 through the driving circuit 106 on the paper feed command and feeds the roll paper R by the amount as instructed. If the roll paper R is sent to a next print position, the carriage control section 114 drives the CR motor 107 through the driving circuit 105 on the basis of the CR drive command, and operates the recording head 19 in the main scanning direction B by one pass. During one pass, the head control section 113 drives the recording head 19 through the driving circuit 104 on the basis of print image data PGD. Then, ink droplets are ejected from the nozzles of the recording head 19, printing (recording) for one raster line is performed on the basis of print image data PGD.

The recording head 19 is provided with an ejection driving element for each nozzle. If the ejection driving element is driven by an application voltage of a predetermined waveform, ink droplets are ejected from the nozzles. As the ejection driving element, a piezoelectric vibrating element or an electrostatic driving element may be used. In addition, a heater for ink heating may be used. In this case, ink is film-boiled, and ink droplets are ejected from the nozzles by expansion of bubbles in the ink flow channel communicating with the nozzles.

If the remote mode transition command MR is present, the command analyzing section 101 changes the operation mode to the remote mode, analyzes the remote command RC as the command to be analyzed, and sends the analyzed remote command RC to the second printer driver 89. That is, in the remote mode, the command analyzing section 101 analyzes the remote command RC, and sends the paper feed control command PFC and the winding control command WCC to the second printer driver 89. The command analyzing section 101 analyzes the remote command RC, if the color measurement mode transition code "CM" is present, and changes the operation mode to the color measurement mode to send the color measurement driving control command CMDC and the color measurement control command CMC to the second printer driver 89.

The second printer driver 89 generates a new command based on the remote command, and transmits the new command in a print data format to control the color meter 41, the color measurement driving device 80, and the winding device 30. The remote command generated by the first printer driver 151 has a value specified by the logical coordinate system. For example, the value "Y" of the paper feed command "PF (Y)" is specified as the value of the logical coordinate system on the paper calculated by the logical coordinate calculating section 159. Therefore, even if the roll paper R is misaligned from the reference position on the printer 10, the second printer driver 89 generates a command specified by the value of the real coordinate system converted from the logical coordinate system, such that recording or color measurement can be accurately performed at a position on the roller paper R represented by the logical coordinate.

The logical coordinate is an ideal coordinate system on an assumption that the roll paper R is not misaligned in the transport direction A and the paper width direction. The logical coordinate is a coordinate system in which the recording position or the color measurement position of the color patch CP is represented by coordinates with a predetermined position (in this example, the upper left corner of each page) of the roll paper R as the origin (0,0) (see FIG. 9).

Figure 10A:
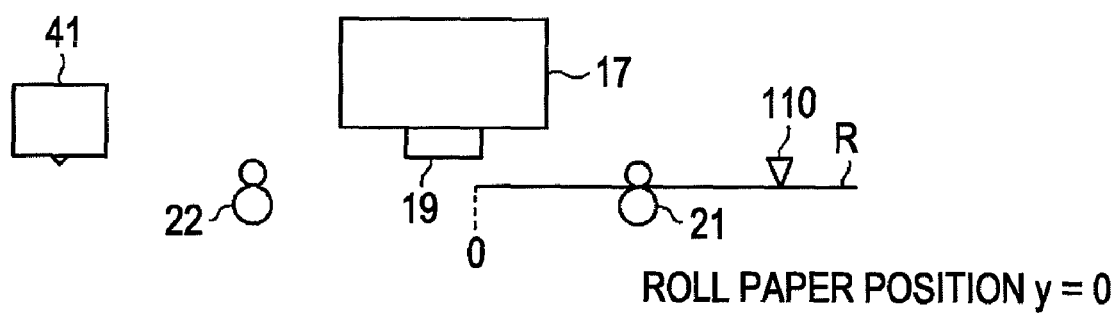
FIGS. 10A and 10B are schematic side views illustrating measurement of a position of a roll paper.

In contrast, the real coordinate is a coordinate system on an assumption that the roll paper R is slightly misaligned in the transport direction A and the paper width direction, in which the recording position or the color measurement position of the color patch CP is represented with a separate position (reference position) from the roll paper R as the origin. Accordingly, in the real coordinate system, the coordinate value is obtained in consideration of the misalignment amount of the roll paper R. For this reason, if a command specifying the value of the real coordinate system is generated, position control of an object to be controlled (for example, the roll paper R, the color measurement carriage 57, the color meter 41, or the like) is possible so as to be accurately positioned at the real recording position or color measurement position, regardless of misalignment of the roll paper R. In this embodiment, with respect to the origin of the real coordinate system, as shown in FIG. 10A, the front end of the roll paper R reaches the set reference position of the recording head 19 (for example, the uppermost nozzle position) is used as the origin "0" in the transport direction A. The home position (see FIG. 11) of the color measurement carriage 57 (or the color meter 41) is used as the origin in the main scanning direction B (paper width direction).

Conversion from the value of the logical coordinate system to the value of the real coordinate system is performed by using the measurement value of the position of the roll paper R in the transport direction A and the measurement value of the position of the roll paper R in the main scanning direction B (paper width direction). For this reason, in the printer 10 of this embodiment, paper position information concerning the positions of the roll paper R in the transport direction A and the main scanning direction B (paper width direction) is measured.

Next, a method of acquiring position information of the roll paper R, which is used when a command is generated by the second printer driver 89, will be described. In this embodiment, as the position information of the roll paper R, the position of the roll paper R in the transport direction A, the position of the roll paper R in the main scanning direction B (misalignment amount), and the misalignment amount in the main scanning direction B due to skewed movement of the roll paper R at the position of the color meter 41 on the downstream side in the transport direction from the detection position with respect to the position of the roll paper R in the main scanning direction B are calculated.

First, the position of the roll paper R in the transport direction A is measured by using the paper detection sensor 110, the encoder 109, and a counter 115A in the paper feed control section 115. The encoder 109 shown in FIG. 5 detects rotation of the PF motor 108 and outputs an encoder signal having pulses proportional to the rotation amount. The encoder 109 detects, for example, rotation of the rotary shaft of the gear wheel train on a power transmission path of the PF motor 108, thereby indirectly detecting the rotation of the PF motor 108. The paper detection sensor 110 is located at a predetermined position on the transport path of the roll paper R, and detects the front end of the roll paper R while the roll paper R is being fed.

Figure 10B:
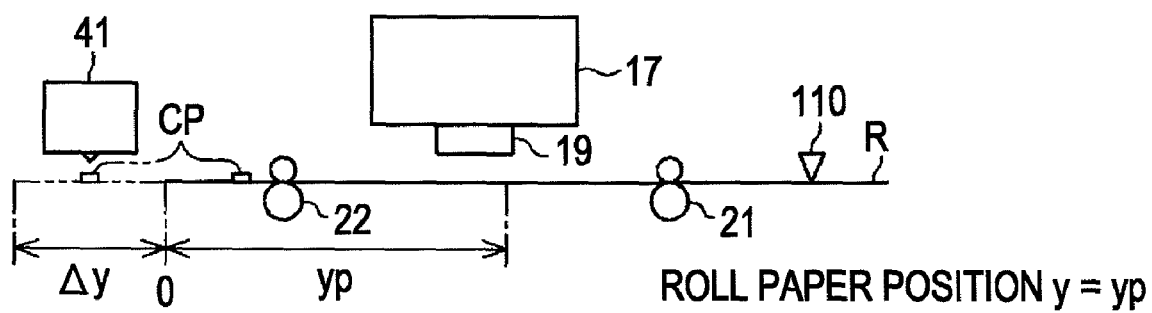

FIGS. 10A and 10B are schematic side views illustrating a method of measuring the position of the roll paper R in the transport direction A. As shown in FIGS. 10A and 10B, the paper detection sensor 110 is disposed on the upstream side in the transport direction (in FIGS. 10A and 10B, on the right side) slightly from the transport roller 21 on the transport path of the roll paper R, and detects the front end of the roll paper R to be fed. If the paper detection sensor 110 detects the front end of the roll paper R, the paper feed control section 115 resets the counter 115A, and counts the number of pulses of the encoder signal from the encoder 109. If the front end of the roll paper R reaches the set reference position (for example, the uppermost nozzle position) of the recording head 19 shown in FIG. 10A from the count value, the counter 115A is reset, and the origin of the roll paper R is set. Thereafter, the number of pulses of the encoder signal from the encoder 109 is counted with the position as the origin. In this case, when the PF motor 108 rotates forward, the count value increments, and when the PF motor 108 rotates backward, the count value decrements. In this way, the real position of the roll paper R in the transport direction A can be recognized on the basis of the counter 115A. That is, the count value of the counter 115A represents the value of the y coordinate at the set reference position (for example, the uppermost nozzle position) when the front end of the roll paper R is set to "0".

For example, if the roll paper R is disposed at a position indicated by a solid line in FIG. 10B when a print image for color measurement is printed for one page, the real position y of the roll paper R at that time becomes y=yp from the count value of the counter 115A. The real position of the roll paper R when the color patch CP is printed is held by storing the count value of the counter 115A at that time in a predetermined storage area of the memory 102. For example, print of the color patch CP is grasped from an identifier indicative of the color patch CP in print data, or the position is acquired from the count value of the counter 115A when the color patch CP is printed by identifying the color patch on the basis of image analysis of print image data. The position of the color meter 41 in the transport direction A is prescribed and known, and thus the value L corresponding to the counter count value of the distance between the position of the color meter 41 and the set reference position is known. Therefore, if a difference (yp−ycp) between the current paper position yp and the position ycp of the color patch CP is subtracted from the value L, the paper feed amount Δy (=L−yp+ycp) required to transport the roll paper R from a print end position (a position indicated by a solid line in FIG. 10B) to a color measurement position (a two-dot-chain line in FIG. 10B) where the color meter 41 performs color measurement for the color patch CP is obtained.

Next, a method of measuring the position of the roll paper R in the main scanning direction B (paper width direction) and the misalignment amount of the color measurement position (X direction) in the paper width direction due to skewed movement of the roll paper R will be described. The position or the misalignment amount of the roll paper R in the paper width direction is measured by using the paper width sensor 111, the linear encoder 112, and a counter 114A in the carriage control section 114.

The paper width sensor 111 of the FIG. 5 is attached to the carriage 17, and moves in the main scanning direction B along with the carriage 17 to detect the positions of both ends of the roll paper R in the paper width direction. The linear encoder 112 outputs an encoder signal having pulses proportional to the movement amount of the carriage 17 in the main scanning direction B. The carriage control section 114 increments the count value of the counter 114A, which is reset when the carriage 17 is disposed at the home position, during forward movement, and decrements the count value of the counter 114A during backward movement. In this way, the position (the position of the real coordinate system) of the carriage 17 in the main scanning direction B is grasped from the count value of the counter 114A. The control section 103 instructs the carriage control section 114 to move the carriage 17 in the main scanning direction B regularly during printing. At this moment, the paper width sensor 111 detects the positions of both ends of the roll paper R in the paper width direction. The position of the roll paper R in the paper width direction, that is, the misalignment amount in the paper width direction from the reference position is grasped from the count value of the counter 114A when the paper width sensor 111 detects the positions of both ends of the roll paper R in the paper width direction. For example, a predetermined position Xo (for example, a patch recording position) represented by the relative position (logical coordinate) in each page of the roll paper R can be converted into a position xo (=Xo+Δx1) of the real coordinate system with the misalignment amount Δx1 added on the basis of the misalignment amount Δx1 of the roll paper R in the paper width direction (the main scanning direction B) from the reference position.

Two different positions in the transport direction of the roll paper R when the paper width sensor 111 detects both ends of the roll paper R regularly during printing are compared, thereby measuring a degree of skewed movement of the roll paper R. For example, if the detected positions of both ends of the roll paper R have the coordinates xr and xl, the average is calculated to obtain the x coordinate of the center of the roll paper R in the width direction. The degree of skewed movement Sc is calculated by Sc=(x2−x1)/(y2−y1) by using the x coordinates x1 and x2 of the center of the roll paper R in the width direction when the positions of the roll paper R have the coordinates y1 and y2. Let the distance between the paper width sensor 111 and the color meter 41 in the y direction be YL, then, the misalignment amount Δx2 of the position in the paper width direction due to skewed movement of the roll paper R at the position of the color meter 41 with respect to the detection position of the roll paper R in the width direction is calculated by Δx2=YL·Sc. The misalignment amount Δx3 (=Δx1+Δx2), which is the sum of the misalignment amount Δx1 of the roll paper R in the paper width direction from the reference position and the misalignment amount Δx2, becomes the misalignment amount of the roll paper R in the paper width direction at the position of the color meter 41. For example, a predetermined position Xo (for example, a color measurement position) in each page of the roll paper R can be converted into a position xo (=Xo+Δx3) of the real coordinate system with the misalignment amount Δx3 added by using the misalignment amount Δx3. The measurement values Δx1 and Δx3 are used when coordinate calculation is executed by the second printer driver 89.

Next, a processing to be executed by the second printer driver 89 shown in FIG. 5 will be described in detail. The second printer driver 89 accepts the remote command RC from the command analyzing section 101. The remote command analyzing section 116 analyzes whether or not the remote command RC is a command that requires conversion from the logical coordinate system to the real coordinate system. In this example, as the result of analysis by the remote command analyzing section 116, the paper feed control command PFC, the winding control command WCC, the color measurement driving control command CMDC, and the like are analyzed as commands, which require conversion from the logical coordinate system to the real coordinate system.

The command generating section 117 generates a command, in which the value of the real coordinate system is stored with the position misalignment amount of the roller paper R from the printer 10 added, from the command, in which the value of the logical coordinate system analyzed by the remote command analyzing section 116 as being subject to coordinate conversion is stored. With respect to command generation, the coordinate calculating section 118 converts the value of the logical coordinate system into the value of the real coordinate system. That is, the above-described coordinate conversion is performed. The command generating section 117 has the same basic configuration of the command generating section 160 of the first printer driver 151, and incorporates the value (color measurement position or drive amount) of the real coordinate system calculated by the coordinate calculating section 118 as the value of the command, thereby generating a control command for a color measurement system and a winding system.

The coordinate calculating section 118 includes a paper position coordinate calculating section 118A and a carriage position coordinate calculating section 118B. The paper position coordinate calculating section 118A converts the value of the logical coordinate system specified by a command for a paper feed system, such as a paper feed control command or a winding control command, into the value of the real coordinate system. For example, the color measurement position of the real coordinate system in the transport direction A is calculated from the color measurement position in the transport direction A (the paper position in the transport direction A when color measurement is performed) as a value specified by the paper feed control command, which instructs the paper feed operation to the color measurement position.

For example, with respect to conversion of the value Yo of the logical coordinate system in the paper feed control command "PF(Yo)" represented by the relative position, the value Yo is added to or subtracted from the current value vpre of the real coordinate system represented by the count value of the counter 115A at the time of the forward feed operation in the transport direction A or the backward feed operation in a direction opposite to the transport direction. Thus, the value Yo of the logical coordinate system is converted into the value yo (=ypre+Yo). In this case, the paper feed control command of the real coordinate system is generated as "PF(yo)" by the command generating section 117. If the paper feed operation is executed and stops at a position where the count value of the counter 115A reaches yo, the roll paper R is disposed at the position of the value Yo specified by the logical coordinate. When the value of the logical coordinate system of the winding control command "PWpre(Yo)" is converted into the value of the real coordinate system, the same is applied. Thus, the winding control command of the real coordinate system is generated as "PWpre(yo)". In this case, winding control only has the backward feed operation, and as a result, the value yo of the real coordinate system becomes yo=ypre−Yo.

The carriage position coordinate calculating section 118B converts the value of the logical coordinate system specifying the operation position (target position) in a command, which instructs an operation of the color measurement carriage 57 to the color measurement position (patch position) in the X direction (the patch column direction C), into the value of the real coordinate system. That is, the color measurement position of the real coordinate system is calculated from the color measurement position (the position in the X direction of the color measurement carriage where color measurement is to be performed) in the patch column direction C specified by the logical coordinate system in the command.

For example, the value Xo of the logical coordinate system in a color measurement driving control command "CCR(Xo)" is converted into the value xo (=Xo+Δx3) of the real coordinate system by using the above-described misalignment amount Δx3 (=the sum of the misalignment amount Δx1 in the paper width direction and the misalignment amount Δx2 due to skewed movement) stored in a predetermined storage area of the memory 102. Here, Δx3 is positive when the roll paper R is misaligned in the X direction, and is negative when the roll paper R is misaligned in a direction opposite the X direction. In this case, the color measurement driving control command of the real coordinate system is generated as "CCR(xo)" by the command generating section 117. For the color measurement operation, the color measurement carriage 57 is driven and stops when the count value of a counter 125A (described below) for measuring the position of the color measurement carriage 57 reaches the value xo. In this way, the operation position of the color measurement carriage 57 can be positioned such that an optical spot for color measurement of the color meter 41 in the X direction is aligned with the center of the unit patch D subject to color measurement.

In this example, in deciding a print image or the print position of the color patch CP, the head control section 113 adds the misalignment amount Δx1 of the roll paper R in the paper width direction based on the detection result of the paper width sensor 111, thereby correcting the print position in the main scanning direction B. Therefore, even if the roll paper R is misaligned in the paper width direction, the print image or the color patch CP can be printed at a position on the roll paper R corresponding to the logical coordinate set by the relative position. Then, the color measurement position of the color measurement carriage 57 in the X direction is corrected by conversion of the color measurement driving control command "CCR(Xo)" from the logical coordinate system to the real coordinate system in accordance with the corrected print position of the color patch CP. For this reason, the position accuracy of the color measurement position where color measurement is performed for each unit patch D with the print position adjusted can be increased. When the distance between the paper width sensor 111 and the color meter 41 in the transport direction A is comparatively short, and an effect of skewed movement is negligible, the misalignment amount Δx3 may be substituted with the misalignment amount Δx1.

The value may have different dimensions before and after conversion from the logical coordinate system to the real coordinate system. That is, conversion may be performed with the same dimension, for example, "position→position", "drive amount→drive amount", and "transport amount→transport amount", or may be performed with different dimensions, for example, "position→drive amount", "drive amount→transport amount", and "position→transport amount", or vise versa.

As described above, the device communication sections 82 to 84 of the color meter 41, the color measurement driving device 80, and the winding device 30 are connected to the host communication section 81 of the printer 10 having the above-described configuration through hub 85 and the USB cables 86 to 88.

The color meter 41 includes, in addition to the device communication section 83, a command analyzing section 121, a color measurement control section 122, and a color measuring section 123. The color measuring section 123 has a light emitting section emitting light for color measurement, and a light receiving section receiving light reflected by each of the patches D of the color patch CP. Color measurement data (color measurement result) acquired by the color measuring section 123 is sent from the color measurement control section 122 to the printer 10 through USB communication, and is transmitted to the first printer driver 151 of the host apparatus 150.

The color measurement driving device 80 includes, in addition to the device communication section 84, a command analyzing section 124 (ESC/P analyzing section) serving as a second analyzing unit, a color measurement driving control section 125 serving as a second control unit, driving circuits 126 and 127, a paper push motor 71, a color measurement carriage motor 60, and an encoder 130. The color measurement driving control section 125 drives the paper push motor 71 through the driving circuit 126 on the basis of a control command, and causes the press member 44 to hold and release the roll paper R. The color measurement driving control section 125 grasps the position of the color measurement carriage 57 from the count value of the counter 125A, which counts the number of pulses from the encoder 130. The color measurement driving control section 125 drives the color measurement carriage motor 60 through the driving circuit 127 on the basis of a control command after the roll paper R is transported to the color measurement position so as to move the color measurement carriage 57 to an operation position for color measurement.

The winding device 30 includes, in addition to the device communication section 82, a command analyzing section 131 (ESC/P analyzing section) serving as a second analyzing unit, a winding control section 132 serving as a second control unit, a sensor 133, a driving circuit 134, and a winding motor 32. If a detection signal of accidental rotation of the roll paper R is input from the sensor 133, the winding control section 132 drives the winding motor 32 to rotate forward through the driving circuit 134. Then, if accidental rotation is not detected, the winding motor 32 stops. Accordingly, the roll paper R is wound by the winding device 30. The winding control section 132 drives the winding motor 32 to rotate backward by a specified drive amount through the driving circuit 134 on the basis of the winding control command from the second printer driver 89. Therefore, the winding device 30 winds the roll paper R in synchronization with the backward feed operation of the roll paper R due to backward rotation of the transport roller 21 and the paper discharge roller 22 when the PF motor 108 is driven to rotate backward.

Figure 11:
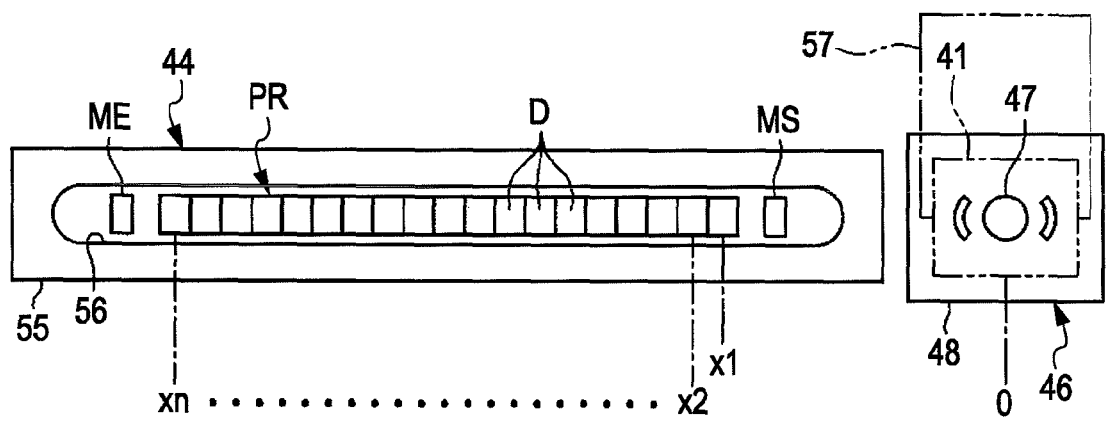
FIG. 11 is a schematic plan view showing a part of a color measuring device.

FIG. 11 is a schematic plan view showing the color measuring device during color measurement. As shown in FIG. 11, the color patch CP subject to color measurement is disposed below the long hole 56 of the press member 44. The color patch CP includes the patch column PR having arranged a plurality of unit patches D, and the start position mark MS and the end position mark ME disposed at a predetermined interval on both sides of the patch column PR in the column direction. A state where the color meter 41 is located directly above the white tile 47 of the calibration unit 46 is the home position of the color measurement carriage 57. At the time of color measurement, the position of each unit patch D as the coordinate (x coordinate) in the paper width direction (the main scanning direction B) with the home position as the origin, that is, the operation position of the color measurement carriage 57 serving as a mobile for the color measurement operation is calculated. In this case, the second printer driver 89 calculates the operation position of the color measurement carriage 57 at the time of color measurement in consideration of the misalignment amount Δx1 of each unit patch D constituting the color patch CP in the paper width direction at the position of the paper width sensor 111 and the misalignment amount Δx2 of the color measurement position in the paper width direction due to skewed movement of the roll paper R with respect to the recording position.

Figure 12A:
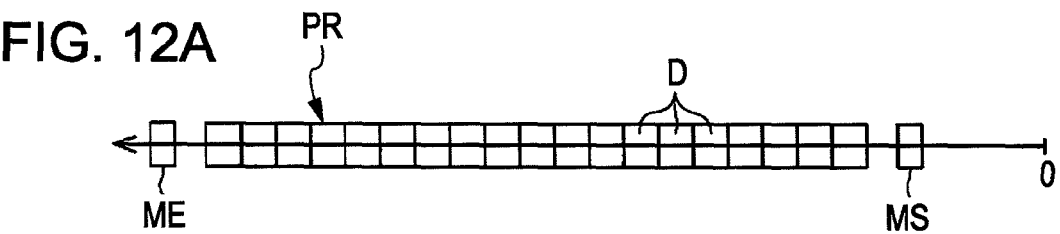
FIGS. 12A and 12B are schematic plan views showing scan color measurement and spot color measurement, respectively.
Figure 12B:
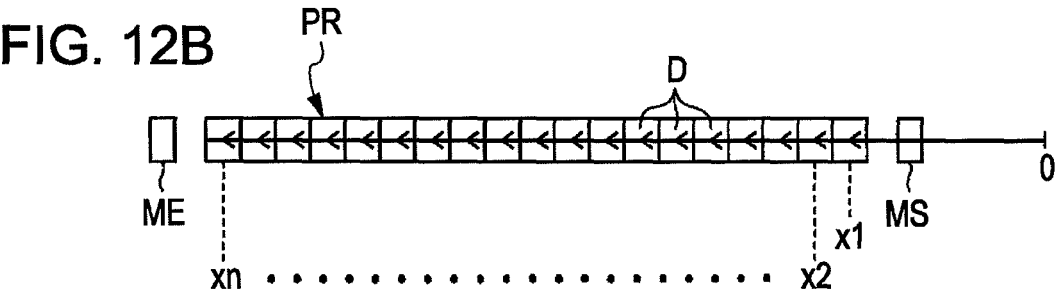

FIGS. 12A and 12B are explanatory views illustrating the color measurement operation of the color meter 41 by the color measurement carriage 57. The color measurement method includes scan color measurement shown in FIG. 12A and spot color measurement shown in FIG. 12B. In the case of scan color measurement shown in FIG. 12A, the color meter 41 moves at a constant speed as indicated by an arrow in FIG.

12A, and color measurement data is acquired each time the moving color meter 41 reaches the color measurement point. At the time of scan color measurement, the marks MS and ME are recorded. Accordingly, the position when the start position mark MS is detected is set as the origin, and color measurement data (narrowly defined color measurement data for each unit patch) which is obtained each time the color meter 41 moves by the patch pitch (=L/N) based on the patch column length L and the patch number N is stored in the buffer in association with the color measurement position at that time. In this case, the timing at which the color meter 41 acquires color measurement data each time it moves by the patch pitch is decided on the basis of a synchronization signal which is transmitted to the color meter 41 by the second printer driver 89 to instruct a color measurement data acquisition timing such that the operation position of the color measurement carriage 57 sequentially acquired by the color measurement driving device 80 is synchronized with the timing for movement by the patch pitch.

In the case of spot color measurement shown in FIG. 12B, the color meter 41 moves in a direction indicated by an arrow in FIG. 12B and stops each time the color measuring section 123 reaches a position corresponding to the center of the unit patch D, and each time the color meter 41 stops, color measurement data of the color meter 41 is acquired. With respect to spot color measurement, the operation position of the color measurement carriage 57 is calculated such that the color meter 41 stops at a position where the color measuring section 123 performs color measurement for the center of each unit patch D. In this example, the operation position of the color measurement carriage 57 is calculated as the values of the real coordinate system with the misalignment amount Δx of the roll paper R in the paper width direction added, for example, x1, x2, . . . , and xn in that order from the home position (origin "0"). Of course, in the case of scan color measurement, the position of each unit patch D on the real coordinate system with the home position as the origin may be calculated as the value with the misalignment amount Δx of the roll paper R in the paper width direction added, and color measurement data may be acquired each other the color meter 41 reaches the calculated position.

Next, the processing of the remote command analyzing section 116, the command generating section 117, and the coordinate calculating section 118 of the second printer driver 89 shown in FIG. 5 will be described in detail.

The remote command analyzing section 116 shown in FIG. 5 analyzes the remote command transmitted from the command analyzing section 101. This analysis is to determine whether or not the command generating section 117 needs to recreate a command. If it is necessary to recreate a command, information (for example, the value of the logical coordinate system) necessary for conversion of a command having the value of the logical coordinate system into a command having the value of the real coordinate system may be acquired.

The coordinate calculating section 118 includes the paper position coordinate calculating section 118A and the carriage position coordinate calculating section 118B. The paper position coordinate calculating section 118A converts the value represented by the logical coordinate system on the paper in the remote command RC into the value of the real coordinate system of the paper represented by the color measurement position, which is the position of the roll paper R in the transport direction A where the color meter 41 perform color measurement for the color patch CP, or the transport amount when the winding device 30 is fed backward. For example, the value of the position of the color patch CP in the transport direction A represented by the logical coordinate in the paper feed command of the color measurement driving control command CMDC is converted into the value of the real coordinate system, and the transport amount that is required until the roll paper R at the end position in the transport direction A at the end of printing reaches the color measurement position where the color meter 41 can perform color measurement for the position of the color patch CP specified by the value of the real coordinate system. The value of the logical coordinate system that represents the print start position of a next page specified by the winding control command WCC is converted into the value represented by the real coordinate system, and the transport amount that is required until the value (print start position) of the real coordinate system reaches a position corresponding to the nozzle of the recording head 19.

The carriage position coordinate calculating section 118B converts the value represented by the logical coordinate system of the operation position (stop position) in the patch column direction C, at which the color measurement carriage 57 operates the color measurement carriage 57 until the color measuring section 123 of the color meter 41 is opposite the center of the unit patch D, into the value of the real coordinate system.

The counter 115A of the paper feed control section 115 counts the cumulative value of the paper feed amount with the front end of the roll paper R at the set reference position as the origin (in FIGS. 10A and 10B, the position "0"). The paper position coordinate calculating section 118A converts the value of the logical coordinate system in the transport direction A represented by the relative position in one page into the value of the real coordinate system represented by the absolute position (cumulative value) over a plurality of pages with the front end of the roll paper R as the start point.

Figure 8A:
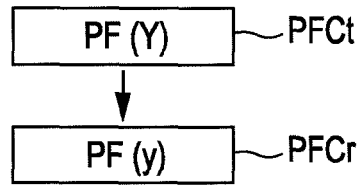
FIGS. 8A to 8D are data structure diagrams illustrating command generation.
Figure 8B:
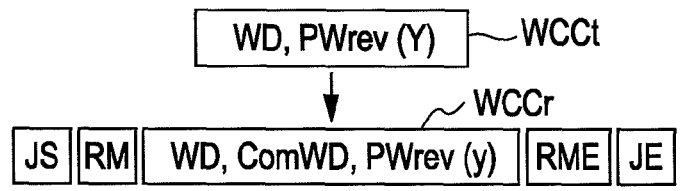
Figure 8C:
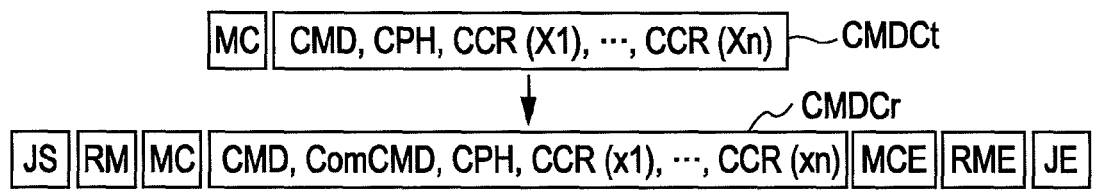
Figure 8D:
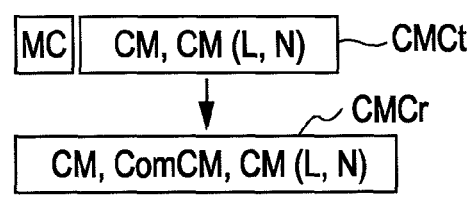

FIGS. 8A to 8D are explanatory views showing a method of generating a command in the second printer driver. The second printer driver 89 converts the values specified by the paper feed control command PFC, the winding control command WCC, the color measurement driving control command CMDC, and the color measurement control command CMC constituting the remote command RC from the logical coordinate system to the real coordinate system, thereby generating a new command. FIG. 8A shows generation of the paper feed control command, FIG. 8B shows generation of the winding control command, FIG. 8C shows generation of the color measurement driving control command, and FIG. 8D shows generation of the color measurement control command.

As shown in FIG. 8A, it is assumed that a paper feed control command PFCt of the logical coordinate system accepted by the second printer driver 89 is specified with the value "Y" of the logical coordinate system, and is represented by "PF(Y)". The second printer driver 89 stores the value "y" of the real coordinate system obtained by converting the value "Y" of the logical coordinate system, and generates a paper feed control command PFCr of the real coordinate system represented by "PF(y)". The paper feed control command PFCr "PF(y)" is sent from the second printer driver 89 to the paper feed control section 115 as a command when the roll paper R is transported to the color measurement position.

As shown in FIG. 8B, a winding control command WCCt of the logical coordinate system accepted by the second printer driver 89 is specified with a device code "WD" indicating that a target device is the winding device 30, and the value "Y" of the logical coordinate system. Thus, the winding control command is represented by "PWrev(Y)". The winding control command WCC is a command that is used to drive the winding device 30 to rotate backward in synchronization with backward rotation of the transport roller 21 when the roll paper R is fed backward (backward feed). The paper position coordinate calculating section 118A converts the value "Y" of the logical coordinate system into the value "y" of the real coordinate system. The command generating section 117 stores the calculated value "y" of the real coordinate system, and a winding control command of the real coordinate system is generated as "PWrev(y)". Then, the device code "WD" and a command "ComWD", which instructs to establish communication with the winding device 30, are attached before the winding control command "PWrev(y)" to generate a winding control command WCCr. The second printer driver 89 generates ESC/P control data in which the generated winding control command WCCr is stored subsequent to the remote mode transition code "MR", and transmits ESC/P control data to the winding device 30 through USB communication.

As shown in FIG. 8C, a color measurement driving control command CMDCt of the logical coordinate system subsequent to the color measurement mode transition code "MC" stores a device code "CMD" indicating that the target device is the color measurement driving device 80, a paper push command "CPH", and color measurement carriage driving commands "CCR(X1), CCR(X2), . . . , and CCR(Xn)". The carriage position coordinate calculating section 118B converts the value "X" of the logical coordinate system specified by a color measurement carriage driving command into the value "x" of the real coordinate system, and generates color measurement carriage driving commands "CCR(x1), CCR(x2), . . . , and CCR(xn)" by using the value "x" of the real coordinate system. The device code "CMD" and a command "ComCMD", which instructs to establish communication with the color measurement driving device 80, are attached before the color measurement carriage driving commands "CCR(x1), CCR(x2), . . . , and CCR(xn)" to generate a color measurement driving control command CMDCr of the real coordinate system. The second printer driver 89 generates ESC/P control data, in which the generated color measurement driving control command CMDCr is stored subsequent to the remote mode transition code "MR", and transmits ESC/P control data to the color measurement driving device 80 through USB communication.

As shown in FIG. 8D, a color measurement control command CMCt of the logical coordinate system subsequent to the color measurement mode transition code "MC" stores a device code "CM" indicating that the target device is the color meter 41, and color measurement control commands "CM(L, N)". The command generating section 117 attaches a command "ComCM", which instructs to establish communication with the color meter 41, to generate the color measurement control command CMCr of the real coordinate system to be transmitted to the color meter 41. The second printer driver 89 transmits ESC/P control data including the remote command RC, in which the color measurement control command CMCr is stored, to the color meter 41.

The command analyzing sections 124 and 131 of the color measurement driving device 80 and the winding device 30 basically has the same configuration as the command analyzing section 101 in the printer 10. In this embodiment, the circuit board (port) that is used in the command analyzing section 101 in the printer 10 is mounted in the color measurement driving device 80 and the winding device 30 is also mounted.

The command analyzing section 124 of the color measurement driving device 80 analyzes received ESC/P control data (print data), and if a color measurement driving control command is present, transmits the color measurement control method to the color measurement driving control section 125. The color measurement driving control section 125 drives the paper push motor 71 through the driving circuit 126 on the basis of the paper push command in the color measurement driving command. Meanwhile, the color measurement driving control section 125 drives the color measurement carriage motor 60 through the driving circuit 127 on the basis of the color measurement carriage driving command (hereinafter, referred to as "color measurement CR driving command") in the color measurement driving control command.

Figure 13:
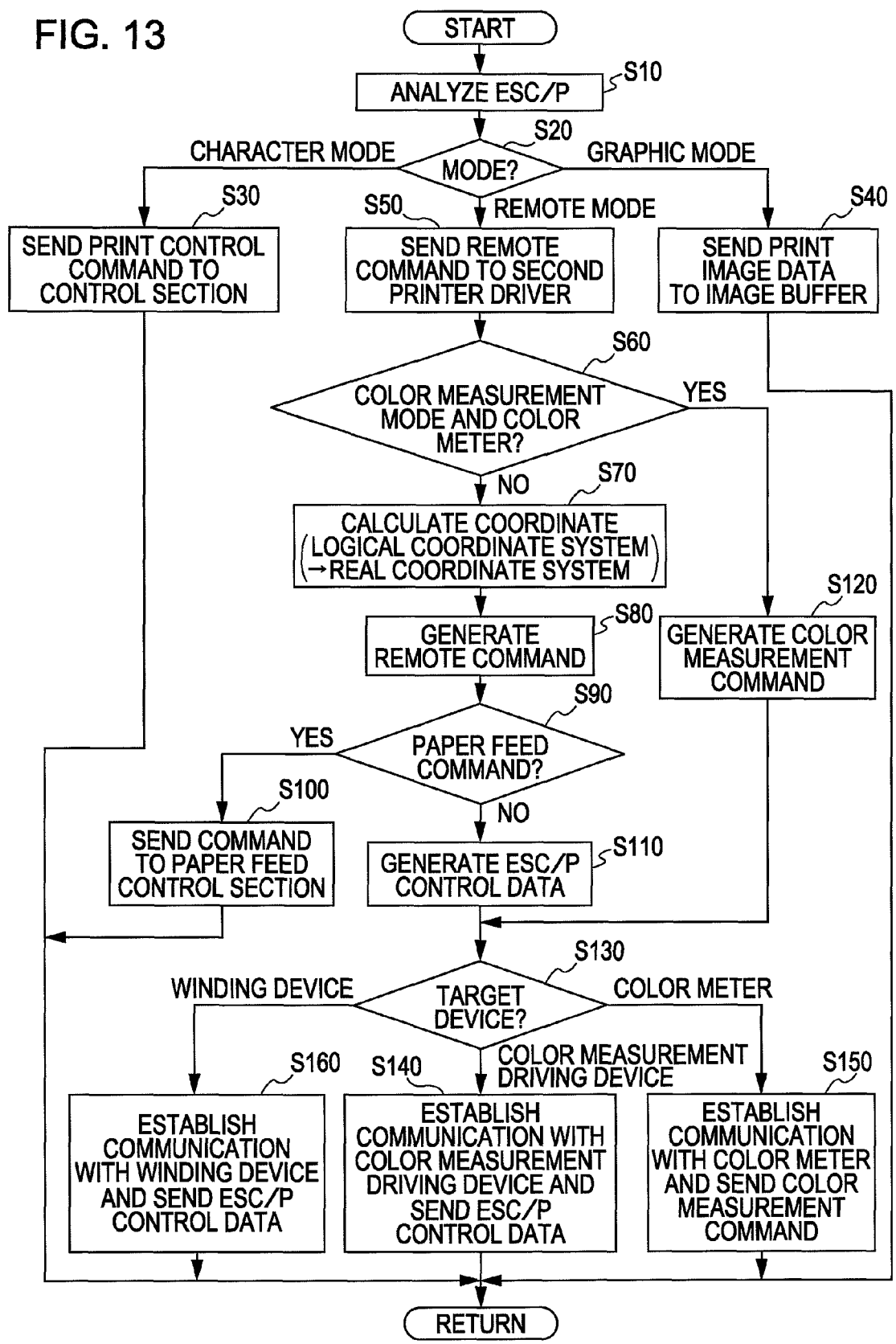
FIG. 13 is a flowchart showing control contents of an ESC/P analyzing section and a second printer driver of a printer.

Next, the processing of the command analyzing section 101 and the second printer driver 89 will be described with reference to a flowchart of FIG. 13. This flowchart is not limited to a processing by software, and it may include a processing by hardware.

When accepting print data PD (ESC/P control data) from the host apparatus 150, the printer 10 executes this processing. Print data PD is not limited to that from the host apparatus 150. For example, when the printer 10 is a standalone type printer, resolution conversion (in the case of a compressed image, such as JPEG or the like, including decompression), color conversion, halftoning, and the like may be internally performed on image data (for example, RGB image data or JPEG image data) read from an external storage medium, such as a memory card or the like, thereby obtaining print data PD.

First, in Step S10, the command analyzing section 101 performs ESC/P analysis (command analysis) for ESC/P control data. In this case, the control codes in ESC/P control data SD are sequentially analyzed, and if a mode transition code is present, the command analyzing section 101 changes the operation mode to a mode specified by the corresponding code (that is, activates an analysis module according to the mode). Next, a command to be analyzed in the destination mode is analyzed. For example, when the operation mode is changed to the character mode, the print control command PCC is analyzed, and when the operation mode is changed to the graphic mode, print image data PGD is analyzed. When the operation mode is changed to the remote mode, the remote command RC is analyzed. In this case, the commands that are not to be analyzed in the destination mode are discarded.

In Step S20, a mode when a command is analyzed is decided. If the mode is the character mode, the process progresses to Step S30, and the print control command PCC is transmitted to the control section 103. If the mode is the graphic mode, the process progresses to Step S40, and print image data PGD is transmitted to the memory 102 (image buffer). If the mode is the remote mode, the process progresses to Step S50, and the remote command RC is transmitted to the second printer driver 89. Steps S10 to S50 correspond to a first analysis step.

When the print control command PCC or print image data PGD is transmitted to the control section 103 or the image buffer 102, printing is performed on the roll paper R. For example, when the user operates the input device 162 to instruct to print a print image for color measurement and a color patch on the roll paper R, first, the print image and the color patch are printed on the roll paper R. In this case, if the roll paper R is cued in the print start position, before printing is performed, the carriage 17 moves in the main scanning direction, and the misalignment amount of the roll paper R in the paper width direction is detected on the basis of the count value of the counter 114A when the positions of both ends of the roll paper R in the paper width direction are detected by the paper width sensor 111. The head control section 113 prints the print image IG or the color patch CP at a position, which is corrected in the paper width direction by the misalignment amount on the roll paper R. As a result, even if the roll paper R is misaligned in the paper width direction, the print image or the color patch is accurately printed at a position of the roll paper R on the logical coordinate. After the print control command or print image data is received, the remote mode transition code "MR" and the remote command RC for color measurement control are sent to the second printer driver 89.

In Step S60, it is determined whether or not the operation mode is put in the color measurement mode and the target device is the color meter. As shown in FIG. 7, as the result of analysis by the command analyzing section 101, if the color measurement mode transition code "CM" is present in the remote command RC after the operation mode is changed to the remote mode, the operation is changed to the color measurement mode. In this case, if the target device of the command in the color measurement mode is the "color meter", the result is decided to be Yes in Step S60, and the process progresses to Step S120. If the operation mode is not the color measurement mode and the target device is not the color meter, the process progresses to Step S70. For example, when the operation mode is the color measurement mode and the target device is the color measurement driving device 80 (when the remote command RC is the color measurement driving control command CMDC), and when the operation mode is not the color measurement mode (when the remote command RC is the paper feed control command PFC or the winding control command WCC), the process progresses to Step S70.

In Step S70, the coordinate calculating section 118 calculates the coordinates. The coordinate calculating section 118 converts the value of the logical coordinate system specified by the command into the value of the real coordinate system. For example, on the setup screen shown in FIG. 9, the user operates the input device 162 to perform selection of the print image IG and layout setting, and to perform selection of the color patch CP and layout setting. The first printer driver 151 acquires position coordinate (print position coordinate) of the print image IG or the color patch CP specified by the input device 162 by the logical coordinate with the upper left corner of the paper area as the origin in FIG. 9, and generates a control command having the position or amount represented by the logical coordinate system as the value.

For example, the color measurement control command for scan color measurement (FIG. 12A) and spot color measurement (FIG. 12B) stores the patch number N and the patch column length L of the color patch CP, as shown in FIG. 8D.

In the case of spot color measurement, the carriage position coordinate calculating section 118B calculates the color measurement positions (x1, x2, ..., and xn) of the real coordinate system, at which the color measurement carriage 57 stops, from the values (X1, X2, ..., and Xn) of the color measurement positions of N unit patches represented by the patch column direction C. In this case, the carriage control section 114 reads out the misalignment amount $\Delta x$ of the roll paper R in the paper width direction calculated on the basis of the detection result of both ends of the roll paper R in the paper width direction by the paper width sensor 111 regularly during printing and stored in a predetermined storage area of the memory 102. In this embodiment, the misalignment amount $\Delta x$ is stored as the sum of the misalignment amount $\Delta x1$ of the roll paper R in the paper width direction at the position of the carriage 17 (specifically, the paper width sensor 111) in the transport direction A and the misalignment amount $\Delta x2$ in the paper width direction due to skewed movement of the roll paper R with respect to the position of the roll paper R in the paper width direction defined by the misalignment amount $\Delta x1$ at the position of the color measuring section 123 of the color meter 41 on the downstream side in the transport direction from the carriage 17. The color measurement positions (x1, x2, ..., and xn) in the main scanning direction B of the real coordinate system are calculated as (x1, x2, ..., and xn)=(X1+$\Delta x$, X2+$\Delta x$, ..., and Xn+$\Delta x$). With respect to the misalignment amount $\Delta x$, the position (reference position) of the roll paper R in the paper width direction when the value X of the logical coordinate system becomes equal to the value x of the real coordinate system is represented as the misalignment amount $\Delta x=0$. If the roll paper R is misaligned toward a side opposite the home position with respect to the reference position, the relationship $\Delta x>0$ is established. If the roll paper R is misaligned toward the home position, the relationship $\Delta x<0$ is established.

The paper position coordinate calculating section 118A calculates the color measurement positions (y1, y2, ..., and ym) of the real coordinate system from the color measurement positions (Y1, Y2, ..., and Ym) of the logical coordinate system that are the target transport positions when color measurement is performed for the roll paper R. For example, it is assumed that M patch columns (in the example of FIG. 9, two patch columns) in the transport direction A are present, and the color measurement positions of the logical coordinate system of the patch columns in the transport direction A are (Y1, Y2, ..., and Ym). In this example, the color measurement positions (Y1, Y2, ..., and Ym) are represented by the value corresponding to the transport amount from the paper position immediately before being transported to the color measurement position. The real position of the roll paper R in the transport direction A is represented by the count value of the counter 115A in the paper feed control section 115. Let the count value of the paper position immediately before being transported to the color measurement position be ycnt, then, the color measurement position y of the real coordinate system in the transport direction A is calculated as y=ycnt+Y.

In Step S80, the remote command is generated by using the value of the real coordinate system. For example, when the roll paper R is transported to the color measurement position, the paper feed control command PFCr of the real coordinate system represented by "PF(y)" is generated by using the value "y" of the real coordinate system obtained by converting the logical coordinate "Y" of the paper feed control command PFCt of the logical coordinate system shown in FIG. 8A.

When the color measurement carriage 57 is driven to perform spot color measurement by the color meter 41, the carriage position coordinate calculating section 118B acquires the values (x1, x2, ..., and xn) of the real coordinate system by converting the values (X1, X2, ..., and Xn) of the logical coordinate system in the color measurement CR driving commands "CCR(X1), CCR(X2), ..., CCR(Xn)" stored in the color measurement driving control command CMDC of the logical coordinate system shown in FIG. 8C. The command generating section 117 stores the values (x1, x2, ..., and xn) of the real coordinate system, and generates the color measurement CR driving commands of the logical coordinate system, which are represented by the color measurement carriage driving commands "CCR(x1), CCR(x2), ..., and CCR(xn)" of the real coordinate system.

When the winding device 30 is rotated backward in synchronization with the backward feed operation of the roll paper R after color measurement ends, the command generating section 117 stores the value y of the real coordinate system obtained through conversion of the value Y of the logical coordinate system in the winding control command WCCt shown in FIG. 8B by the paper position coordinate calculating section 118A, and generates the winding control command WCCr that is represented by "PWrev(y)".

In Step S90, it is determined whether or not the command to be analyzed is the paper feed command. If the command to be analyzed is the paper feed command, the process progresses to Step S100, and the command is transmitted to the paper feed control section 115. If the command to be analyzed is not the paper feed command, the process progresses to Step S110.

In Step S110, ESC/P control data is generated after the command is generated (S80), the command generating section 117 makes the command (winding control command and color measurement driving control command) to be transmitted to the winding device 30 and the color measurement driving device 80 a format of ESC/P control data.

For example, when the command is the winding control command WCCr shown in FIG. 8B, the winding control command WCCr is stored between the remote mode transition code "RM" and a remote mode end command "RME", which are disposed between the job start command "JS" and the job end command "JE", thereby generating ESC/P control data.

In the case of the color measurement driving control command CMDCr shown in FIG. 8C, the color measurement mode transition code "MC" and a color measurement mode end code "MCE" are disposed between the remote mode transition code "RM" and the remote mode end code "RME", which are disposed between the job start command "JS" and the job end command "JE". The color measurement driving control command CMDCr is also stored between the color measurement mode transition code "MC" and the color measurement mode end code "MCE", thereby generating ESC/P control data.

If it is determined in Step S60 that the operation mode is the color measurement mode and the target device is the color meter (that is, the device code is the color meter), in Step S120, the color measurement command is generated. As shown in FIG. 8D, the command "ComCM" that instructs to establish communication with the color meter 41 is attached, thereby generating the color measurement control command CMCr.

In Step S130, the target device is determined. That is, the target device is determined from the device code in ESC/P control data. If the target device is the color measurement driving device 80, the process progresses to Step S140, and communication with the color measurement driving device 80 is established to transmit ESC/P control data to the color measurement driving device 80. If the target device is the color meter 41, the process progresses to Step S150, and communication with the color meter 41 is established to transmit the color measurement control command CMCr to the color meter 41. If the target device is the winding device 30, the process progresses to Step S160, and communication with the winding device 30 is established to transmit ESC/P control data to the winding device 30.

In this case, communication with the target device is established in accordance with an instruction from the second printer driver 89 by the host communication section 81. When communication with the color measurement driving device 80 and the winding device 30 is established, the USB devices 82A and 84A of the color measurement driving device 80 and the winding device 30 sends a response indicative of the "printer class" (the device ID of the printer) for the request to send the device class (for example, the device ID) from the USB host 81A. As a result, a USB logical channel is connected. For this reason, in this embodiment in which the second printer driver 89 for controlling the optional device is constructed by using at least a part of the existing printer driver, which is constructed on an assumption that the other side of communication is the printer, ESC/P control data can be transmitted from the printer 10 to the optional device through USB communication. In this example, the color measurement CR driving commands CCR(x1), . . . , and CCR(xn) correspond to the operation positions that are decided by an operation position deciding unit. The command generating section 117 that generates the color measurement CR driving commands CCR(x1), . . . , and CCR(xn) corresponds to the operation position deciding unit.

Figure 14:
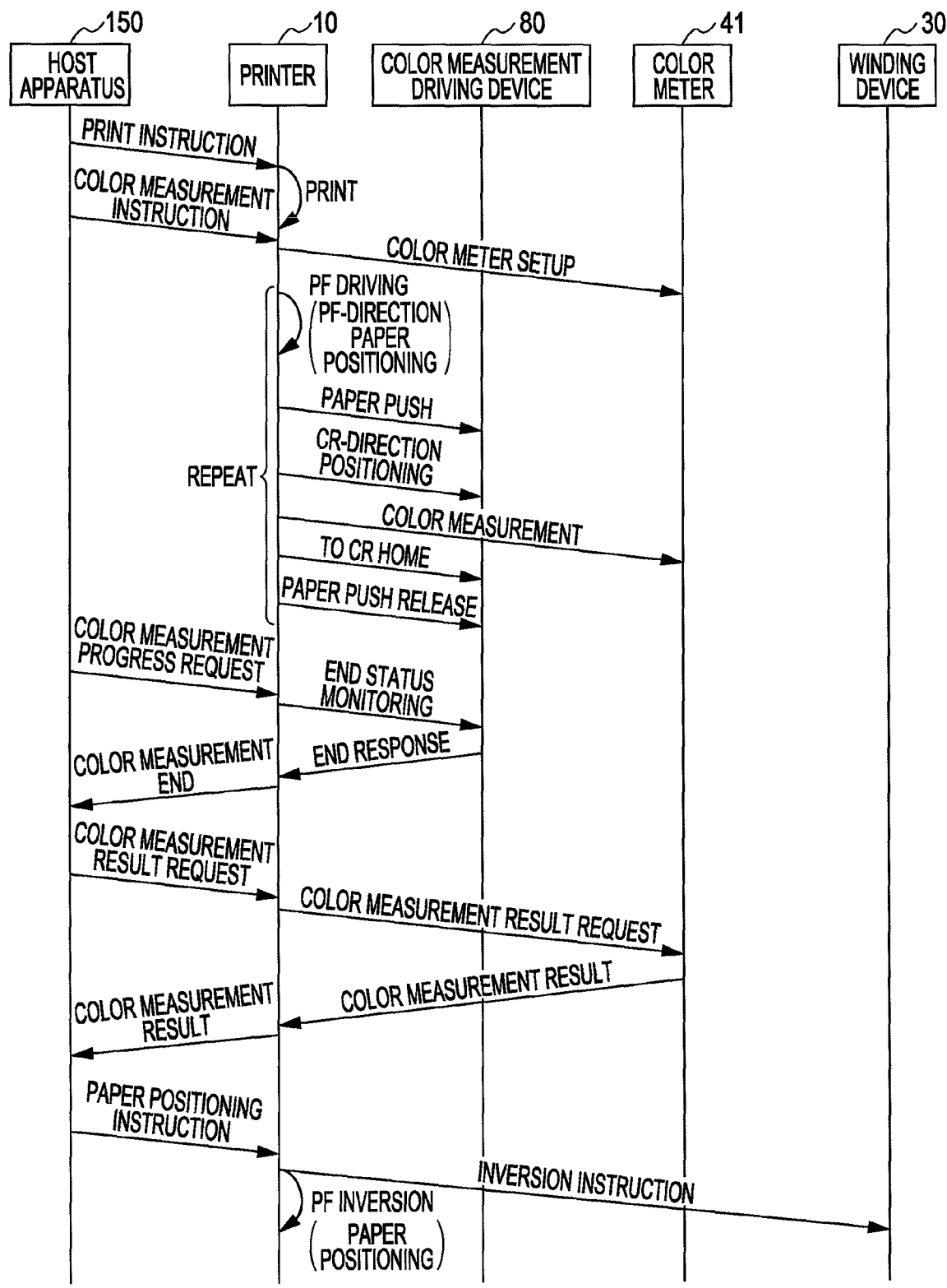
FIG. 14 is a transaction diagram showing a color measurement processing.

Next, the flow of color measurement will be described with reference to a transaction diagram of FIG. 14.

First, print data is sent from the host apparatus 150 (that is, the first printer driver 151) to the printer 10, and printing is instructed. For example, the image and the color patch are transmitted as print data. The printer 10 prints the print image IG and the color patch CP on the roll paper R on the basis of print data.

Next, the host apparatus 150 instructs color measurement. The printer 10 transmits color measurement instruction data, which is received from the host apparatus 150, to the color meter 41. As a result, the color meter 41 performs initialization or setting of the color measurement condition or the like. Subsequently, the printer 10 causes PF driving (drives the PF motor 108) to position the roll paper R at the color measurement position in the transport direction A. Next, the printer 10 instructs the color measurement driving device 80 to push the roll paper R and to position the color measurement carriage 57 in the column direction C (the main scanning direction B).

In this case, the color measurement CR driving commands CCR(x1), . . . , and CCR(xn) with the value of the real coordinate system stored are instructed from the printer 10 through USB communication. Accordingly, in the case of spot color measurement, the color measurement carriage 57 is located at the operation position with the misalignment amount $\Delta x$ of the roll paper R in the paper width direction corrected. For this reason, the color measurement carriage 57 can stop at a position where the color measuring section 123 of the color meter 41 is opposite the center of each unit patch D recorded at a position corresponding to the logical coordinate on the paper.

Each time the color measurement carriage 57 stops at each operation position, the color meter 41 performs color measurement. In this case, the second printer driver 89 sequentially receives position information of the color measurement carriage 57 counted by the counter 125A from the color measurement driving device 80 on the basis of an output signal of the encoder 130 of the color measurement driving device 80, and controls such that the operation position of the color measurement carriage 57 is synchronized with the color measurement position of the color meter 41. Each time color measurement ends for each column of color patch CP, the color measurement carriage 57 returns to the home positions, releases the push posture of the press member 44, and if a next color patch CP subject to color measurement exists, transports the roll paper R to a next color measurement position. The same processing is repeatedly performed until color measurement ends for all of the color patches CP.

At this moment, a color measurement progress request from the host apparatus 150 is sequentially accepted, and the printer 10 monitors the end of color measurement of the color measurement driving device 80. Then, if a response concerning the end of color measurement is accepted, the printer 10 notifies the host apparatus 150 that color measurement ends. The host apparatus 150 that accepts the end of color measurement requests the printer 10 to send the color measurement result. When this happens, the printer 10 sends a color measurement result request to the color meter 41. The color meter 41 that accepts the color measurement result request sends the color measurement result (color measurement data) to the host apparatus 150 through the printer 10. When accepting the color measurement result, the host apparatus 150 sends a paper positioning instruction to the printer, and the printer 10 causes PF backward rotation (drives the PF motor 108 to rotate backward) to perform paper positioning (back feed operation) in response to the instruction, and sends a backward rotation instruction to the winding device 30 in synchronization with the backward rotation of the PF motor 108. As a result, the winding device 30 is driven to rotate backward in synchronization with PF backward rotation, and accordingly the roll paper R is fed backward to a predetermined position. For example, the roll paper R is disposed at a print start position of a next page. The host apparatus 150 decides pertinence of a color printed on the basis of the color measurement result, and decides a color condition at the time of printing.

As described above in detail, according to this embodiment, the following effects are obtained.

(1) The printer class is set with respect to the color measurement driving device 80 and the winding device 30 that are optional devices of the printer 10. Therefore, USB communication can be established when ESC/P control data, which is a print command, is transmitted from the printer 10 to the optional device. As a result, the optional device can be driven and controlled by using the remote command of ESC/P control data.

(2) The optional device can be driven and controlled by using ESC/P control data. Therefore, the second printer driver 89 can be constructed by using the existing first printer driver 151, and the command analyzing sections 124 and 131 in the optional devices can be constructed by using an existing ESC/P analyzing section. For example, only if a circuit board for the existing ESC/P analyzing section is mounted on the optional devices, the command analyzing sections 124 and 131 can be constructed, and it is not necessary to newly develop and manufacture an exclusive-use analyzing section. As a result, the printer system 100 can be developed and manufactured within a short period of time.

(3) The misalignment amount Δx3 of the roll paper R in the paper width direction from the reference position is acquired on the basis of the detection result of the paper width sensor 111 and stored in the memory 102. The value of the logical coordinate system is converted into the value of the real coordinate system with the misalignment amount of the roll paper R in the paper width direction added by using the misalignment amount Δx3. The operation position of the color measurement carriage 57 (mobile) of the color measuring device 40 serving as the second device is controlled on the basis of second control data including the command specified by the value of the real coordinate system. As a result, even if the roll paper R is misaligned in the paper width direction, color measurement can be accurately performed for each unit patch D of the color patch CP recorded at a position corresponding to the logical coordinate on the roll paper R.

(4) By using the misalignment amount Δx3 that is the sum of the misalignment amount Δx1 of the roll paper R in the paper width direction and the misalignment amount Δx2 in the paper width direction due to skewed movement of the roll paper R, second control data is generated in which the value for deciding the operation position of the color measurement carriage 57 of the color measuring device 40 is specified as the value of the real coordinate system for compensating the misalignment amount Δx3. Therefore, even if the paper width sensor 111 and the color measurement carriage 57 are disposed at different positions in the transport direction, the operation position of the color measurement carriage 57 can be accurately controlled to the unit patch D, and as a result, color measurement accuracy of the color measuring device 40 can be increased.

(5) The winding device 30 is driven to rotate backward in synchronization with the backward feed operation. For this reason, after color measurement ends, the roll paper R can return from the color measurement position to the print start position of the next page. Therefore, even if the winding device 30 is provided as an optional device, the winding device 30 can be driven to rotate backward by using ESC/P control data, and as a result, the winding device 30 can be controlled with simple configuration.

(6) In the related art, in order to recreate a command based on misalignment information of the roll paper R obtained by the printer, the misalignment information is transmitted to the printer driver of the host apparatus once, and the printer driver generates the command of the real coordinate system by using the misalignment information. For this reason, it is necessary to configure the printer 10 to receive the misalignment information. In contrast, in this embodiment, the printer 10 is provided with the second printer driver 89 having a printer driver function. For this reason, the printer internally generates the command of the real coordinate system, without sending misalignment information obtained by the printer 10 to the host apparatus 150. When the command is generated and transmitted to the color measurement driving device 80 serving as the second device, print data (ESC/P control data) in which the command is incorporated as the remote command RC is generated and transmitted to the color measurement driving device 80 as print data by using the printer driver function (communication function). In this case, the value of the command is subject to coordinate conversion, and thus the command for printing (remote command) can be used as it is. Therefore, operation delay of the second device due to exchange of data transmitting misalignment information to the host apparatus 150 is difficult to occur. In addition, the printer system 100 (electronic device system) can be constructed with simple configuration by incorporating the printer driver function and the ESC/P analyzing section for printing into the printer 10 and the color measurement driving device 80 (second device), respectively.

Second Embodiment

Hereinafter, a second embodiment of the invention will be described with reference to FIGS. 15 to 25.

Figure 15:
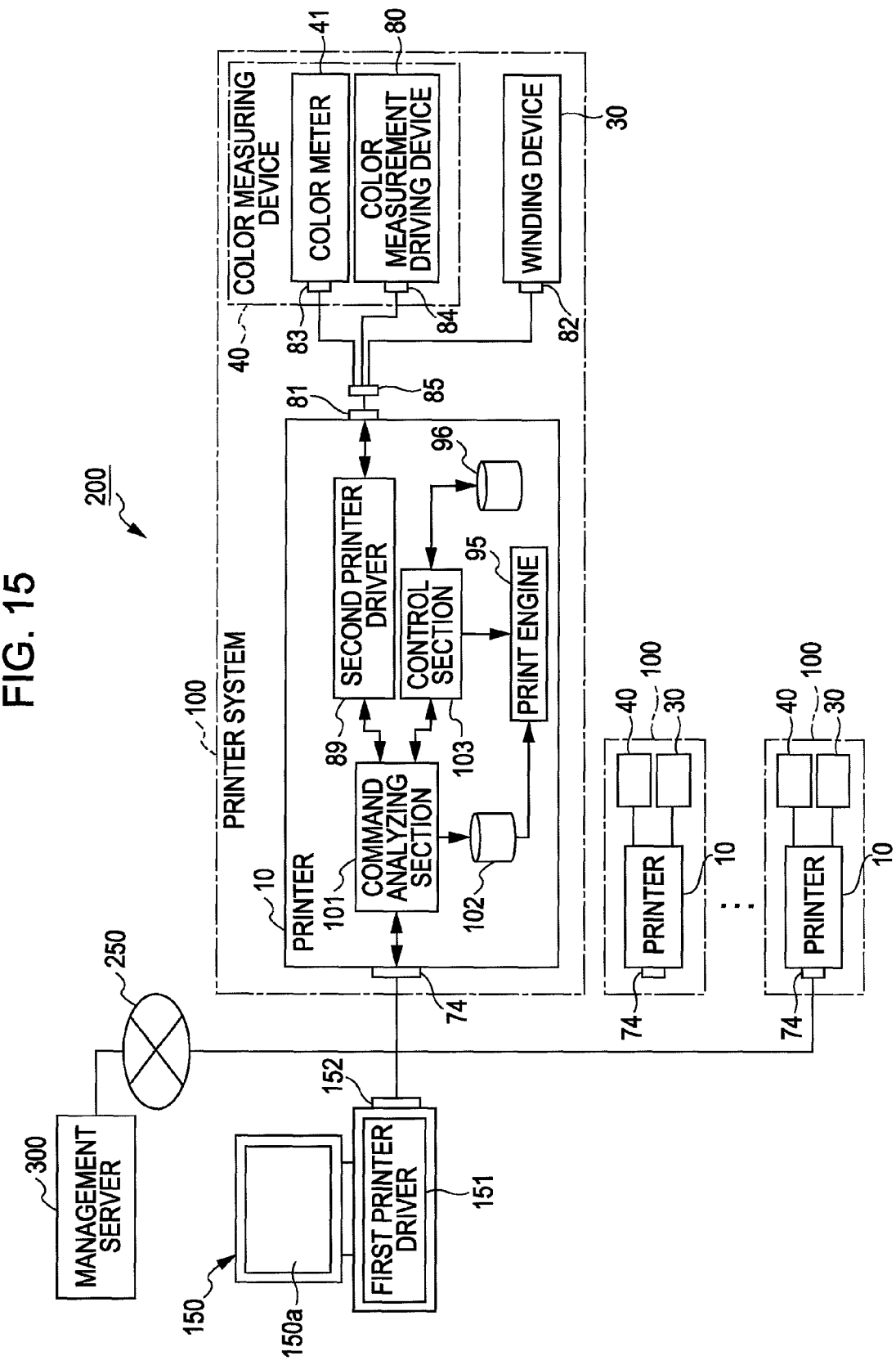
FIG. 15 is a block diagram concerning main communication of a printing system.

FIG. 15 is a block diagram showing the electrical configuration of a printing system including printer systems 100 according to the second embodiment of the invention. A plurality of printer system 100 have the same configuration, and thus only one printer system 100 is shown in the drawing.

Similarly to the first embodiment, a printing system 200 includes printer systems 100 and a host apparatus 150 communicably connected to the printer system 100. The host apparatus 150 includes, for example, a personal computer or the like. The host apparatus 150 is provided with, for example, a first printer driver 151 (host driver), which is constructed by installing software for a printer driver. A communication section 152 of the host apparatus 150 is connected to a communication section 74 of the printer 10 constituting each printer system 100 through a communication cable. Communication between the communication sections 152 and 74 is based on, for example, IEEE 1284.4 communication or USB communication. In this embodiment, the first printer driver 151 constitutes a host control section and a host control device.

A plurality of printer systems 100 are communicably connected to the host apparatus 150. The host apparatus 150 and a plurality of printer systems 100 are connected to a management server 300 through a network 250, such as Internet or the like. The management server 300 accesses the printer systems 100 to acquire information necessary for maintenance or an accounting system.

The color measuring device 40 is divided into a color meter 41 and a color measurement driving device 80 constituting a driving system of a press member 44 and a color measurement carriage 57. A communication section 81 of the printer 10 is communicably connected to communication sections 82 to 84 of the color meter 41, the color measurement driving device 80, and a winding device 30 through a hub 85. Communication between the communication section 81 and the communication sections 82 to 84 is based on, for example, USB communication. In this case, the communication section 81 constitutes a USB host, and the communication sections 82 to 84 constitute USB devices. In this embodiment, the printer 10 constitutes a first device, and the color measuring device 40 constitutes a second device.

When an image displayed on the monitor 150a is printed, the first printer driver 151 in the host apparatus 150 generates print job data of the image and transmits print job data to the printer 10. As a print command of print job data, for example, ESC/P (Epson Standard Code for Printer), which is the standard command of the serial printer, is used.

The printer 10 is provided with a command analyzing section 101 analyzing print job data, a buffer memory (hereinafter, referred to as "image buffer 102"), a control section 103, a second printer driver 89, a print engine 95, and a memory 171 for recording job information (described below) or the like. In this embodiment, the memory 102 is used as an image buffer storing print image data. For this reason, data of calculation results in the printer 10 is stored in a predetermined storage area of a RAM 173 described below or the nonvolatile memory 171.

The command analyzing section 101 analyzes print job data, if it is print image data, and temporarily stores print job data in the image buffer 102. If print job data is a print control command that instructs printing, the command analyzing section 101 sends print job data to the control section 103. If print job data is a remote command that instructs control other than printing, the command analyzing section 101 sends print job data to the second printer driver 89. The control section 103 drives the print engine 95 in accordance with the print control command, and prints an image based on print image data. The second printer driver 89 transmits the remote command to control the color meter 41, the color measurement driving device 80, and the winding device 30. The control section 103 manages the status of the print engine 95, and stores job information, such as ink consumption or paper consumption in the memory 171. The job information is data that is acquired by the management server 300 through an access to the printer 100 and used for a maintenance service or an accounting system. Data, such as the temperature of the recording head or information for maintenance control, which is used to control the printer 10, is also stored in the memory 171.

Figure 16:
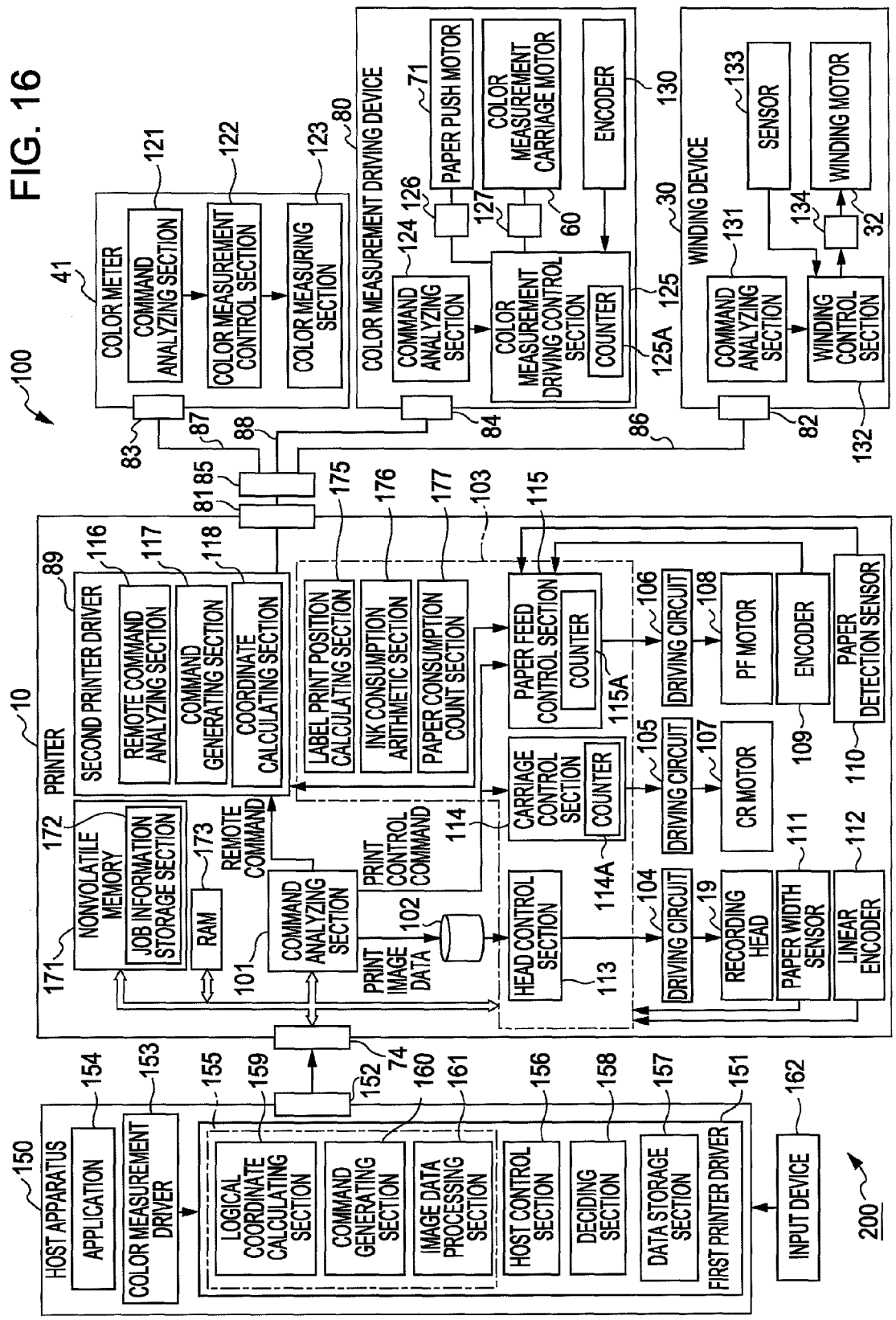
FIG. 16 is a block diagram showing the electrical configuration of a printing system.

FIG. 16 is a block diagram showing the detailed electrical configuration of the printing system. The host apparatus 150 includes the first printer driver 151, a color measurement driver 153, and an application 154 for image display. The first printer driver 151 and the color measurement driver 153 are constructed by installing a program on the host apparatus 150.

The first printer driver 151 includes a print data generating section (hereinafter, referred to as "job data generating section 155") generating print data (hereinafter, referred to as "print job data"), a host control section 156, a deciding section 158, and a data storage section 157. The job data generating section 155 includes a logical coordinate calculating section 159, a command generating section 160, and an image data processing section 161. An input device 162 is connected to the host apparatus 150. The input device includes, for example, a keyboard, a mouse, or the like.

The color measurement driver 153 has a setup screen display function to display a setup screen for color measurement setup, a color patch pattern setup function, and a color patch print position setup function. The color measurement driver 153 has a function to display a paper range including an image displayed by the application 154 on the setup screen, and to set a color patch while selecting desired color patch pattern and print position in a desired area within the paper range.

Figure 17:
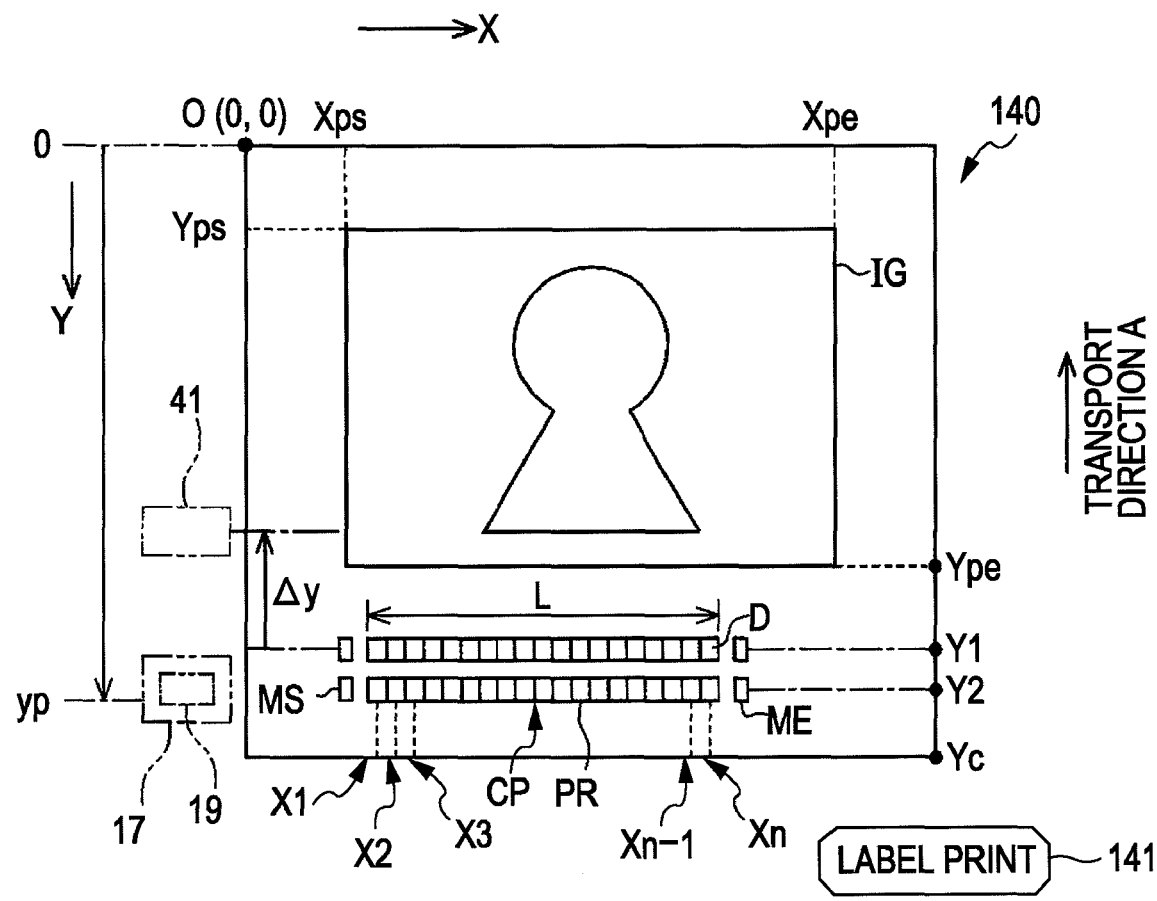
FIG. 17 is a schematic view showing a setup screen for color measurement.

FIG. 17 schematically shows a setup screen for color measurement that is displayed on the monitor 150a by the color measurement driver 153. The user can operate the input device 162 to display the print image IG on the setup screen 140 for color measurement, and also to select a color pattern of a color patch CP and set the position of the color patch CP. For example, the user selects a desired pattern, the number of colors, color, the number of color patch columns, and the like on a color patch selection window, a pull-down menu, or the like, and specifies the print position of the selected color patch CP with a mouse, for example, to set the color patch CP at a desired position, such as a blank area having no print image IG. The print position of the color patch specified on the setup screen 140 for color measurement is acquired by the color measurement driver 153 as a logical coordinate which is a coordinate system set on the paper area. Specifically, as shown in FIG. 17, the logical coordinate system is represented by the relative coordinate with the upper left corner of the paper area (the entire range corresponding to one page) as the origin (0,0) and the X and Y coordinates in the paper width direction (the main scanning direction B) (the right direction in FIG. 17) and the direction opposite the transport direction (the down direction in FIG. 17). For example, as shown in FIG. 17, with respect to the print image IG, the upper left corner is represented by the coordinate (Xps,Yps), and the lower right corner is represented by the coordinate (Xpe, Ype).

Each of the color patches CP includes the patch column PR having arranged a plurality of unit patches D in columns, and the start position mark MS and the end position mark ME disposed at a predetermined interval on both sides of the patch column PR in the column direction. In the example of FIG. 17 where two columns of color patches CP are arranged, the color patches CP are represented by the values of the Y coordinates Y1 and Y2 and the X coordinates (X1, X2, ..., Xn−1, and Xn) concerning N unit patches D constituting each patch column PR. The logical coordinate values concerning the color patches CP are used to decide the color measurement point when the color meter 41 performs color measurement for the unit patches D. The coordinate of each unit patch D represents, for example, the center point of each unit patch D.

For example, the Y coordinate value of the color patch CP is used as a target position when the roll paper R is fed to position at a color measurement position. The X coordinate value of each unit patch D is used as a target position when the color measurement carriage 57 is positioned in the patch column direction C such that the color measurement point of the color meter 41 is aligned with the center point of each unit patch. Data concerning the color patch CP acquired by the color measurement driver 153 includes information concerning the patch column length L and the patch number N of the patch column PR.

As shown in FIG. 17, a label print setup button 141 is provided on the setup screen 140 for color measurement. The label print setup button 141 is used to set printing of a decision result concerning pertinence of a color condition based on the color measurement result of the color meter 41. If the user operates (clicks) the mouse or the like, a plurality of images for printing of the decision result are displayed. Then, the user selects a desired one from among the images to set an image for printing of the decision result. For example, an image having a character string "OK!" and the like are prepared. In this embodiment, if an image for printing of the decision result is selected, the print position of the selected image is automatically set within the blank area so as not to overlap the image of the paper area.

The print image IG, image data of the color patch CP, logical coordinate data, and information concerning the patch column length L and the patch number N of the color patch CP are sent from the color measurement driver 153 shown in FIG. 16 to the first printer driver 151. In FIG. 17, the Y coordinate "Yc" representing the end (in the drawings, the lower end) of the paper area in the transport direction A is used to decide the cut position when the roll paper R is cut with the cutter (not shown) or the target position of the roll paper R so as to be cued in the print start position of the next page. The color measurement driver 153 generates the color measurement command to control the color meter 41 and sends the color measurement command to the first printer driver 151.

The first printer driver 151 shown in FIG. 16 generates print job data including a print command on the basis of an image displayed on the monitor 150*a* by the application 154, image data of the color patch CP set by the color measurement driver 153, logical coordinate data, and the like. In this embodiment, the control commands for control of the winding device 30, the color meter 41, and the color measurement driving device 80, as well as printing control of the printer 10, are incorporated into print job data. The first printer driver 151 generates print job data by using the logical coordinate calculating section 159, the command generating section 160, and the image data processing section 161 described above.

The command generating section 160 generates a command by using the printer description language (printer control code). In this embodiment, as described above, an ESC/P command is used as the printer description language for the serial printer. Of course, if the printer 10 is a page printer, ESC/page may be used as the printer description language. The processing of the command generating section 160 will be described below in detail.

The logical coordinate calculating section 159 calculates a value to be stored in a command created by the command generating section 160 on the basis the logical coordinate information defining the print area of the print image IG or the color patch CP set on the setup screen 140 for color measurement or logical coordinate information concerning the logical coordinate of the color measurement point of the color patch CP or the like. Examples of the value to be calculated include the paper feed amount to the print position of the print image or the color patch CP, the paper feed amount to the color measurement position where the color meter 41 can perform color measurement for the color patch CP, the operation position (the color measurement position in the patch column direction C), which is the movement target position (color measurement position) of the color measurement carriage 57 at the time of color measurement. The values are calculated as the values, such as the drive amount or the target position of a motor to be controlled and the like.

The image data processing section 161 converts image data for display into image data for printing. Specific examples include resolution conversion to convert display resolution into printer resolution, color conversion to convert image data from the RGB color system to the CMYK color system (respective colors of cyan, magenta, yellow, and black) that can be expressed by the printer 10, halftoning to change the gray-scale value of image data to a gray-scale value that can be expressed by the printer, data output sequence adjustment (for example, micro weave) to rearrange the output sequence of data to the recording head 19 in accordance with the ink droplet ejection sequence based on a print mode, and the like. Color conversion is performed by using a color conversion table. With respect to halftoning, a known method, such as so-called error diffusion, dithering, or the like, may be used. The contents of such processing are known, and thus further descriptions will be omitted. Image data that is subjected to an image processing for printing is called print image data.

The first printer driver 151 has a function to display a setup screen for input and setup of a print condition on the monitor 150*a* of the host apparatus 150. The user can operate the input device 162 on the setup screen to set the print condition. The print condition includes paper type, paper size, color/monochrome, layout (set margin, print with no border, and the like), print mode (for example, high-quality print mode, high-speed print mode, and the like), and the like. Image processing, such as resolution conversion, color conversion, halftoning, data output sequence adjustment, and the like, is performed in accordance with the print condition.

The host control section 156 undertakes control in the first printer driver 151, and performs instruction for generation of print job data to the respective sections 159 to 161, display control on the print condition setup screen, communication control (transmission instruction) for transmission of print job data to the printer 10, decision of pertinence of the color condition on the basis of color measurement data from the color meter 41, setting of the color correction value, and the like. The data storage section 157 is a data storage area that temporarily stores various kinds of data concerning the color measurement condition or the print condition set on the setup screen (the setup screen for color measurement and the print condition setup screen), temporarily stores generated print job data or the like before being transmitted, temporarily stores color measurement data received from the color meter 41 before decision or an arithmetic operation, or stores a plurality of kinds of image data to be selected for label print. For the data storage section 157, for example, a predetermined storage area of the memory of the host apparatus 150 is used. If the job data generating section 155 generates print job data, the host control section 156 instructs the communication section 152 to transmit print job data to the printer 10, and the communication section 152 transmits print job data stored in the data storage section 157 to the communication section 74 of the printer 10 in accordance with a predetermined communication protocol.

The deciding section 158 compares the color of the print result (the color patch CP) with the color of the monitor display screen on the basis of the color measurement result (color measurement data) transmitted from the color meter 41 and received by the host control section 156 through the printer 10, and decides pertinence of the print condition concerning the color. In this embodiment, for example, the result is decided to be "OK" or "NG".

When the color meter 41 performs color measurement for the color patch CP, the host control section 156 requests the color measurement result (color measurement data) for the color meter 41, or instructs the job data generating section 155 to generate print image data for label print and to transmit print image data, and to store job information (job information concerning color measurement) obtained from color measurement data or the color measurement decision result.

The first printer driver 151 (the job data generating section 155) generates print job data (ESC/P control data) including various commands generated by the command generating section 160 and print image data generated by the image data processing section 161.

Figure 18:
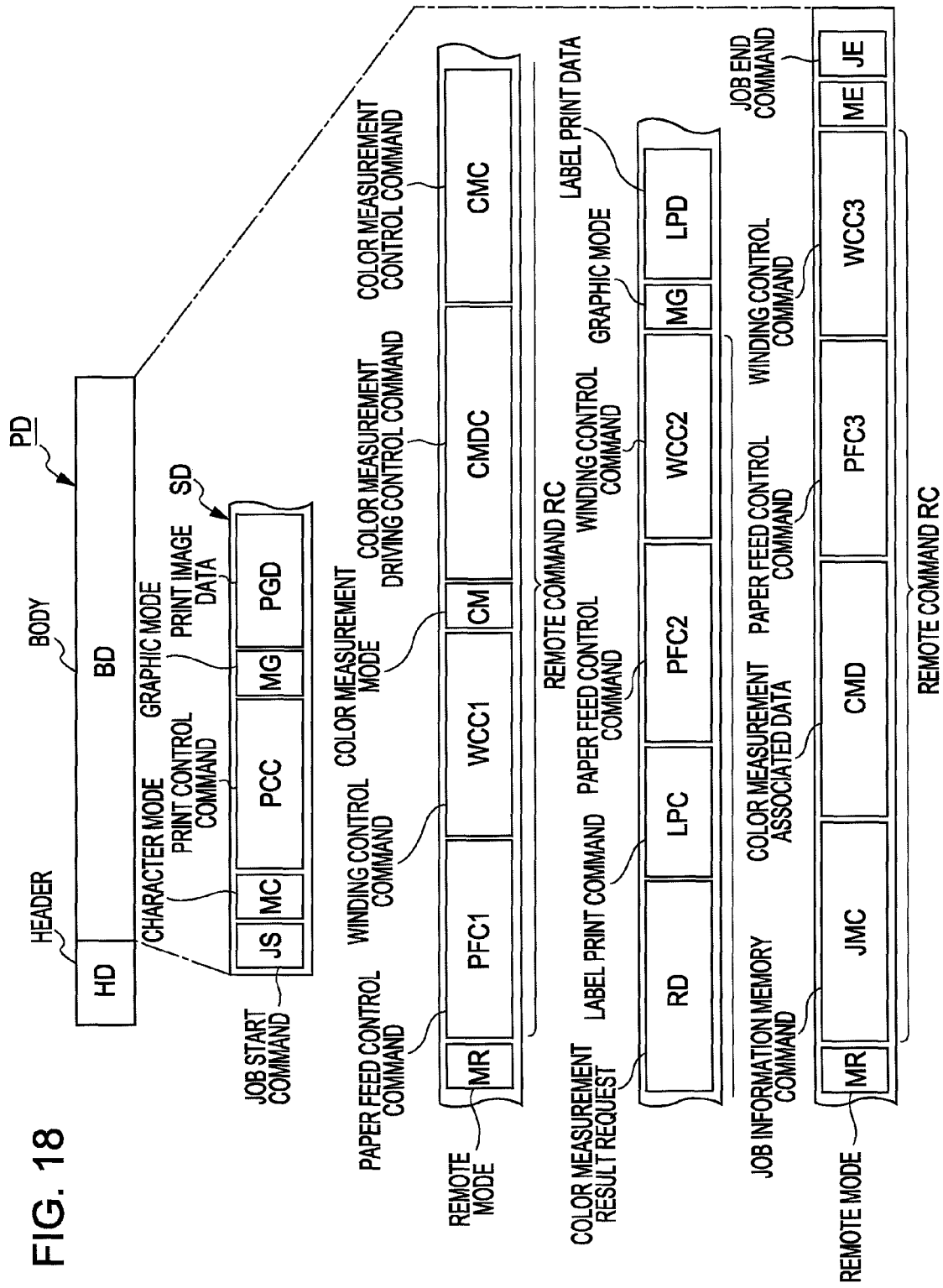
FIG. 18 is a data structure diagram showing print job data.

The structure of print job data that is generated by the first printer driver 151 will be described. FIG. 18 shows the structure of print job data PD that is generated by the first printer driver 151. In the following description, a symbol representing a command is not interpreted to match with a real print command, and for convenience of explanation, a simple symbol is used. As shown in FIG. 18, print job data PD (hereinafter, also referred to as "print data") has a header HD and a body BD. In the header HD, header information, such as the data size of the body BD and the like, is described. In the body BD, ESC/P control data SD described with a print command (in this example, "ESC/P") is stored. FIG. 18 shows, for example, print job data when printing for color measurement, color measurement, color measurement decision, and label print are performed.

As shown in FIG. 18, ESC/P control data SD has a data structure in which various control command or control codes, print image data, and the like are stored between the job start code "JS" and the job end code "JE". FIG. 18 shows a state where almost all kinds of commands or data that can be stored as data is stored, but actually, some commands or data of them is stored to constitute print data. That is, as shown in FIG. 18, ESC/P control data SD includes, between the codes "JS" and "JE", a print control command PCC, print image data PGD, paper feed control commands PFC1 to PFC3, winding control commands WCC1 to WCC3, a color measurement driving control command CMDC, a color measurement control command CMC, a label print command LPC, a label print data LPD, a job information storage command JMC, a color measurement associated data CMD, and the like. Actually, the packets, in which some commands or data are stored, are rotated and transmitted multiple times due to different transmission timing. In this case, the job start code "JS" is stored in a packet to be initially transferred constituting one job, and the job end code "JE" is stored in a packet to be finally transferred during the job.

In ESC/P control data SD, the control commands or print image data is divided and stored in time series for a plurality of modes. As the modes, the character mode, the graphic mode, and the remote mode are prepared. In ESC/P control data SD, the control codes for transition to the respective modes, that is, the character mode transition code "MC", the graphic mode transition code "MG", and the remote mode transition code "MR" are incorporated. Subsequent to each mode transition code, a command to be analyzed in the corresponding mode is stored. The character mode and the graphic mode are modes in which a command concerning printing control is analyzed, and the remote mode is a mode in which commands for control other than printing control, for example, commands for color measurement control or winding control, and maintenance control (cleaning system control) are analyzed. The character mode is a mode for analyzing a text code (character code), and the graphic mode is a mode for analyzing image data.

As shown in FIG. 18, when printing for color measurement, color measurement, color measurement decision, and label print are performed, in print job data, the job start command "JS", the character mode transition code "MC", the print control command PCC, the graphic mode transition code "MG", and print image data PGD (head control data) are stored in that order. In this example, a case in which a print image including text (document) and an image is printed.

The remote command RC is stored subsequent to the remote mode transition code "MR". The remote command RC is a command that can be stored in ESC/P control data in order to cause the printer 10 to perform control other than printing control. In this example, control, such as paper feed to the color measurement position after printing for color measurement, driving of the color measurement carriage 57 and the color meter 41, paper feed to the label print position, storage instruction of job information after label print, paper feed to the next target position after label print, and the like, is performed by using the remote command RC. The remote command RC is originally provided to drive a maintenance device (not shown) for nozzle cleaning of the recording head 19, or to perform driving control of a maintenance system to suppress nozzle clogging during printing through idle ejection (flushing) of ink droplets to a waste liquid section.

In this embodiment, the remote command RC is used to control the color measuring device 40 and the winding device 30. As shown in FIG. 18, the paper feed control command PFC1 and the winding control command WCC1 subsequent to the remote mode transition code "MR" are commands that are used to transport the roll paper R to the color measurement position. The color measurement position indicates the position of the roll paper R in the transport direction A where the color patch CP on the roll paper R can be aligned with the optical spot for color measurement of the color meter 41 in the transport direction A.

The color measurement driving control command CMDC and the color measurement control command CMC subsequent to the color measurement mode transition code "CM" are commands that are used to perform driving control of the color measurement driving device 80 and the color meter 41. The color measurement driving device 80 controls the paper push motor 71 of the color measuring device 40 and the color measurement carriage motor 60 in accordance with the color measurement driving control command CMDC.

The label print command LPC subsequent to a color measurement result request code RD is a command that is used to instruct label print. The paper feed control command PFC2 and the winding control command WCC2 are commands that are used to transport the roll paper R to the label print position. Label print data LPD subsequent to the graphic mode transition code MG is image data for label print to be printed by the printer 10. Of course, label print data may be text data including character codes.

The job information storage command JMC subsequent to the remote mode transition code MR is a command that is used to instruct the printer 10 to store job information. Next, color measurement associated data CMD is color measurement associated data to be stored in the printer 10 as job information. Color measurement associated data CMD is generated by the first printer driver 151 on the basis of color measurement data from the color meter 41. Color measurement associated data CMD includes, for example, the number of times of color measurement, color measurement frequency, color measurement condition, color measurement decision result, and the like. The job information storage command JMC also instructs to store other kinds of job information, such as ink consumption or paper consumption to be managed by the printer 10. Next, the paper feed control command PFC3 and the winding control command WCC3 are commands that are used to transport the roll paper R to the print start position of the next page or a cut position by an automatic cutter machine (not shown) after label print. In addition, a cleaning command (not shown), a flushing command (not shown), and the like are stored.

The winding control commands WCC1 to WCC3 are commands that are used to drive the winding motor 32 of the winding device 30 to rotate backward in synchronization with backward rotation of the transport roller 21 and the paper discharge roller 22 when the roll paper R is fed backward. For this reason, the winding control commands WCC1 to WCC3 are omitted when the transport direction of the roll paper R is a forward feed direction. The color measurement control command CMC is a command that is used to control the color meter 41, and is described with control codes used by the color meter manufacturer. The color measurement control command CMC may be sent from the color measurement driver 153. Though not shown in FIG. 18, a mode end code (not shown) is stored at the end of the command for each mode.

During printing for color measurement, color measurement, label print, job information storage instruction, or the like, if it comes to the transmission timing, the host control section 156 transmits a command or data in print data PD shown in FIG. 18. For this reason, the host control section 156 has a functional section to perform printing for color measurement, color measurement, label print, job information storage instruction, or the like.

Figure 19:
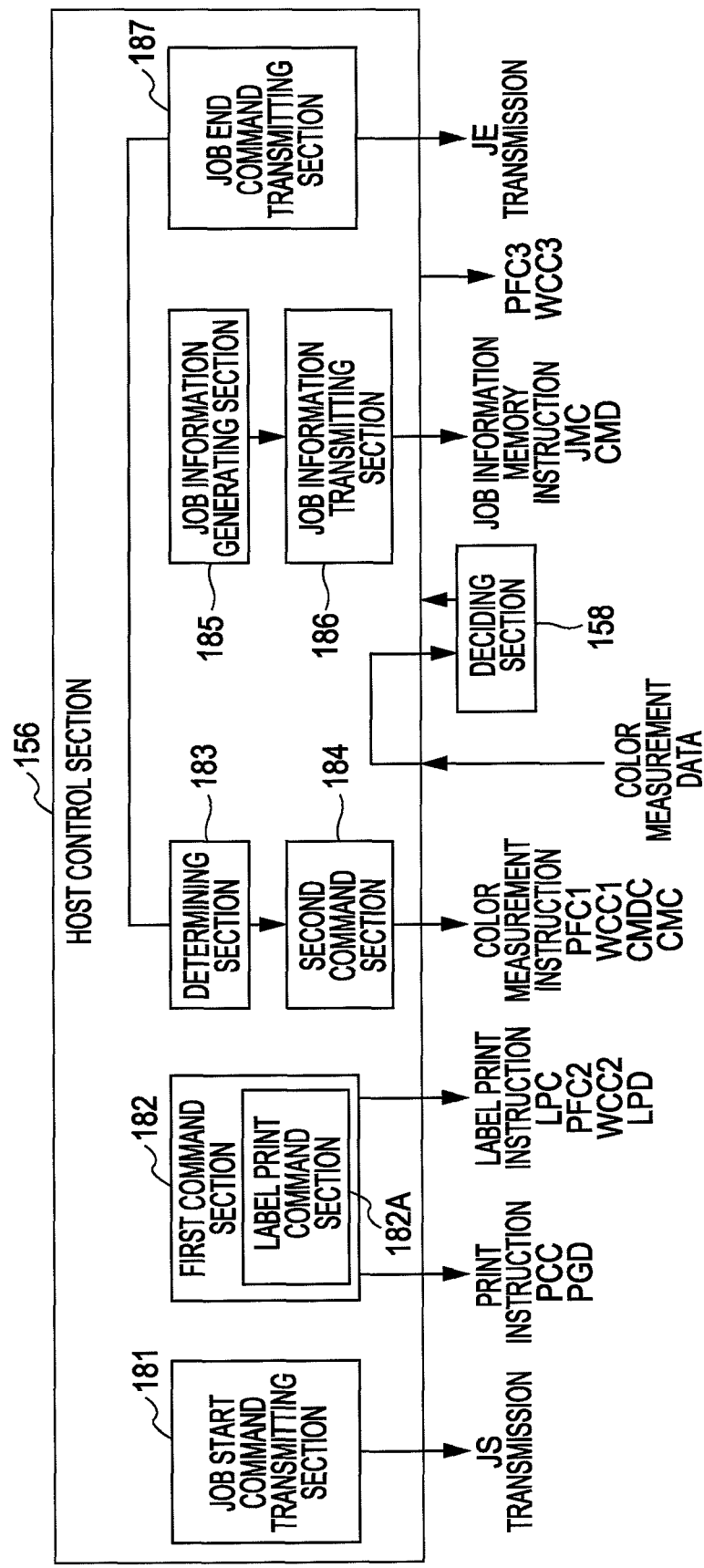
FIG. 19 is a block diagram showing the configuration of a main control section in a printer driver.
Figure 20:
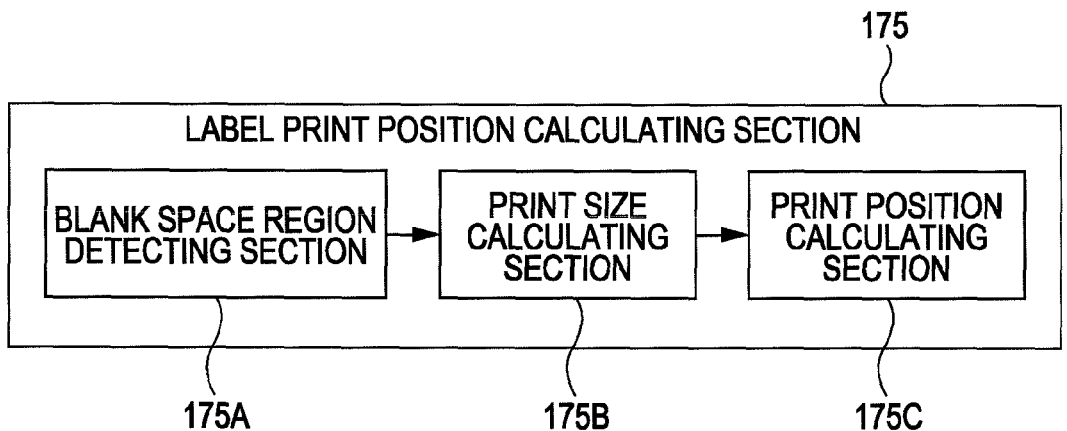
FIG. 20 is a block diagram showing the configuration of a label print position calculating section.

FIG. 19 is a block diagram showing the configuration of a main control section. As shown in FIG. 19, the host control section 156 includes a job start command transmitting section 181 serving as a job start notifying section, a first command section 182, a label print command section 182A, a determining section 183, a second command section 184, a job information generating section 185, a job information transmitting section 186, and a job end command transmitting section 187 serving as a job end notifying section. The host control section 156 activates those sections as occasion demands.

The job start command transmitting section 181 transmits the job start command "JS" to the printer 10 when a job starts. The first command section 182 is activated during normal printing and printing for color measurement, and transmits the print control command PCC and print image data PGD to the printer 10, thereby instructing printing. The first command section 182 includes the label print command section 182A that is activated at the time of label print. The label print command section 182A transmits the commands PFC2 and WCC2 for the paper feed system, which are used to transport the roll paper R to the label print position, and the commands LPC and LPD, which are used to execute label print, to the printer 10, thereby instructing label print.

The determining section 183 determines presence/absence of settings for color measurement. For example, information (for example, a flag or the like) indicating that the user sets the color patch CP on the setup screen 140 shown in FIG. 17 and instructs printing for color measurement is stored in the memory. The determining section 183 determines presence/absence of color measurement to be executed on the basis of the information. If there is no color measurement to be executed, the determining section 183 notifies the job end command transmitting section 187 that there is no color measurement to be executed, and the print job ends. If there is color measurement to be executed, the determining section 183 notifies the second command section 184 that there is color measurement to be executed.

The second command section 184 instructs the printer 10 to perform color measurement on the basis of the notification from the determining section 183. That is, the second command section 174 transmits the commands PFC1 and WCC1 for the paper feed system, which are used to transport the roll paper R to the color measurement position, and the commands CMDC and CMC for the color measurement system, which are used to cause the color measuring device 40 to perform color measurement.

The job information generating section 185 generates color measurement associated data CMD to be stored in the printer 10 as job information by using color measurement data acquired from the color measuring device 40 and color measurement result decision information of the deciding section 158. Color measurement associate data includes, for example, information that is effective to give an advice concerning color measurement, such as color measurement frequency, color measurement condition, color measurement decision result, or the like, to the printer user.

The job information transmitting section 186 transmits color measurement associated data CMD generated by the job information generating section 185 to the printer 10 as job information, together with the command JMC for storing the color measurement associated data CMD. In this embodiment, the job information generating section 185 and the job information transmitting section 186 constitute a job information storage instruction section.

The determining section 183 determines presence/absence of settings of label print. For example, information (for example, a flag or the like) indicating that the user operates the label print setup button 141 on the setup screen 140 for color measurement shown in FIG. 17 and instructs label print is stored in the memory. The determining section 183 determines presence/absence of label print to be executed on the basis of the information. If there is no label print to be executed, the determining section 183 notifies the job end command transmitting section 187 that there is no label print to be executed, and the print job ends. If there is label print to be executed, the determining section 183 notifies the label print command section 182A of the first command section 182 that there is label print to be executed. The label print command section 182A instructs label print on the basis of the notification from the determining section 183.

When the print job ends, the job end command transmitting section 187 transmits the job end command "JE" to the printer 10. Until the job end command "JE" is received, the printer 10 maintains communication connection to the host apparatus 150, and inhibits an interrupt from a different host apparatus. The job end command "JE" may be transmitted after normal printing ends with no color measurement subsequent to printing, or after job information storage instruction based on color measurement associated data. In this embodiment, after final printing ends during the job, the host control section 156 transports the roll paper R to a predetermined position, such as the print start position of the next page or the roll paper cut position, and transmits the commands PFC3 and WCC3 for the paper feed system to the printer 10. For this reason, when the final operation of the job is printing, after the commands PFC3 and WCC3 for the paper feed system are transmitted, the job end command "JE" is transmitted.

Returning to FIG. 16, the electrical configuration of the printer system 100 will be described. As described above, the printer system 100 includes the printer 10, the winding device 30, and the color measuring device 40. The color measuring device 40 includes the color measurement driving device 80 and the color meter 41.

The communication section 81 of the printer 10 is connected to the communication sections 82 to 84 of the three devices 30, 41, and 80 (optional device) through the hub 85 and the three communication cables 86 to 88. In this example, USB communication is performed between the printer 10 and the optional devices. The communication section 82 is formed by a USB host, and the communication sections 82 to 84 are formed by USB devices.

The printer 10 includes a command analyzing section 101, an image buffer 102, a control section 103, a second printer driver 89, a nonvolatile memory 171, a RAM 173, driving circuits 104 to 106, a recording head 19, a CR motor 107, a PF motor 108, an encoder 109, a paper detection sensor 110, a paper width sensor 111, and a linear encoder 112.

The command analyzing section 101 analyzes print data (ESC/P control data) receives from the first printer driver 151 of the host apparatus 150. If a mode transition code is present in print data, the command analyzing section 101 changes the operation mode to a mode specified by the corresponding code (that is, activates an analysis module according to the mode). There are three modes of the character mode, the graphic mode, and the remote mode. A command to be analyzed is decided for each mode, and only a command to be analyzed is analyzed and sent to a destination according to the mode. For example, if the operation mode is the character mode, the print control command PCC (see FIG. 18) is analyzed and sent to the control section 103. If the operation mode is the graphic mode, print image data PGD (see FIG. 18) is analyzed and sent to the image buffer 102. If the operation mode is the remote mode, the remote command RC (see FIG. 8) is analyzed and sent to the second printer driver 89. In this case, the commands other than a command to be analyzed for each mode are discarded.

The control section 103 controls the print engine 95 (see FIG. 4) that includes the recording head 19, the CR motor 107, and the PF motor 108. The control section 103 has a function to calculate the label print position where label print of the decision result based on color measurement data of the color meter 41 is performed, a function to measure and calculate ink consumption and paper consumption, and a function to store job information in a job information storage section 172 of the nonvolatile memory 171. To this end, the control section 103 includes a head control section 113, a carriage control section 114, a paper feed control section 115, a label print position calculating section 175, an ink consumption arithmetic section 176, and paper consumption count section 177.

The second printer driver 89 undertakes control other than printing control, and in addition to cleaning system control or idle ejection (flushing) control of the printer 10, controls the color meter 41, the color measurement driving device 80, and the winding device 30 through communication. If the accepted remote command RC is a command that is used to control the color measurement driving device 80 and the winding device 30, the second printer driver 89 generates print data, in which the command is incorporated as the remote command, and transmits print data to control the color measurement driving device 80 and the winding device 30. For this reason, the second printer driver 89 of this embodiment is a simple printer driver and, similarly to the first printer driver 151, has a function to generate ESC/P control data SD described with the print command (ESC/P) to generate print data PD with ESC/P control data SD in the body BD. The second printer driver 89 is constructed to have some of the functions of the first printer driver 151 by using the first printer driver 151. The second printer driver 89 includes a remote command analyzing section 116, a command generating section 117, and a coordinate calculating section 118. That is, the same relationship as that between the first printer driver 151 and the printer 10 is established between the second printer driver 89, the color measurement driving device 80, and the winding device 30.

The command analyzing section 101, the control section 103, and the second printer driver 89 include, for example, a CPU, an ASIC (Application Specific IC), a ROM, a RAM, and the like. In this example, the command analyzing section 101 is formed by hardware, for example, an ASIC, and the control section 103 and the second printer driver 89 are formed by software, which is implemented by a program stored in the ROM to be executed on the CPU. Of course, all of them may be formed by software, hardware, such as an integrated circuit (for example, a custom IC including an ASIC or the like), or a combination of software and hardware (in this case, an arbitrary combination may be selected).

The command analyzing section 101 analyzes print data PD (ESC/P control data SD) shown in FIG. 18. For example, if the character mode transition code MC is present, the command analyzing section 101 changes the operation mode to the character mode, and analyzes the print control command PCC (see FIG. 18). As the result of analysis, if the print control command PCC (for example, including a character code, such as ASCII code or the like) is present, the print control command PCC is sent to the control section 103. The control section 103 generates image data from the character code by using the character generator (not shown), and stores image data in the image buffer 102. The head control section 113 drives the recording head 19 in synchronization with an ink ejection timing signal based on image data (raster data) read from the image buffer 102 by one pass (the drive amount of the carriage 17 in the main scanning direction B every time), and ejects ink droplets from the nozzles of the recording head 19 with a predetermined timing while the carriage 17 is traveling in the main scanning direction B. The control section 103 sends a carriage drive command (hereinafter, referred to as "CR drive command") to the carriage control section 114, and sends a paper feed command to the paper feed control section 115.

Meanwhile, if the graphic mode transition code MG is present, the command analyzing section 101 changes the operation mode to the graphic mode, and analyzes print image data PGD (see FIG. 18). As the result of analysis, if print image data PGD (including label print data LPD) is present, print image data PGD is sent to the image buffer 102. The control section 103 calculates a start position and a stop position during one pass of the carriage 17 based on print image data PGD read from the image buffer 102 by one pass. Then, if a carriage activation time for a next pass comes, the control section 103 sends the CR drive command to the carriage control section 114, and instructs to activate the carriage 17. If a paper feed start time comes after printing in the previous pass ends, the control section 103 sends the paper feed command to the paper feed control section 115, and instructs a paper feed operation. The paper feed operation used herein includes a paper feed operation, a paper feed operation during printing (narrow sense), and a paper discharge operation.

The paper feed control section 115 drives the PF motor 108 through the driving circuit 106 on the paper feed command and feeds the roll paper R by the amount as instructed. If the roll paper R is sent to a next print position, the carriage control section 114 drives the CR motor 107 through the driving circuit 105 on the basis of the CR drive command, and operates the recording head 19 in the main scanning direction B by one pass. During one pass, the head control section 113 drives the recording head 19 through the driving circuit 104 on the basis of print image data PGD. Then, ink droplets are ejected from the nozzles of the recording head 19, printing (recording) for one raster is performed on the basis of print image data PGD.

The recording head 19 is provided with an ejection driving element for each nozzle. If the ejection driving element is driven by an application voltage of a predetermined waveform, ink droplets are ejected from the nozzles. As the ejection driving element, a piezoelectric vibrating element or an electrostatic driving element may be used. In addition, a heater for ink heating may be used. In this case, ink is film-boiled, and ink droplets are ejected from the nozzles by expansion of bubbles in the ink flow channel communicating with the nozzles.

The label print position calculating section 175 calculates the position (label print position) where the label of the decision result based on the color measurement result by the color measuring device 40 is printed. In the related art, when the color measurement decision result is OK, the user manually attaches a label indicative of "OK". In contrast, a label indicative of "OK" is printed. In this case, the label print position corresponding to the color patch CP is automatically calculated. In order to automatically calculate the label print position, the label print position calculating section 175 includes a blank space region detecting section 175A, a print size calculating section 175B, and a print position calculating section 175C shown in FIG. 20. Automatic calculation is performed as follows. First, a blank space region excluding the print regions of the print image IG and the color patch CP (see FIG. 21A) is detected within the paper area. A label print area is set at a position corresponding to the color patch CP within the blank space region size. When the label print area is decided, the label print size and position are decided under the conditions: (1) the blank space region equal to or less than a predetermined percent (%) (a predetermined percent (%) less than 100% and in a range of 30 to 90%), (2) the size according to the paper size, (3) the position corresponding to the color patch CP.

Figure 21A:
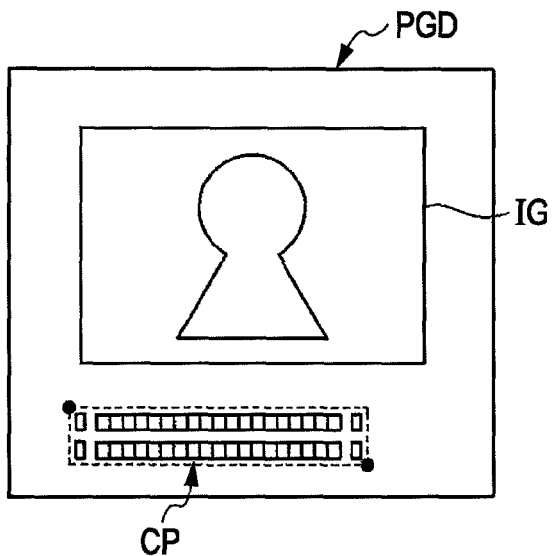
FIGS. 21A and 21B are schematic views illustrating a method of generating label print data.

In this example, in deciding the label print area, first, the blank space region detecting section 175A detects the blank space region excluding the print image IG and the color patch CP shown in FIG. 21A within the paper area (when a margin is set in the paper edge portion, a printable area excluding the margin). In this example, the coordinates of the print image IG and the color patch CP are acquired from print data received from the first printer driver 151, or obtained from the count value of the counter 115A when the user wants to print an object to be printed (the print image IG or the color patch CP) while identifying the object to be printed or information concerning the ejection start position and ejection end position calculated by the head control section 113, and stored in the RAM 173. Meanwhile, the coordinates of the print image IG and the color patch CP are stored in the RAM 173 after being converted into the coordinates of the real coordinate system. The blank space region detecting section 175A calculates the coordinates of the rectangular blank space region adjacent to the color patch CP in four directions (up, down, left, and right directions) within the printable area on the basis of the coordinates stored in the RAM 173.

In this example, a decision result image is set so as to be preferentially disposed nearby the color patch CP in the patch column direction (in FIG. 21A, the left-right direction) rather than to be disposed nearby the color patch CP in a direction (in FIG. 21A, the up-down direction) perpendicular to the patch column direction. That is, only when the decision result image cannot be disposed nearby the color patch CP in the patch column direction, the decision result image is disposed nearby the color patch CP in the direction perpendicular to the patch column. When a plurality of print images are printed and the color patch CP is printed for each print image, the decision result images to be attached to a plurality of color patches CP are preferentially arranged in order. For this reason, the widest rectangular blank space region is not used, but a rectangular blank space region is decided on the basis of the priority of the arrangement direction with respect to the color patch CP and the space of the rectangular blank space region. Of course, the user may specify the arrangement direction nearby the color patch CP on the setup screen with the mouse or the like.

The print size calculating section 175B first calculates a rectangular region, in which the shape (in FIG. 21B, a rectangle) of the decision result image (for example, an image "OK" shown in FIG. 21B) is inscribed, within the area of the predetermined percent (%) inside the blank space region size. The size of the calculated rectangular region (rectangular region size) is reduced as occasion demands to have a predetermined size with respect to the paper size. In this case, when the rectangular region size is equal to or less than the predetermined size with respect to the paper size, the rectangular region size is not reduced. In this way, the print size is calculated by the lengths Lx and Ly of two sides in the horizontal and vertical directions. Of course, the print size may be calculated by the coordinates (xs1,ys1) and (xs2,ys2) of two diagonally opposing points in the rectangular region. Any numeric data may be used insofar as the print size can be specified. The direction of the decision result image is disposed such that a character string or the like of the decision result and the print image are in the same direction.

Next, the print position calculating section 175C calculates the coordinates under the above-described condition (3) such that the rectangular region of the print size is disposed at a position corresponding to the color patch CP. With respect to the position of the rectangular region (decision result print position), the position relationship with respect to the color patch CP and the distance from the color patch CP are defined. When the rectangular region is disposed nearby the color patch CP in the X direction, it is disposed so as to be aligned with the color patch CP in the Y direction. As shown in FIG. 21A, when two columns of color patches CP are printed, the position of the rectangular region in the Y direction is decided such that the center of the rectangular region in the Y direction is aligned with the center of the two columns in the Y direction. When the rectangular region is disposed nearby the color patch CP in the Y direction, while the X and Y directions are inverted, the position of the rectangular region in the X direction is decided by calculation based on the same concept.

In this way, if the position in a direction perpendicular to a direction in which the rectangular region is disposed nearby the color patch CP is decided, next, the position in the direction in which the rectangular region is disposed nearby the color patch CP is decided. As described above, this position is decided on the basis of the distance from the color patch CP. This distance is set individually in accordance with the direction (in FIG. 21A, the left-right direction or the up-down direction) in which the rectangular region is disposed nearby the color patch CP. For example, let the distance from the color patch CP when the rectangular region is disposed nearby the color patch CP in the left-right direction be $\Delta Qx$, then, the position of the rectangular region in the X direction is set to a position spaced at the distance $\Delta Qx$ from the print region of the color patch CP in the X direction.

Let the coordinates of the print region of the color patch CP be (xcp1,ycp1) and xcp2,ycp2), then, the print position calculating section 175C calculates the coordinates of the rectangular region on the immediate right side of the color patch CP as (xcp2+ΔQx,ycp1), (xcp2+ΔQx, (ycp1+ycp2+Ly)/2), and (xcp2+ΔQx+Lx, (ycp1+ycp2−Ly)/2). The position relationship of the rectangular region with respect to the color patch CP may be appropriately set. Thus, calculation according to the position relationship to be used may be performed in the same manner.

The second printer driver 89 of this embodiment is provided with the same image data processing section as the printer driver, and performs the image processing (resolution conversion, color conversion, halftoning, or the like) for label image data received from the first printer driver 151 to generates label print data on the CMYK color system. In this case, resolution conversion and magnification are performed such that the label print image has the rectangular region size. Of course, decision result characters may be substituted for the decision result image. In this case, the second printer driver 89 converts character data (ASCII code or the like) of the decision result characters into print data that can be printed with a predetermined size. After the position and size of label print are calculated, the values (label print position information) may be sent to the first printer driver 151 of the host apparatus 150. The first printer driver 151 may perform an image processing by using the values to generate print data for label print, and may transmit print data to the printer 10.

Figure 21B:
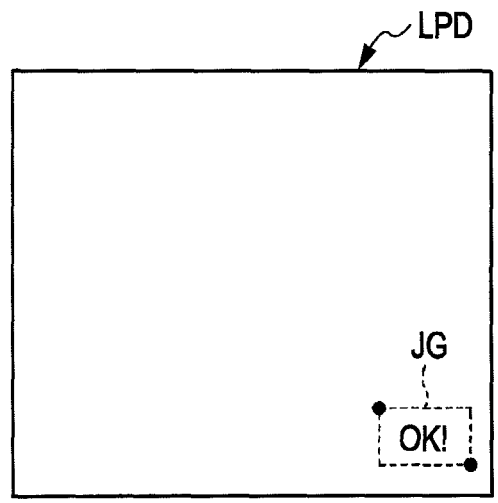
Figure 22A:
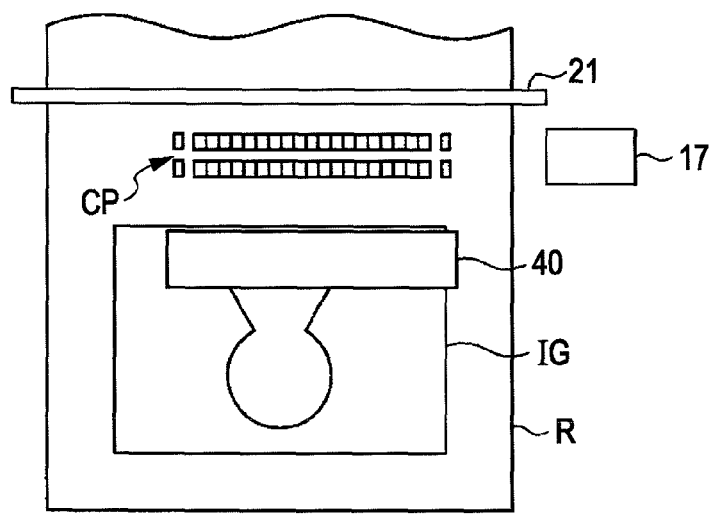
FIGS. 22A to 22C are schematic views illustrating printing for color measurement, color measurement, and label print, respectively.
Figure 22B:
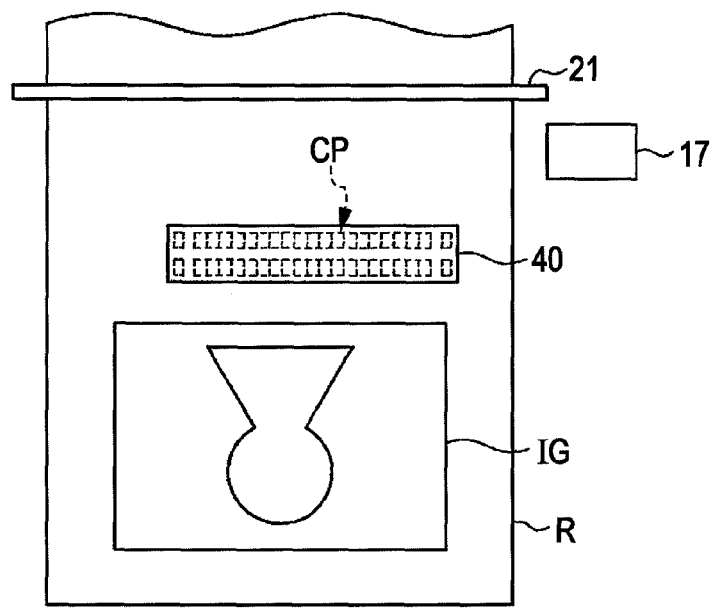
Figure 22C:
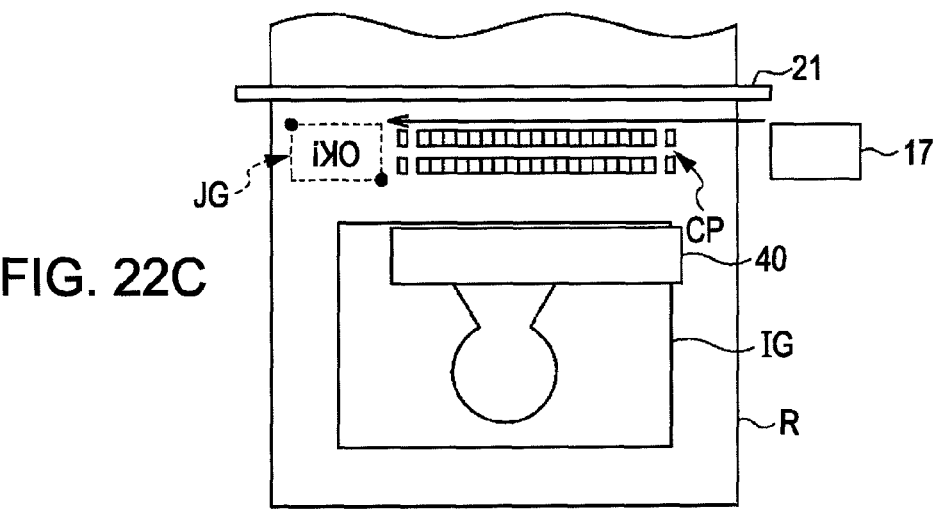

In this way, the second printer driver 89 generates label print data LPD shown in FIG. 21B corresponding to print image data PGD for color measurement shown in FIG. 21A, which has already been printed. As shown in FIG. 21B, label print data LPD becomes print data in which the print position of the decision result image JG is set to a position corresponding to the blank space region nearby the color patch CP in print image data PGD for color measurement and a position at a regular distance from the color patch CP. Under the above-described condition (2), the rectangular region size (decision result print size) is adjusted according to the paper size. Alternatively, the rectangular region size may be adjusted according to the print size of the color patch CP.

Returning to FIG. 16, the ink consumption arithmetic section 176 calculates ink consumption (cumulative ink consumption). The head control section 113 has a dot counter (not shown) that counts the number of ink dots to be ejected from the nozzles of the recording head 19 on the basis of raster data acquired from the image buffer 102. The head control section 113 calculates ink consumption on the basis of the count value of the dot counter, and adds calculated ink consumption to previous cumulative ink consumption to calculate current cumulative ink consumption.

The paper consumption count section 177 counts paper consumption (the number of consumed sheets or consumed paper length). For example, the consumed length of the roll paper R due to printing is counted on the basis of the count value of the counter 115A (described below) that counts the value corresponding to the transport length of the roll paper R from the front end. In the case of single sheets of paper, the paper consumption count section 177 counts the number of sheets fed from the sheet cassette (not shown) by using a counter (not shown).

When the remote mode transition code MR is present, the command analyzing section 101 changes the operation mode to the remote mode, analyzes the remote command RC to be analyzed, and sends the analyzed remote command RC to the second printer driver 89. For this reason, in the remote mode, the paper feed control command PFC1, the winding control command WCC1, the color measurement driving control command CMDC, the color measurement control command CMC, the label print command LPC, the job information storage command JMC, color measurement associated data CMD, and the like are sent to the second printer driver 89. While the remote command is being analyzed, if the color measurement mode transition code "CM" is present, the operation mode is changed to the color measurement mode. In this case, only the color measurement driving control command CMDC and the color measurement control command CMC are to be analyzed.

The second printer driver 89 generates a new command on the basis of the remote command, and transmits the new command in a print data format to control the color meter 41, the color measurement driving device 80, and the winding device 30. The value of the remote command generated by the first printer driver 151 is specified by the logical coordinate system. For example, the value "Y" of the paper feed command "PF(Y)" is specified as the value of the logical coordinate system on the paper calculated by the logical coordinate calculating section 159. Therefore, even if the roll paper R is misaligned from the reference position on the printer 10, the second printer driver 89 generates a command specified by a value converted from the logical coordinate system to the real coordinate system, such that recording or color measurement can be accurately performed at a corresponding position represented by the logical coordinates on the roll paper R.

The logical coordinate is an ideal coordinate system on an assumption that the roll paper R is not misaligned in the transport direction A and the paper width direction. The logical coordinate is a coordinate system in which the recording position or the color measurement position of the color patch CP is represented by coordinates with a predetermined position (in this example, the upper left corner of each page) of the roll paper R as the origin (0,0) (see FIG. 17).

In contrast, the real coordinate is a coordinate system on an assumption that the roll paper R is slightly misaligned in the transport direction A and the paper width direction, in which the recording position or the color measurement position of the color patch CP is represented with a separate position (reference position) from the roll paper R as the origin. Accordingly, in the real coordinate system, the coordinate value is obtained in consideration of the misalignment amount of the roll paper R. For this reason, if a command specifying the value of the real coordinate system is generated, position control of an object to be controlled (for example, the roll paper R, the color measurement carriage 57, the color meter 41, or the like) is possible so as to be accurately positioned at the real recording position or color measurement position, regardless of misalignment of the roll paper R. In this embodiment, with respect to the origin of the real coordinate system, as shown in FIG. 10A, the front end of the roll paper R reaches the set reference position of the recording head 19 (for example, the uppermost nozzle position) is used as the origin "0" in the transport direction A. The home position (see FIG. 11) of the color measurement carriage 57 (or the color meter 41) is used as the origin in the main scanning direction B (paper width direction).

Conversion from the value of the logical coordinate system to the value of the real coordinate system is performed by using the measurement value of the position of the roll paper R in the transport direction A and the measurement value of the position of the roll paper R in the main scanning direction B (paper width direction). For this reason, in the printer 10 of this embodiment, paper position information concerning the positions of the roll paper R in the transport direction A and the main scanning direction B (paper width direction) is measured.

Next, a method of acquiring position information of the roll paper R, which is used when a command of the real coordinate system is generated, will be described. In this embodiment, as the position information of the roll paper R, the position of the roll paper R in the transport direction A, the position of the roll paper R in the main scanning direction B (misalignment amount), and the misalignment amount in the main scanning direction B due to skewed movement of the roll paper R at the position of the color meter 41 on the downstream side in the transport direction from the detection position with respect to the position of the roll paper R in the main scanning direction B are calculated.

First, the position of the roll paper R in the transport direction A is measured by using the paper detection sensor 110, the encoder 109, and a counter 115A in the paper feed control section 115. The encoder 109 shown in FIG. 16 detects rotation of the PF motor 108 and outputs an encoder signal having pulses proportional to the rotation amount. The encoder 109 detects, for example, rotation of the rotary shaft of the gear wheel train on a power transmission path of the PF motor 108, thereby indirectly detecting the rotation of the PF motor 108. The paper detection sensor 110 is located at a predetermined position on the transport path of the roll paper R, and detects the front end of the roll paper R while the roll paper R is being fed.

Next, the processing to be executed by the second printer driver 89 shown in FIG. 16 is the same as the first embodiment. In this embodiment, as the result of analysis by the remote command analyzing section 116, the paper feed control commands PFC1 to PFC3, the winding control commands WCC1 to WCC3, the color measurement driving control command CMDC, and the like are analyzed as commands, which require conversion from the value of the logical coordinate system to the value of the real coordinate system. The command generating section 117 and the coordinate calculating section 118 incorporate the values (color measurement position or drive amount) of the real coordinate system that are obtained by converting the values of the logical coordinate system in the commands, which require coordinate conversion, into the values of the real coordinate system, as the values of the commands, thereby generating the control commands for the paper feed system, the color measurement system, and winding system.

As described above, in this embodiment, similarly to the first embodiment, the recording positions of the print image IG and the color patch CP are set to the print positions of the real coordinate system with the misalignment of the roll paper R in the paper width direction added. Therefore, the coordinates of the print image IG and the color patch CP that are used to decide the coordinate of the decision result image JG are stored in the RAM 173 as the coordinates of the real coordinate system.

Figure 23:
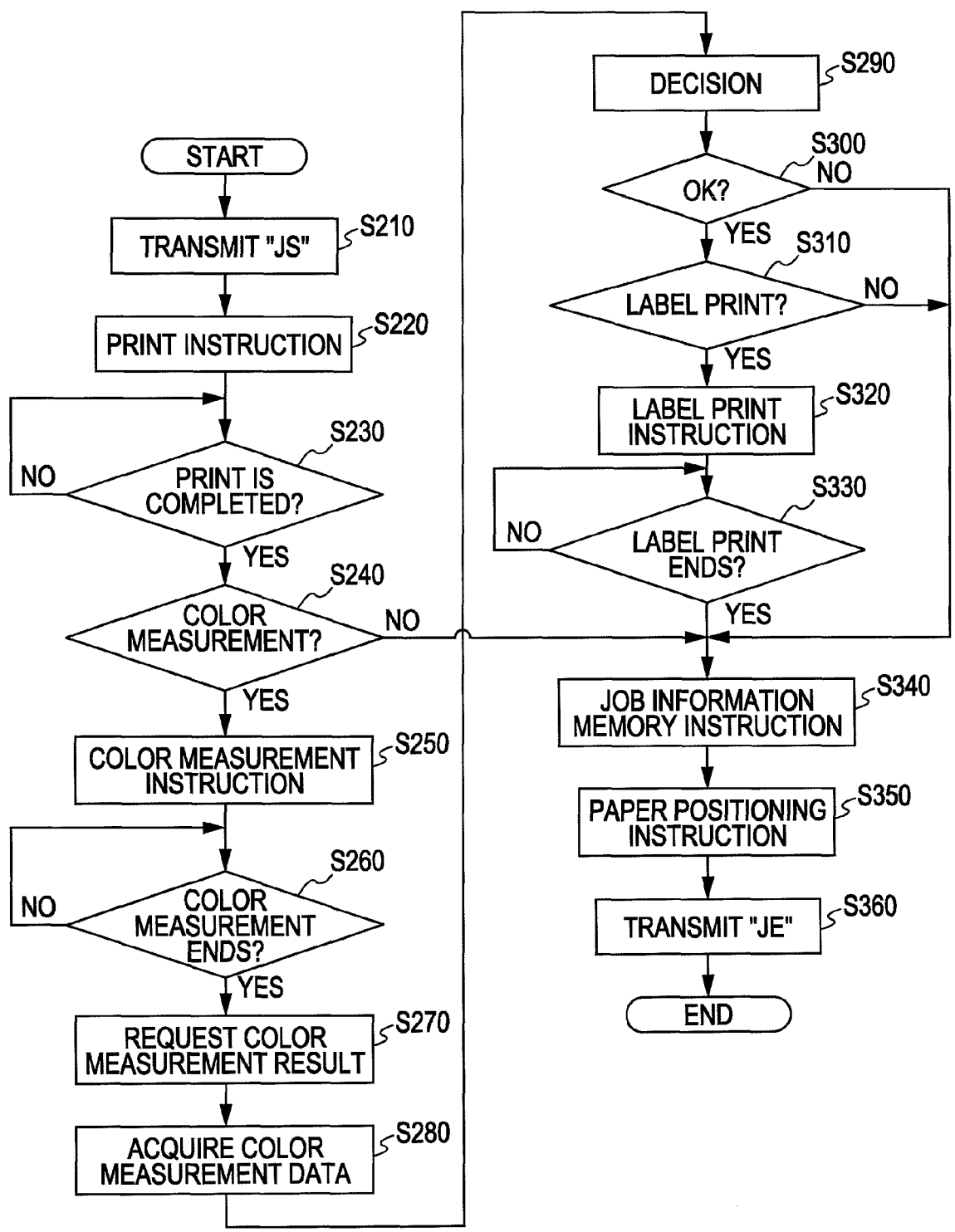
FIG. 23 is a flowchart showing a processing of a printer driver.
Figure 24:
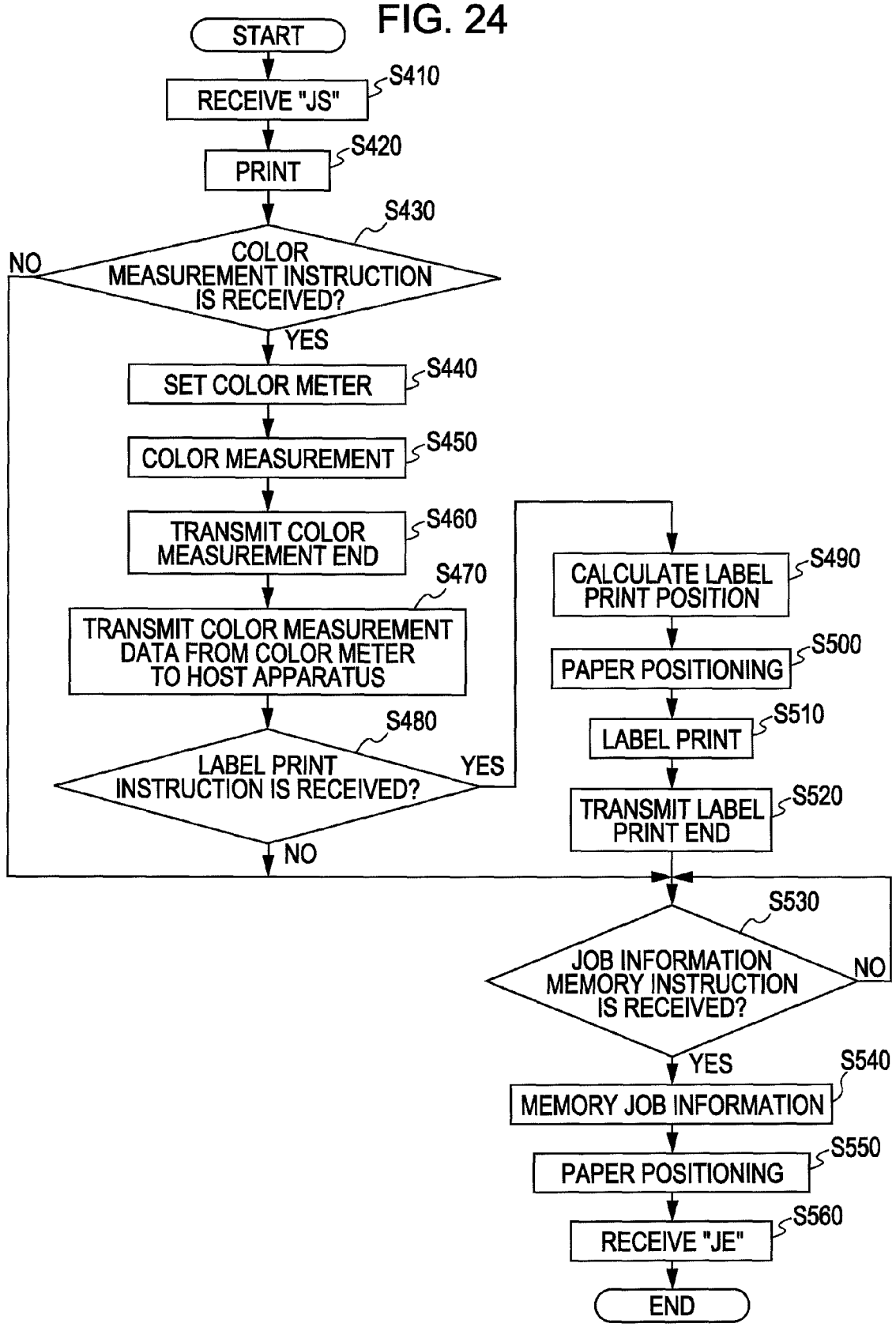
FIG. 24 is a flowchart showing a processing of a printer.

Next, the processing of the printer system 100 will be described with reference to flowcharts of FIGS. 23 and 24 and a transaction diagram of FIG. 25. The flowcharts are not limited to a processing by software, and they may include a processing by hardware.

The user may operate the input device 162 of the host apparatus 150 to execute normal printing in which the image displayed on the monitor 150a is printed, or to specify the color patch on the setup screen for color measurement, thereby executing printing for color measurement. When printing for color measurement is executed, an image for color measurement is printed, and subsequently color measurement is performed for the color patch CP. When the user wants to perform label print of the decision result by the first printer driver 151 based on color measurement data acquired by the color meter 41, he/she operates the label print setup button 141 on the setup screen 140 for color measurement shown in FIG. 17 to execute printing for color measurement.

When printing is executed, the host apparatus 150 (specifically, the first printer driver 151) establishes communication with the printer 10. If communication is established, first, the host apparatus 150 transmits the job start command "JS" to the printer 10 (S210) (job start step). When receiving the job start command "JS" (S410), the printer 10 inhibits an interrupt from a host apparatus different from the host apparatus 150 on the network until the job end command "JE" is received from the host apparatus 150. Therefore, even if an interrupt request is input from a different host apparatus, the printer 10 does not accept the request.

Next, print data is sent from the host apparatus 150 to the printer 10, and printing is instructed (S220) (first command step). For example, print data for color measurement to print the print image IG and the color patch CP is transmitted. The printer 10 prints the print image IG and the color patch CP on the roll paper R on the basis of print data (S420). At this moment, the host apparatus 150 confirms the print progress situation in the printer 10, and if a response concerning the end of printing is sent from the printer 10 (in S230, Yes), next, it is determined whether or not there is color measurement to be executed by the color measuring device 40 (that is, whether or not the user specifies color measurement on the setup screen for color measurement and instructs to execute printing) (S240) (determination step).

If there is color measurement to be executed by the color measuring device 40 (in S240, Yes), next, the host apparatus 150 instructs color measurement (S250) (second command step). When the color measurement instruction is accepted from the host apparatus 150 (in S430, Yes), the printer 10 transmits received color measurement instruction data to the color meter 41 to instruct the color meter 41 to perform settings (S440). As a result, the color meter 41 performs initialization or setting of the color measurement condition.

Next, the printer 10 performs color measurement (S450). That is, the printer 10 drives the PF motor 108 to position the roll paper R at the color measurement position in the transport direction A. Thereafter, the printer 10 instructs the color measurement driving device 80 to push the roll paper R. As a result, the paper push motor 71 is driven to rotate forward such that the roll paper R disposed at the color measurement position is pressed by the press member 44 (see FIGS. 3 and 11). Next, the printer 10 instructs the color measurement carriage 57 to position in the column direction C (the main scanning direction B). As a result, the color measurement carriage 57 moves at a constant speed in the main scanning direction B (for example, an example of scan color measurement). In this case, the printer 10 (specifically, the second printer driver 89) sequentially receives position information of the color measurement carriage 57, which is counted by the counter 125A on the basis of the output signal from the encoder 130 of the color measurement driving device 80, from the color measurement driving device 80. In addition, in synchronization with the movement of the color measurement carriage 57, the printer 10 instructs the color meter 41 to acquire color measurement data each time the color meter 41 reaches a position where color measurement can be performed for the center of the unit patch D. The color meter 41 stores color measurement data in the buffer on the basis of the instruction to acquire data at the timing at which the color meter 41 reaches a position where color measurement can be performed for the center of the unit patch D. If color measurement ends for one column of color patch CP in such a manner, the color measurement carriage 57 is moved to the home position. If the color measurement carriage 57 returns to the home position, the paper push motor 71 is driven to rotate backward to release the roll paper R of the press member 44.

Next, if there is a color patch CP that is subject to color measurement, the roll paper R is transported to the next color measurement position. Hereinafter, when a plurality of columns of color patches CP are present, the same processing is repeatedly performed until color measurement ends for all of the color patches CP.

At this moment, the host apparatus 150 sequentially transmits the color measurement progress request to the printer 10 and determines whether or not color measurement ends (S260). The printer 10 monitors the end of color measurement of the color measurement driving device 80 (end status), and if a response concerning the end of color measurement is accepted, transmits the response concerning the end of color measurement to the host apparatus 150 (S460). If the end of color measurement is notified (in S260, Yes), the host apparatus 150 requests the printer 10 to send the color measurement result (S270). The printer 10 that accepts the color measurement result request sends the color measurement result request to the color meter 41. The color meter 41 that accepts the color measurement result request sends the color measurement result (color measurement data) to the host apparatus 150 through the printer 10. If color measurement data is accepted, the host apparatus 150 (specifically, the deciding section 158) decides pertinence of a print color on the basis of color measurement data (S290). It is decided whether or not the decision result is "OK" (S300), and if the decision result is "OK" (in S100, Yes), the host apparatus 150 (specifically, the determining section 183 shown in FIG. 19) determines whether or not there is label print (S310). If the result is determined to be "OK", the host apparatus 150 (specifically, the label print command section 182A shown in FIG. 19) instructs label print (S410). With respect to the label print instruction, the commands for the paper feed system, the commands for the label print system, and label print data LPD are transmitted to the printer 10. The host apparatus 150 (specifically, the job information generating section 185 shown in FIG. 19) generates color measurement associated data (data including job information concerning color measurement, such as color measurement frequency, color measurement condition, decision result, and the like) to be stored in the printer 10 as job information on the basis of acquired color measurement data and the decision result of the deciding section 158, and temporarily stores color measurement associated data in the data storage section 157.

The printer 10 that accepts the label print instruction calculates the label print position (S490). That is, the label print position calculating section 175 (see FIG. 20) is activated to calculate the label print position on the basis of print image data for color measurement and label print data LPD acquired from the host apparatus 150.

In the label print position calculating section 175, first, the blank space region detecting section 175A detects the blank space region other than the print image IG and the color patch CP from print image data for color measurement, and calculates the print size, in which the label print image (rectangle) is inscribed, within an area of a predetermined percent (%) with respect to an area nearby the color patch CP in each of the four directions from the detected blank space region. When a plurality of candidates are present, a blank space region having a highest arrangement priority is selected. The print position calculating section 175C calculates the print position disposed at a predetermined distance from the color patch CP. In this way, the label print position is calculated.

If the label print position is decided, the printer 10 positions the roll paper P to the label print position (S500). That is, the printer 10 incorporates the label print position into the values of the commands for the paper feed system, which are accepted when label print is instructed, and generates the paper feed command that is used to transport the roll paper R from the color measurement position to the label print position. In this case, the roll paper R is fed backward (backward feed) from the color measurement position to the label print position. Accordingly, the label print position is incorporated into the value of the winding control command WCC2 to generate the winding command that is required for the backward feed operation. The printer 10 drives the PF motor 108 to rotate backward in accordance with the paper feed command, and sends the winding command to the winding device 30 so as to instruct backward rotation of the winding device 30. Accordingly, the PF motor 108 is driven to rotate backward and the winding device 30 is driven to rotate backward in synchronization with backward rotation of the PF motor 108. Thus, the roll paper R is fed backward to the label print position (backward feed).

If the roll paper R is disposed at the label print position, next, the printer 10 performs label print (S510). That is, when label print data LPD received from the host apparatus 150 (specifically, the first printer driver 151) is image data (for example, the RGB color system) for the monitor display system, the printer 10 performs the image processing (resolution conversion, color conversion, halftoning, or the like) by using the second printer driver 89 to generate label print data LPD of the CMYK color system (see FIG. 21B). The control section 103 drives the print engine 95 on the basis of label print data LPD and executes label print of the decision result image JG on the roll paper R (see FIG. 22C).

At this moment, the host apparatus 150 sequentially sends the label print progress request to the printer 10 and confirms the end of label print (S330). If label print ends, the printer 10 sends a response concerning the end of label print to the host apparatus 150.

The host apparatus 150 that confirms the end of label print instructs the printer 10 to store job information (S340). Specifically, the job information transmitting section 186 shown in FIG. 19 transmits color measurement associated data CMD read from the data storage section 157 to the printer 10, together with the job information storage command JMC (see FIGS. 18 and 19).

If the job information storage instruction is received (in S530, Yes), the printer 10 stores job information (S540). During printing, in the printer 10, the ink consumption arithmetic section 176 counts the number of ink droplets (dots) to be ejected from the recording head 19 on the basis of print image data by using a dot counter (not shown) for each predetermined print unit (for example, for each predetermined number of rows or for each page), and calculates ink consumption per print unit by multiplying the count value of the dot counter by the weight (or volume) per dot. The ink consumption arithmetic section 176 adds currently calculated ink consumption to previous cumulative ink consumption stored in the RAM 173, thereby updating cumulative ink consumption. Similarly, during printing, the paper consumption count section 177 counts paper consumption (the number of sheets or paper length) per print unit, and adds current paper consumption to previous cumulative paper consumption stored in the RAM 173, thereby updating cumulative paper consumption.

The control section 103 of the printer 10 stores updated ink consumption and paper consumption temporarily stored in the RAM 173 in the job information storage section in the RAM 173, together with color measurement associated data. When the printer 10 is powered off, job information stored in the RAM 173 is stored in the job information storage section 172 of the nonvolatile memory 171, and when the printer 10 is power on again, job information is read out from the job information storage section 172 and written in the job information storage section of the RAM 173. If the management server 300 accesses the printer 10 and requests job information, the printer 10 transmits job information stored in the job information storage section of the RAM 173 or the nonvolatile memory 171 to the management server 300. The job information may be rewritten in the job information storage section 172 of the nonvolatile memory 171 each time the job information is updated or for each predetermined number of times of update.

If it is confirmed that job information storage ends, the host apparatus 150 instructs the printer 10 to position the roll paper R in order to transport the roll paper R to a predetermined position (S350). The printer 10 that receives the instruction to position the roll paper R positions the roll paper R (S550). In this example, the predetermined position is the print start position of the next page, and the host apparatus 150 transmits the paper feed control command PFC3, which is used to feed backward the roll paper R to the print start position of the next page (backward feed), and the winding control command WCC3, which is used to drive the winding device 30 to rotate backward, to the printer 10. As a result, the PF motor 108 is driven to rotate backward to feed backward the roll paper R, and the winding device 30 is driven to rotate backward in synchronization with backward rotation of the PF motor 108 to unwind the roll paper R from the winding device 30. Thus, the roll paper R is fed backward to the print start position of the next page.

When color measurement is executed, if all of the jobs including printing for color measurement, color measurement instruction, decision, label print instruction, and job information storage instruction end, the host apparatus 150 transmits the job end command "JE" to the printer 10 (S360) (job end notification step). The printer 10 receives the job end command "JE" (S560). If the job end command "JE" is received, the printer 10 disconnects communication with the host apparatus 150, and permits an interrupt from a different host apparatus. That is, the printer 10 accepts a communication connection request from a different host apparatus.

Although in the above description, as shown in FIG. 25, an example where color measurement is executed has been described, during normal printing, there is no color measurement to be executed subsequent to printing (in S240, No). Accordingly, after printing ends, the host apparatus 150 instructs the printer 10 to store job information and to position the roll paper R, and transmits the job end command "JE" to the printer 10 (S360). When color measurement is executed, if the result is determined to be "NG", after color measurement decision, the host apparatus 150 instructs the printer 10 to store job information and to position the roll paper R, and transmits the job end command "JE" to the printer 10 (S360). Even if the result is determined to be "OK", when there is no label print, after color measurement decision, the host apparatus 150 instructs the printer 10 to store job information and to position the roll paper R, and transmit the job end command "JE" to the printer 10 (S360).

As described above in detail, according to this embodiment, the following effects are obtained.

(1) After it waits until color measurement data is received, the job end command "JE" is transmitted to the printer 10. For this reason, if color measurement data is received, color measurement can be rapidly performed. For example, if the job end command "JE" is transmitted once after printing for color measurement ends, an interrupt is accepted from a different host apparatus or the like, and accordingly color measurement data cannot be received until the interrupt ends. In this case, the user waits for a long time until the color measurement decision result is displayed on the monitor 150*a* of the host apparatus 150. For example, the user feels uneasy about a failure in color measurement. After color measurement ends, it takes a lot of time until color measurement associated data is updated. Accordingly, when the management server 300 accesses the printer 10 so as to acquire job information, even if color measurement ends, color measurement associated information is not updated, and only old color measurement associated information is acquired. With the configuration of this embodiment, the above problems can be resolved.

(2) After it waits until label print ends, the job end command "JE" is transmitted to the printer 10. For this reason, after color measurement ends, label print can be rapidly performed. For example, if the job end command "JE" is transmitted once after color measurement, an interrupt is accepted from a different host apparatus or the like, and accordingly label print cannot be performed until the interrupt ends. In this case, the user feels uneasy about a print error during label print. With the configuration of this embodiment, the above problems can be resolved.

(3) After it waits until the job information storage instruction ends, the job end command "JE" is transmitted to the printer 10. For this reason, after color measurement ends, color measurement associated data can be rapidly updated. For example, if the job end command "JE" is transmitted once after color measurement and before the job information storage instruction, an interrupt is accepted from a different host apparatus or the like, and accordingly the job information storage instruction cannot be performed until the interrupt ends. In this case, when the management server 300 accesses the printer 10 so as to acquire job information, even if color measurement ends, color measurement associated information is not updated, and only old color measurement associated information is acquired. With the configuration of this embodiment, the above problems can be resolved.

(4) After printing ends and it waits until the paper positioning instruction to place the paper at a predetermined position ends, the job end command "JE" is transmitted to the printer 10. For this reason, after printing ends, the paper can be rapidly positioned at a next predetermined position. For example, if the job end command "JE" is transmitted once after printing end and before the paper positioning instruction, an interrupt is accepted from a different host apparatus or the like, and accordingly the paper positioning instruction cannot be performed until the interrupt ends. In this case, when a next page starts to be printed, it takes a lot of time and labor to transport the paper to the print start position, and printing start is delayed. When the paper is cut, paper cutting is delayed, and the user waits until the paper is cut. With the configuration of this embodiment, the above problems can be resolved.

(5) The printer 10 calculate the label print position. Therefore, label print of the decision result image JG can be performed at an appropriate position corresponding to the color patch CP printed on the paper. The user does not need to operate the input device 162 to specify the label print position.

(6) The blank space region in the paper area (or the print area) is detected, and the label print position is set within the detected blank space region. Therefore, the decision result image JG can be prevented from being printed on the print image IG or the color patch CP in an overlap manner. As a result, even if the print position is automatically decided and printing is performed, the decision result image JG can be prevented from being printed on the print image IG or color patch CP in an overlap manner to be unreadable.

(7) The label print position is automatically set to a corresponding position spaced at a predetermined distance from the color patch CP, and the decision result image JG is printed at the label print position. Therefore, when a plurality of print images IG and color patches CP are printed on the paper, the color patch CP and the corresponding decision result image JG can be distinguished at a glance.

(8) The print image IG and the color patch CP are printed at the positions of the real coordinate system with the misalignment amount of the roll paper R added, and the label print position is calculated by using the print position of the color patch CP represented by the real coordinate system. Therefore, the distance between the label print position and the color patch CP can be prevented from being changed due to the misalignment amount of the roll paper R.

(9) The misalignment amount of the roll paper R from the reference position in the paper width direction is detected from the detection result of the paper width sensor 111. The value of the logical coordinate system is converted into the value of the real coordinate system with the misalignment amount added. The operation position of the color measurement carriage 57 is controlled on the basis of a command in which the value of the real coordinate system is incorporated. Therefore, even if the roll paper R is misaligned in the paper width direction, color measurement can be accurately performed for the color patch CP at an appropriate color measurement position. As a result, accuracy of the color measurement decision result can be improved.

The invention is not limited to the embodiments, and it may be changed or modified as follows.

(Modification 1) In the foregoing embodiments, the color measurement control command is generated by the host apparatus and transmitted to the printer together with print data. Alternatively, the printer may internally generate the color measurement control command on the basis of a color measurement condition input by an operation of an operation panel.

(Modification 2) The printer 10 is not necessarily connected to the host apparatus. For example, the printer may be provided with a printer driver that generates print data from image data (for example, RGB image data), and the printer driver in the printer may generate and acquire first control data. A color measurement driver in the printer may generate the color measurement control command on the basis of a color measurement condition input from the operation panel of the printer. In this case, an option device may be set to declare (respond) that it belong to a printer class. When this happens, the USB host 81A of the printer 10 may establish communication with the USB devices 82A and 84A of the color measurement driving device 80 and the winding device 30. Print data generated by the second printer driver 89 can be transmitted from the printer to the color measurement driving device 80 and the winding device 30 serving as optional devices. Therefore, the color measurement driving device 80 and the winding device 30 can be controlled by using a command for printing. For this reason, the motor control function for a printer of the existing printer driver can be used, and thus it is not necessary to develop an exclusive-use driver for driving the color measurement driving device 80 and the winding device 30. As a result, costs and time for driver development can be reduced.

(Modification 3) In calculating the value of the real coordinate system, the misalignment amount may not be corrected. For example, a sensor (in the foregoing embodiments, the paper width sensor 111) that calculates the misalignment amount of the roll paper R may not be provided. When the misalignment amount in the paper width direction is corrected, for example, the misalignment amount of the paper width direction may be input from an input operation section of the printer 10, and the value of the real coordinate system may be calculated by using the misalignment amount.

(Modification 4) The sub-device may be only the winding device 30 or may be only the color measuring device 40.

(Modification 5) The sub-device (second processing section) is not limited to the optional device, such as the winding device 30 or the color measuring device 40. The sub-device (optional device) may be a decision device (print image inspection device) that captures the print result by a camera, performs an image processing for the captured image, and decides the print result, a nozzle inspection device that inspects clogging of the nozzles of the recording head 19, or a drying device that dries ink on the target after printing.

(Modification 6) The specific class is not limited to the print command. For example, if the first device is a device different from a printer, a standard command that is used in the first device as the standard may be used.

(Modification 7) In the foregoing embodiments, the invention is applied to an ink jet recording type serial printer that is an example of the printer serving as the first device (first processing section). Alternatively, the invention may be applied to an ink jet recording type line printer.

(Modification 8) In the foregoing embodiments, the color meter is disposed on the downstream side in the transport direction from the recording head, but the position of the second device is not limited thereto. For example, the second device may be disposed on the upstream side in the transport direction with respect to the recording head. In this case, the direction of misalignment in the paper width direction due to skewed movement of the target is inverted with respect to the embodiments.

(Modification 9) In the foregoing embodiments, a position including misalignment in a first direction (for example, the main scanning direction B (paper width direction)) intersecting the transport direction of the target and misalignment in the first direction due to skewed movement of the target is detected. Alternatively, a position including only one misalignment may be detected.

(Modification 10) The second device (second processing section) is not limited to the color measuring device. The second device may be a measuring device that measures matters other than the color of an object. For example, brightness may be measured. Matters, such as dot shift or the like, which are used to decide the print result may be measured. An object to be measured is not limited to a printed object.

(Modification 11) The first device (first processing section) is not limited to the printer that performs recording (printing) as a processing for the target. The processing of the first device for the target may be, for example, etching or laser processing for a substrate as a target. In this case, a processing of the second device (second processing section) may be a second processing at a position overlapping a processing position of the first device or at a position satisfying a predetermined position relationship with respect to the processing position of the first device, measurement of processing by the first device (measurement of processing accuracy or the like), or the like. The first device may detect a position on the target where the second device appropriately performs a processing, and the second device may perform the processing at the position detected by the first device.

(Modification 12) In the foregoing embodiments, the detection unit is provided in the printer serving as the first device, but the detection unit may be provided in the second device. In this case, the detection result of the detection unit is transmitted from the second device to the first device, and the control data generation unit of the first device generates second control data, which is specified by a conversion value from a first coordinate system to a second coordinate system, on the basis of the received detection result.

(Modification 13) In the foregoing embodiments, the misalignment amount Δx is stored in the memory 102 and coordinate conversion is performed by using the misalignment amount Δx, but the invention is not limited thereto. For example, the recording positions of the unit patches D constituting the color patch CP serving as an object may be stored, and the operation position of the color measurement carriage 57 serving as a mobile may be decided so as to be adjusted to the stored recording position of the unit patch. In this case, with respect to the recording position of the unit patch D, the recording position that is calculated on the basis of the count value of the counter 114A, which represents the position of the carriage 17 when the unit patch is printed, may be stored. A position on the target (roll paper R) where an ink droplet is landed from an ink ejection position of the recording head 19 is calculated by using a carriage speed and an ink flight speed (stored experimental value), and a distance between the recording head 19 and the target. The recording position of the unit patch is set to a position on the paper with the misalignment amount of the roll paper R in the paper width direction corrected on the basis of the detection unit of the paper width sensor 111 serving as a detection unit. The carriage position coordinate calculating section 118B (operation position decision unit) of the second printer driver 89 calculates a position, at which the position (specifically, the center position) of the unit patch D from the memory 102 serving as a storage unit is aligned with the color measuring section 123, as the operation position of the color measurement carriage 57.

(Modification 14) In the foregoing embodiments, the color meter is disposed on the downstream side in the transport direction from the recording head, but the position of the second device is not limited thereto. For example, the second device may be disposed on the upstream side in the transport direction with respect to the recording head. In this case, the direction of misalignment in the paper width direction due to skewed movement of the target is inverted with respect to the embodiments.

(Modification 15) In the foregoing embodiments, a position including misalignment in a first direction (for example, the main scanning direction B (paper width direction)) intersecting the transport direction of the target and misalignment in the first direction due to skewed movement of the target is detected. Alternatively, a position including only one misalignment may be detected.

(Modification 16) The second device is not limited to the color measuring device. The second device may be a measuring device that measures matters other than the color of an object. For example, brightness may be measured. Matters, such as dot shift or the like, which are used to decide the print result may be measured. An object to be measured is not limited to a printed object.

(Modification 17) The first device is not limited to the printer that performs recording (printing) as a processing for the target. The processing of the first device for the target may be, for example, etching or laser processing for a substrate as a target. In this case, a processing of the second device may be a second processing at a position overlapping a processing position of the first device or at a position satisfying a predetermined position relationship with respect to the processing position of the first device, measurement of processing by the first device (measurement of processing accuracy or the like), or the like. The first device may detect a position on the target where the second device appropriately performs a processing, and the second device may perform the processing at the position detected by the first device.

(Modification 18) In the foregoing embodiments, the detection unit is provided in the printer serving as the first device, but the detection unit may be provided in the second device. In this case, the detection result of the detection unit is transmitted from the second device to the first device, and the control data generation unit of the first device generates second control data, which is specified by a conversion value from a first coordinate system to a second coordinate system, on the basis of the received detection result.

(Modification 19) The invention is not limited to the configuration in which the command is transmitted from the printer 10 to the color measurement driving device 80 by using print data (ESC/P control data). The command that is used to control the operation position of the second device may be transmitted from the first device to the second device through communication using a different communication protocol.

(Modification 20) In the second embodiment, at least one of label print, job information storage instruction, and paper positioning instruction after label print may be disused. In this case, after color measurement data is received, the job end command "JE" is transmitted to the printer 10. Therefore, after at least printing for color measurement ends, color measurement data can be rapidly acquired. As a result, the substantially same effects as the foregoing embodiments can be obtained.

(Modification 21) In the second embodiment, the host control section is not limited to the printer driver 151 (host driver) in the host apparatus 150. For example, a printer driver that is provided in the printer 10 and functions as the host control section may be used. For example, a printer driver of a standalone type printer in which the user can operate an operating button to specify the color measurement condition or color patch CP and label print while viewing a setup screen for color measurement displayed on a screen of an operation panel of the printer 10 may be used. In this case, the printer driver in the printer 10 basically has the same configuration as the printer driver 151 shown in FIG. 5 and has a function to execute image processing, color measurement condition setup, label print setup, job information storage instruction, and the like. With this configuration, the notification timing of the job start command JS and the job end command JE to the printer 10 is identical to the timing in the first embodiment. As a result, after printing ends, it is possible to suppress a delay until color measurement data acquisition, label print, job information storage instruction, or paper positioning is actually executed.

(Modification 21) In the second embodiment, the user may operate the input device 162 on the setup screen 140 for color measurement to specify the label print position, and an image processing for printing may be performed on label print data (for example, RGB image data) such that the printer driver 151 can print at the specified position, thereby generating label print data for printing (CMYK color system image data). That is, after the deciding section 158 decides the color measurement result on the basis of color measurement data, the image data processing section 161 reads out label print data, which is specified by the user through the setup screen for color measurement, from the data storage section 157, and performs an image processing for label print data so as to be printed at the specified position with the specified size to generate label print data of the CMYK color system.

(Modification 22) In the second embodiment, the value of the command may not be converted from the logical coordinate system to the real coordinate system.

(Modification 23) The first processing unit is not limited to the printer. For example, a device may be used that includes a transport unit transporting a target, and a reading unit reading a portion to be read, such as a predetermined mark or an image, which is specified by the host apparatus, from the target being transported.

(Modification 24) In the foregoing embodiments, an ink jet type printer 10, which is an example of a fluid ejecting apparatus, is used as the first device (or first processing section), but the invention is not limited thereto. A fluid ejecting apparatus that ejects a fluid (a liquid, a liquid-state material in which particles of a functional material are dispersed in or mixed with a liquid, a fluid-state material, such as gel, or a solid which can flow and be ejected as a fluid) other than ink may be used. For example, a liquid-state material ejecting apparatus that ejects a liquid-state material having dispersed or dissolved a material, such as an electrode material or a color material (pixel material), which is used for manufacturing a liquid crystal display, an EL (Electroluminescence) display, and a field emission display, a liquid ejecting apparatus that ejects a bio-organic material, which is used for manufacturing a bio-chip, or a liquid ejecting apparatus that ejects a liquid as a sample, which is used as a precision pipette, may be used. A liquid ejecting apparatus that pinpoint ejects a lubricant to precision instrument, such as a watch or a camera, a liquid ejecting apparatus that ejects a transparent resin liquid, such as ultraviolet curable resin, on a substrate to form a fine hemispheric lens (optical lens) for an optical communication element or the like, a liquid ejecting apparatus that ejects an etchant, such as acid or alkali, to etch a substrate or the like, a fluid-state material ejecting apparatus that ejects a fluid-state material, such as gel (for example, physical gel), or a particulate ejecting apparatus (for example, a toner jet type recording apparatus) that ejects a solid, for example, powder (particulate), such as toner or the like, may be used. The invention may be applied to one of the liquid ejecting apparatuses. In the specification, the term "fluid" is a concept that does not include a fluid, which consists of only gas. Examples of the fluid include, for example, a liquid (including an inorganic solvent, an organic solvent, a solution, liquid-state resin, a liquid-state metal (metal melt), and the like), a liquid-state material, a fluid-state material, a particulate (including a granular material and powder), and the like. The substrate, the precision instrument, or the like serves as the target.

What is claimed is:

1. An electronic device system comprising:
a first device that executes a first processing for a target;
a second device that executes a second processing for the target at a predetermined operation position;
a host apparatus that includes a printer driver configured to generate a first control data with the operation position specified; and transmits the first control command to the first device; and
a detection unit that detects the position of the target,
wherein the first device includes
a control data acquiring unit acquiring first control data with the operation position specified,
a control data generating unit generating second control data, with the operation position in first control data corrected, on the basis of the detection result of the detection unit, and
a first communication unit transmitting the second control data to the second device,
the second device includes
a second communication unit receiving the second control data, and
a control unit executing the second processing at the corrected operation position on the basis of the second control data,
wherein the first device is a printer, and
wherein the control data generating unit of the first device internally generates the second control data without sending the detection result to the host apparatus.

2. The electronic device system according to claim 1,
wherein the detection unit is mounted on a mobile, which moves a first direction intersecting a transport direction of the target, to detect the position of the target in the first direction,
the first device records an object on the target as the first processing,
the second device includes a color measuring section that moves in the first direction, and after the first device executes recording and the target is transported in the transport direction, executes color measurement for the object as the second processing, and
the control data generating unit specifies the operation position, which is specified by a first coordinate system serving as the coordinate on the target in first control data, by a second coordinate system with a home position of the color measuring section as a reference, thereby generating second control data.

3. An electronic device system comprising:
a first device that executes a first processing for a target;
a second device that executes a second processing for the target at a predetermined operation position; and
a detection unit that detects the position of the target,
wherein the first device includes
a control data acquiring unit acquiring first control data with the operation position specified,
a control data generating unit generating second control data, with the operation position in first control data corrected, on the basis of the detection result of the detection unit, and
a first communication unit transmitting the second control data to the second device,
the second device includes
a second communication unit receiving the second control data, and
a control unit executing the second processing at the corrected operation position on the basis of the second control data,
wherein the detection unit is mounted on a mobile, which moves a first direction intersecting a transport direction of the target, to detect the position of the target in the first direction,
the first device records an object on the target as the first processing,
the second device includes a color measuring section that moves in the first direction, and after the first device executes recording and the target is transported in the transport direction, executes color measurement for the object as the second processing, and
the control data generating unit specifies the operation position, which is specified by a first coordinate system serving as the coordinate on the target in first control data, by a second coordinate system with a home position of the color measuring section as a reference, thereby generating second control data.

* * * * *